United States Patent [19]
Sugiyama et al.

[11] Patent Number: 5,859,956
[45] Date of Patent: Jan. 12, 1999

[54] INFORMATION PROCESSING DEVICE AND INFORMATION PROCESSING METHOD

[75] Inventors: Mitsumasa Sugiyama, Kawasaki; Susumu Sugiura, Atsugi; Yoshikazu Yokomizo, Yokohama; Yoshinobu Mita, Kawasaki; Makoto Takaoka, Yokohama; Shigetada Kobayashi, Tokyo; Junichi Shishizuka, Kawasaki; Tsutomu Negishi, Tokyo; Osamu Yamada, Yokohama; Yukari Toda, Yokohama; Kazuhiro Saito, Yokohama; Masanari Toda, Yokohama; Yasuhiko Hashimoto, Tokyo; Yasuo Fukuda, Tokyo, all of Japan

[73] Assignee: Canon Kabushiki Kaisha, Tokyo, Japan

[21] Appl. No.: 811,454

[22] Filed: Mar. 3, 1997

Related U.S. Application Data

[63] Continuation of Ser. No. 182,499, Jan. 18, 1994, abandoned.

[30] Foreign Application Priority Data

Jan. 18, 1993 [JP] Japan .................................. 5-021704

[51] Int. Cl.$^6$ .................................................. G06F 15/00
[52] U.S. Cl. .......................................... 395/112; 395/114
[58] Field of Search .................................. 395/112, 113, 395/114, 117, 101, 501, 133, 200.01, 200.02, 200.03, 200.08, 200.2, 200.3, 502, 946, 200.31, 200.33, 200.43, 200.79, 835, 836, 837, 838; 358/407, 468, 434, 435, 436, 437, 438, 439; 345/501, 502, 433; 707/911; 347/5

[56] References Cited

U.S. PATENT DOCUMENTS

| 5,187,592 | 2/1993 | Sugiyama et al. | 358/430 |
| 5,226,112 | 7/1993 | Mensing et al. | 395/114 |
| 5,251,020 | 10/1993 | Sugiyama | 358/500 |
| 5,303,336 | 4/1994 | Kogeyama et al. | 395/112 |
| 5,333,246 | 7/1994 | Nagasaka | 395/133 |
| 5,337,258 | 8/1994 | Dennis | 364/551.01 |
| 5,353,388 | 10/1994 | Motoyama | 395/114 |

*Primary Examiner*—Edward L. Coles
*Assistant Examiner*—Dov Popovici
*Attorney, Agent, or Firm*—Fitzpatrick, Cella, Harper & Scinto

[57] ABSTRACT

There is disclosed an information device and an information processing method which determine whether a control code constituting a document information is processable or not, transfer the document information to the other information processing device connected with the information processing device when the control code was determined to be unprocessable, and has the other information processing device executed as proxy for the original information processing device to produce an output information from the document information.

5 Claims, 58 Drawing Sheets

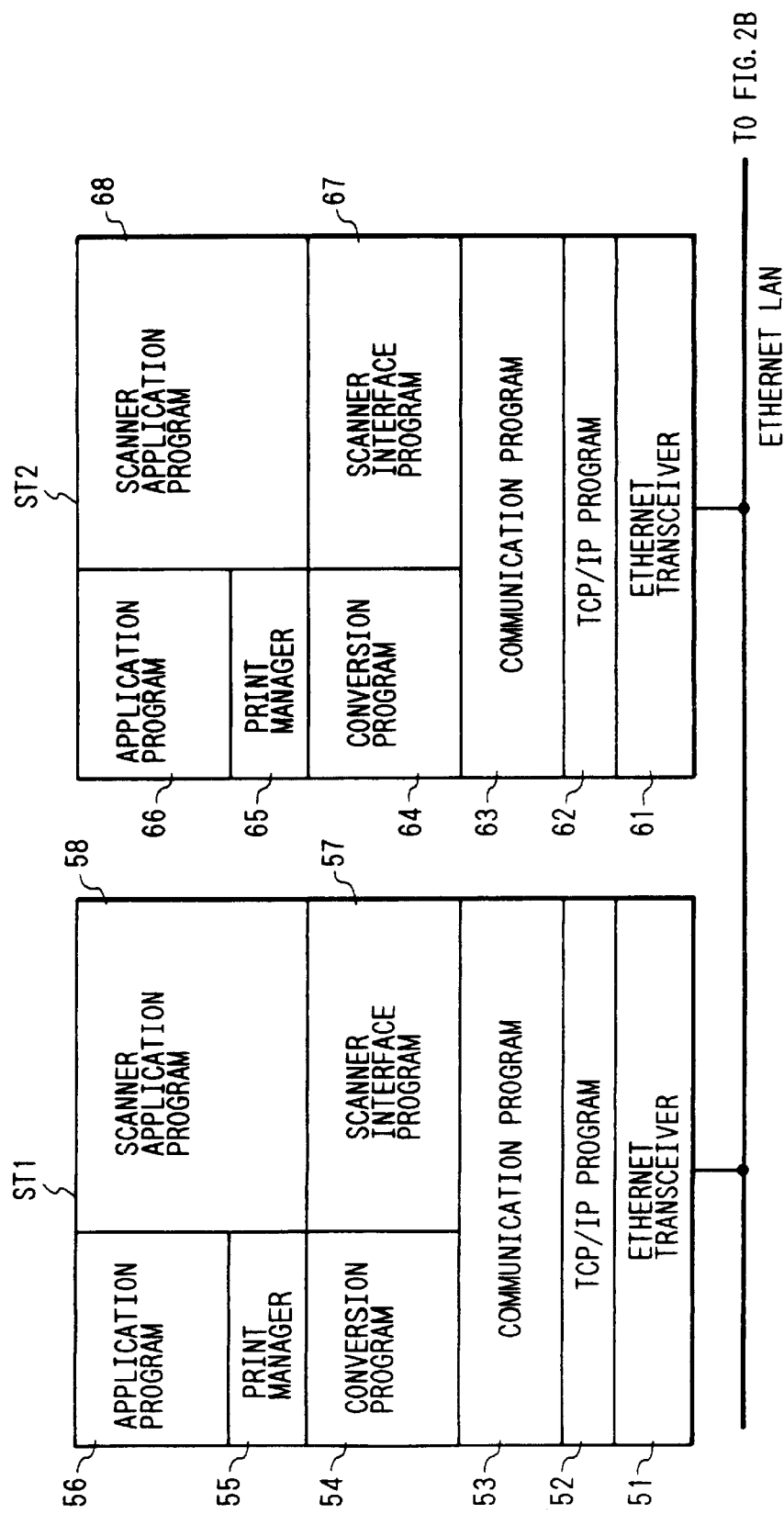

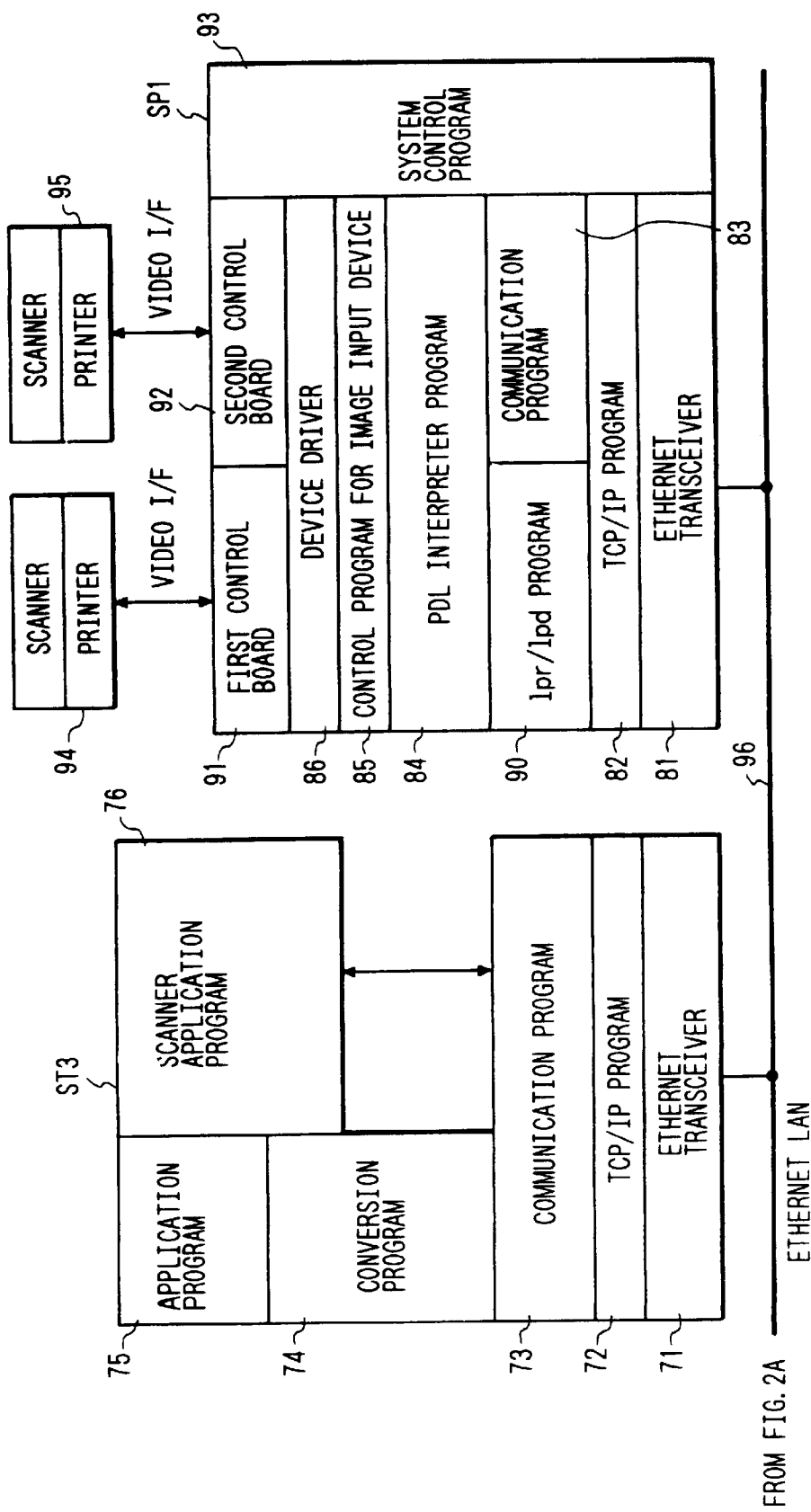

| FIG. 13A |
| FIG. 13B |

HEAD SCANNING

DATA SCANNING

RASTER SCANNING

| SIGNAL | I/O (PRINTER) | REMARKS |
|---|---|---|
| DATA STB | INPUT | |
| DATA 1 ≀ DATA 8 | INPUT | |
| ACK | OUTPUT | |
| BUSY | OUTPUT | |
| PE | OUTPUT | PAPER END |
| SELECT | OUTPUT | PRINTER SELECT |
| SG | | SIGNAL GROUND |
| FG | | FRAME GROUND |
| +5V | | |
| INPUT PRIME | INPUT | INITIALIZE (PRINTER) |
| FAULT | INPUT | ERROR |
| SG | | GROUND |

FIG. 27

| | |
|---|---|
| ESC [? 0 K | DESIGNATE PROPORTIONAL PITCH |
| ESC [38m | DESIGNATE COLOR MODE |
| ESC [11h | DESIGNATE UNIT |
| ESC [7 I | DESIGNATE DOT |
| ESC [22m | MEDIUM |
| ESC [3m | ITALIC |
| ESC [? 0;3;255;0%p | Y=255, M=255, C=0 |
| ESC [2 I | DESIGNATE 1/720 INCH |
| ESC [453 C | 45.3 POINT |
| ESC7 I | DESIGNATE DOT |
| ESC [400;300f | DRAW "CANON |
| CANON | AT DOT (400,300) |
| | |
| ESC [? 0;2;0;0;0;255%p | Y=0, M=0, C=0, K=255 |
| ESC [700;500f | AT DOT (700,500) |
| ESC [7m | HILIGHT START |
| R | DRAW "R" |
| ESC27m | HILIGHT END |
| | |
| ESC [1000;1000f | AT DOT (1000,1000) |
| ESC [786432;512;200;0;512;8;12.R | TOTAL NO. OF BYTES;WIDTH; RESOLUTION;COMPRESSION; HEIGHT;BIT/PIX |
| IMAGE DATA, IMAGE DATA ········ | |

FIG. 28

| START BAND | END BAND | FIGURE | | |
|---|---|---|---|---|
| 1 | 2 | CIRCLE | 80 | 100 ···· |
| 2 | 4 | RECTANGLE | 120 | 180 ···· |

|    | STATUS | PRIORITY | I/F  | JOB  | FINAL PAGE | INTR JOB ID |
|----|--------|----------|------|------|------------|-------------|
| 25 | ESTOP  | LEVEL 2  | BMEM | CLCP | 1          |             |
| 26 | STOP   | LEVEL 2  | BMEM | BJP  | 2          | 27          |
| 27 | RUN    | LEVEL 2  | BMEM | BJS  | 1          |             |
| 28 | WAIT   | LEVEL 0  | CNTR | PDLP | 0          |             |
|    |        |          |      |      |            |             |

FIG. 48

| ID | STATUS | PRIORITY | I/F | JOB | FINAL PAGE | INTR JOB ID |
|---|---|---|---|---|---|---|
| 25 | WAIT | LEVEL 0 | BMEM | CLCP | 0 | |
| | | | | | | |
| | | | | | | |
| | | | | | | |
| | | | | | | |

FIG. 49

| ID | STATUS | PRIORITY | I/F | JOB | FINAL PAGE | INTR JOB ID |
|---|---|---|---|---|---|---|
| 25 | RUN | LEVEL 0 | BMEM | CLCP | 1 | |
| 26 | WAIT | LEVEL 1 | BMEM | BJP | 0 | |
| | | | | | | |
| | | | | | | |
| | | | | | | |

FIG. 50

| ID | STATUS | PRIORITY | I/F | JOB | FINAL PAGE | INTR JOB ID |
|---|---|---|---|---|---|---|
| 25 | ESTOP | LEVEL 2 | BMEM | CLCP | 1 | |
| 26 | WAIT | LEVEL 1 | BMEM | BJP | 0 | |
| | | | | | | |
| | | | | | | |
| | | | | | | |

FIG. 51

| ID | STATUS | PRIORITY | I/F | JOB | FINAL PAGE | INTR JOB ID |
|----|--------|----------|------|------|------------|-------------|
| 25 | ESTOP | LEVEL 2 | BMEM | CLCP | 1 | |
| 26 | RUN | LEVEL 1 | BMEM | BJP | 1 | |
| | | | | | | |
| | | | | | | |
| | | | | | | |

FIG. 52

| ID | STATUS | PRIORITY | I/F | JOB | FINAL PAGE | INTR JOB ID |
|----|--------|----------|------|------|------------|-------------|
| 25 | ESTOP | LEVEL 2 | BMEM | CLCP | 1 | |
| 26 | RUN | LEVEL 1 | BMEM | BJP | 2 | |
| 27 | WAIT | LEVEL 2 | BMEM | BJS | 0 | |
| | | | | | | |
| | | | | | | |

FIG. 53

| ID | STATUS | PRIORITY | I/F | JOB | FINAL PAGE | INTR JOB ID |
|----|--------|----------|------|------|------------|-------------|
| 25 | ESTOP | LEVEL 2 | BMEM | CLCP | 1 | |
| 26 | STOP | LEVEL 2 | BMEM | BJP | 2 | 27 |
| 27 | RUN | LEVEL 2 | BMEM | BJS | 1 | |
| 28 | WAIT | LEVEL 0 | CNTR | PDLP | 0 | |
| | | | | | | |

FIG. 54

| ID | STATUS | PRIORITY | I/F | JOB | FINAL PAGE | INTR JOB ID |
|---|---|---|---|---|---|---|
| 25 | WAIT | LEVEL 2 | BMEM | CLCP | 1 | |
| 26 | WAIT | LEVEL 2 | BMEM | BJP | 2 | |
| 28 | RUN | LEVEL 0 | CNTR | PDLP | 0 | |
| | | | | | | |
| | | | | | | |

FIG. 55

| ID | STATUS | PRIORITY | I/F | JOB | FINAL PAGE | INTR JOB ID |
|---|---|---|---|---|---|---|
| 25 | RUN | LEVEL 2 | BMEM | CLCP | 2 | |
| 26 | WAIT | LEVEL 2 | BMEM | BJP | 2 | |
| 28 | RUN | LEVEL 0 | CNTR | PDLP | 0 | |
| | | | | | | |
| | | | | | | |

FIG. 56

| ID | STATUS | PRIORITY | I/F | JOB | FINAL PAGE | INTR JOB ID |
|---|---|---|---|---|---|---|
| 26 | WAIT | LEVEL 2 | BMEM | BJP | 2 | |
| 28 | RUN | LEVEL 0 | CNTR | PDLP | 0 | |
| | | | | | | |
| | | | | | | |
| | | | | | | |

| ID | STATUS | PRIORITY | I/F | JOB | FINAL PAGE | INTR JOB ID |
|----|--------|----------|------|------|------------|-------------|
| 28 | RUN | LEVEL 0 | CNTR | PDLP | 0 | |
| | | | | | | |
| | | | | | | |
| | | | | | | |
| | | | | | | |

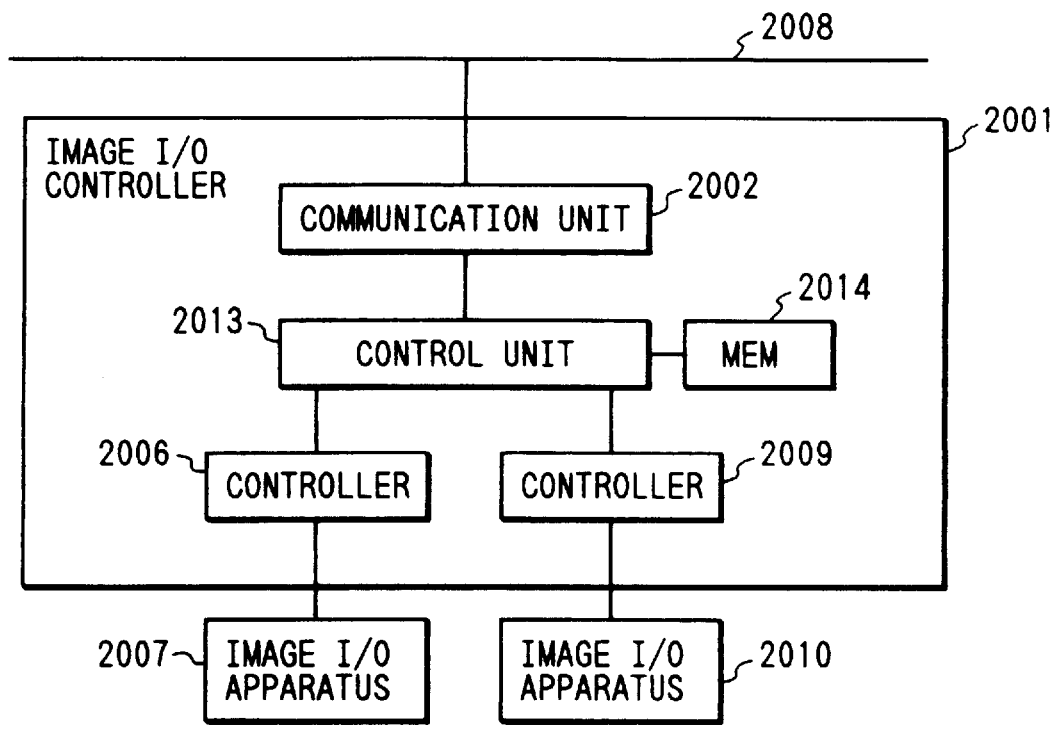

| PDL CODE \ SUBSTITUTE HOST | MAC | NEXT | SUN | NO. OF AVAILABLE HOST STATIONS |
|---|---|---|---|---|
| PS | 0 | 1 |  | 2 |
| GDI |  |  | 0 | 1 |
|  |  |  |  |  |

| DESIGNATED PRINTER | CLC | BJ | BIT MAP PRINTER |
|---|---|---|---|
| 7601 — CLC | — | 1 | 2 |
| 7602 — BJ | 1 | — | 2 |
| 7603 — CENTRONICS | 1 | 2 | — |

FIG. 76

ETAB

| PRINTER ERROR | BEFORE JOB | ON JOB |
|---|---|---|
| NO POWER SUPPLY | OUTPUT DATA TO ANOTHER PRINTER: INFORM HOST OF THE STATUS | |
| OUT OF ORDER | OUTPUT DATA TO ANOTHER PRINTER: INFORM HOST OF THE STATUS | FINISH JOB: INFORM HOST OF THE STATUS |
| PAPER JAMMING | OUTPUT DATA TO ANOTHER PRINTER: INFORM HOST OF THE STATUS | HALT JOB: INFORM HOST OF THE STATUS |
| NO INK | OUTPUT DATA TO ANOTHER PRINTER: INFORM HOST OF THE STATUS | HALT JOB: INFORM HOST OF THE STATUS |
| NO TONER | OUTPUT DATA TO ANOTHER PRINTER: INFORM HOST OF THE STATUS | HALT JOB: INFORM HOST OF THE STATUS |

PRINTER 8005

SCANNER 8008

INFORMATION PROCESSING DEVICE AND INFORMATION PROCESSING METHOD

This application is a continuation of application Ser. No. 08/182,499, filed Jan. 18, 1994, now abandoned.

BACKGROUND OF THE INVENTION

1. Field of the Invention

The present invention relates to an information processing device and an information processing method which has a suitable information processing device executed as proxy for itself to create an output information from a document information in accordance with a control code constituting the document information in a network to which plural kinds of devices are connected.

2. Related Background Art

There has been conventionally no method for using a network scanner with which scanning operations are performed by a remote host device connected to a network.

Accordingly, the host device requesting a scanning operation must have fed a video image signal from a scanner connected to the host device.

Alternatively, the video image signal was transferred to the host device through the network.

When the video image fed by the scanner is printed out together with the other information, such as characters, drawings, etc., the scanned video image and the other information are usually synthesized in the host device requesting the printing operation and output to a printer connected to the network.

There have been the following kinds of data processing methods in a conventional server device.

(1) The video image data is expanded into a bit image format in the host transferred from the host to the printer through an exclusive use interface. The host takes care of all the interface operations with the network. This methods has been mainly utilized in an intelligent host, such as a work station.

(2) The host transmits only a page description language. The printer incorporating an interpreter function converts it into a bit image format, which is so called as a network printer.

(3) The device, which converts a page description language transmitted from the host into an exclusive use bit image, further transmits the image data to a printer through an exclusive use interface.

In the case that the video image information is transferred between the host and the terminal devices by controlling the printer in accordance with a video image output request or a video image input request issued from the host in the network, the host cannot have been accurately informed of any kind of facts, which may cause malfunctions of the terminal device, that the power switch of the terminal device is off; that there occur some errors in the terminal device itself (i.e. a cover is opened); the terminal device (mainly a scanner) does not adequately set papers at the predetermined position and papers from a paper feeding device are jammed at a feeding path.

Further, colour terminals utilized in these kinds of server devices are relatively expensive in price in comparison with monocolour terminals and interface devices utilized to make an interface with the host are extremely expensive in price in comparison with the monocolour terminals.

In addition, data must be abstracted in transmission of a colour video image.

This means that video image data requires a encoding procedure; character data requires a coding procedure and graphic data requires a vectorizing procedure. These procedures can realize the data to be described in a form independent on the output terminal device by abstracting a document and video image data as much as possible thereby eliminating the data amount.

In the receiving side which receives the data described above, the interface device utilized for converting the above described data into a bit image data most suitable for each receiving device will become complicated and expensive in price.

However, under the circumstance that the colour terminal devices are utilized, since each of the devices has been very expensive, one set of the colour interface device and the colour terminal device has been employed in correspondence with each host computer so that a switching device could not be commonly utilized.

Moreover, in the video image terminal devices, since a printed state information at the time when the error occurs has not been administrated in case that a print job is temporarily interrupted due to a print error, the interrupted print job could not be normally restarted after the other printing procedure was performed and the error was recovered.

Therefor, in the case that the print job would be restarted after the error is recovered, the already printed information must have been reprinted, thereby delaying the print processing time and causing wasteful paper consumption.

In the server device, which controls a plurality of video image terminals, when one video image terminal interrupts the printing operation at the time when an error occurs and stays in a waiting mode until the time when the error would be recovered, the other video image terminal would be impossible to be utilized so that the printing operation itself cannot be interrupted, which causes a problem that the video image terminal device cannot be efficiently utilized.

The conventional video image terminal into which a communication function is incorporated executes the scanning and printing functions in accordance with an access input order from the host to each video image terminal devices.

Accordingly, when the printing operation which requires, for example, long time to proceed is conducted, then it must be necessary to wait for a long time even though a quick video image input were required, thereby impairing an efficiency of the video image terminal device.

In general, a shorter time is required for the video image inputting than that for the printing.

Nevertheless, if the preceding job, i.e., print job, were executed at the time when a user inputs instructions of request for video image input and the host computer sends the above instructions to the server device through a communication line, then such the instructions must be waited until when the proceding print job would be completed, which impairs an efficient operation of the terminal device.

An abnormal condition of each terminal devices cannot be adequately informed to the host so that an operator of the terminal devices cannot respond for a long period after the request for video image input was issued and cannot even be aware of the occurrence of troubles.

Further, since a printer connected to the server device of the type described above incorporates a special purpose bit image converter, it cannot be well operated if a printer which is not dedicated for the server device would be connected thereto.

In this case, there have been widely utilized as the dedicated special language for the printer the post script made by Adobe Inc. and PCL language made by Hulet-Packard Inc.

If a printing operation were executed under the circumstance that the print language received from the host and the control language of the printer connected to the server device are inconsistent with each other, the print job will wait until the time when the troubles are released or will lapse without being executed, which may compel the users to wait for long time who don't care whichever printer is used and desire to obtain the printing output earlier or to do a complicated operation for another output request to the other printers.

Further, if some kinds of errors, for example, paper jam occur during the print job period under the control of the terminal device which executes scanning and printing functions activated in accordance with a paper read instruction or a document video image output instruction from each hosts connected to the prescribed network, the errors have been notified to the host computers or the print job has been terminated so that the print job must have been restarted after the recovery of the printer in which such the errors were caused even though the other printers in which the similar print job can be executed are available in the system.

As described above, the conventional error treatment cannot, flexibly respond error by error so that the requested print job or scan job cannot be efficiently processed.

SUMMARY OF THE INVENTION

The present invention is made to overcome the foregoing problems. Therefore, it is an object of the present invention to provide an information processing device and an information processing method which determine whether a control code constituting a document information is processable or not, transfer the document information to the other information processing device connected with the information processing device when the control code was determined to be unprocessable, and has the other information processing device executed as proxy for the original information processing device to produce an output information from the document information.

BRIEF DESCRIPTION OF THE DRAWINGS

FIG. 2 is comprised of FIGS. 2A and 2B showing system block diagrams illustrating a schematic view of a network system to which the server device shown in FIG. 1 is applied;

FIG. 27 is a view illustrating a main portion of a code system applied with necessary modifications to a page description language in a server device according to the present invention;

FIG. 28 is a view illustrating a substitutional procedure into an intermediate code conducted by a layout in a server device according to the present invention;

FIG. 48 is a table illustrating a content of a job table in response to a job processing in a server device according to the present invention;

FIG. 49 is a table illustrating a content of a job table in response to a job processing in a server device according to the present invention;

FIG. 50 is a table illustrating a content of a job table in response to a job processing in a server device according to the present invention;

FIG. 51 is a table illustrating a content of a job table in response to a job processing in a server device according to the present invention;

FIG. 52 is a table illustrating a content of a job table in response to a job processing in a server device according to the present invention;

FIG. 53 is a table illustrating a content of a job table in response to a job processing in a server device according to the present invention;

FIG. 54 is a table illustrating a content of a job table in response to a job processing in a server device according to the present invention;

FIG. 55 is a table illustrating a content of a job table in response to a job processing in a server device according to the present invention;

FIG. 56 is a table illustrating a content of a job table in response to a job processing in a server device according to the present invention;

FIG. 65 is a schematic block diagram illustrating a communication control structure between a server device according to the embodiment of the invention and a video image terminal device;

FIG. 66 is a view illustrating an example of data transmitted from a host computer to a designated SP server device through a communication line shown in FIG. 65;

FIG. 76 is a explanatory view illustrating an error processing table constructed in a server device shown in FIG. 75.

DETAILED DESCRIPTION OF THE PREFERRED EMBODIMENT

A detailed description of the preferred embodiment will be made hereinafter referring to a server device to as an example of an information processing device according to the present invention to which a plurality of terminal devices executing scanning and printing functions are connected through a predetermined interface and is communicably connected to a plurality of host devices through a predetermined network.

Although the description will be further made referring to a data transmission procedure between the host computer communicably connected to the server device and its application, the present invention can be, needless to say, applicable to a host computer communicably connected to the server device which is further communicably connected to a plurality of host computers through a predetermined network and also connected to a plurality of output terminal devices executing the printing function through a predetermined interface.

Figure 1:
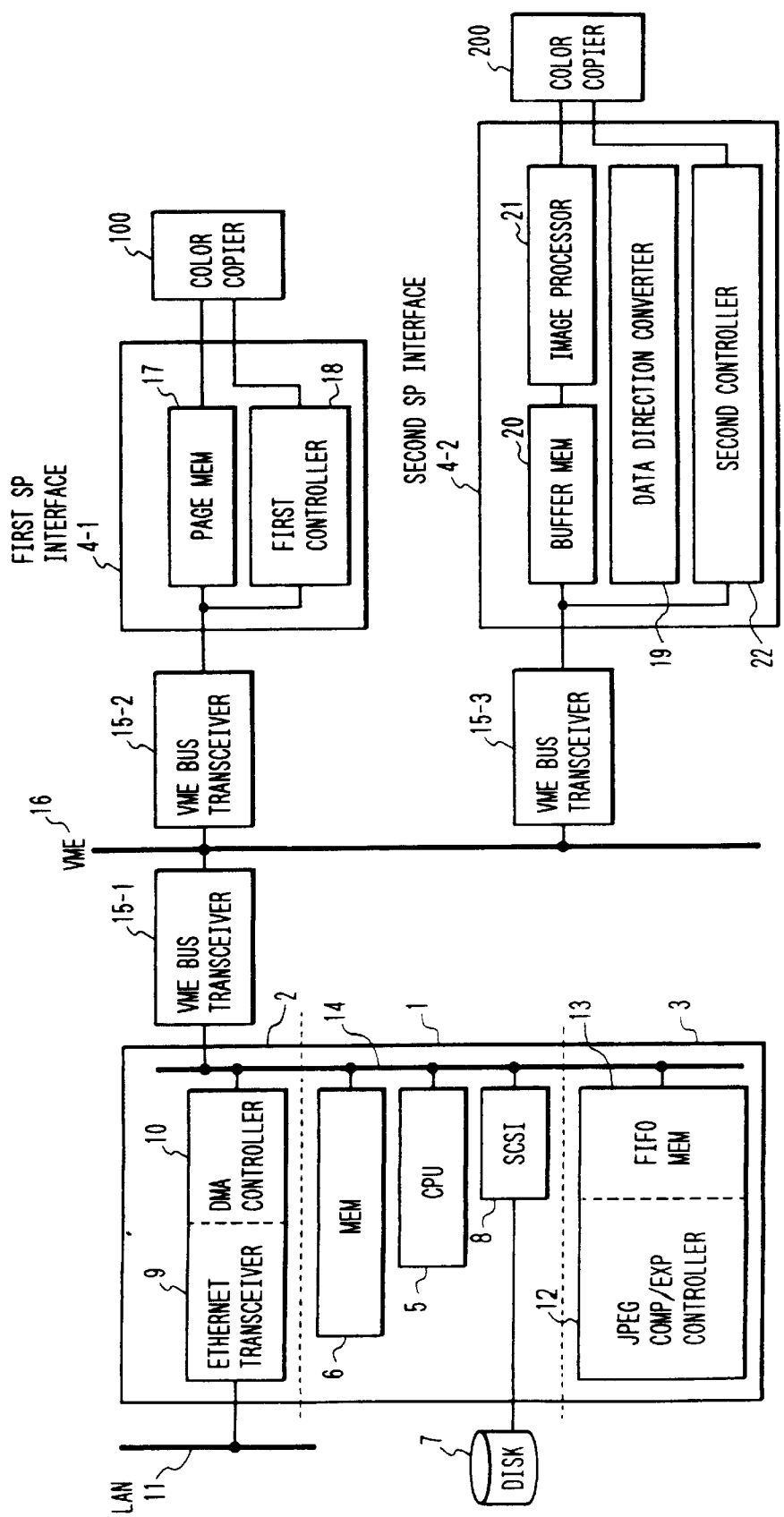
FIG. 1 is a system block diagram illustrating a schematic view of a server device of the first embodiment in accordance with the present invention.

FIG. 1 is a system block diagram schematically illustrating a server device according to the first embodiment of the invention. A detailed system block diagram will be explained later.

A scanner/printer (SP) server not shown in FIG. 1 will be explained later. This system briefly comprises a main CPU circuit 1, an Ethernet circuit 2, JPEG compression/expansion (hereinafter as called "compansion") circuit 3 and a scanner/printer interface circuit 4.

When plural scanners and printers are necessary to be connected to the scanner/printer (SP) server, the necessary number of scanner/printer interface circuits 4 have to be installed. To facilitate increase or decrease the number, the scanner/printer interface circuit 4 is constituted on an independent board and connected to its main body through a VME bus 16 which will be described later. The remaining three circuits 1, 2 and 3 are constituted on a single board and coupled each other through a local bus.

The reference numeral 4-1 denotes a first scanner/printer interface circuit (hereinafter called as the first SP interface circuit) and serves as an interface between a digital color copier 100 (laser beam color copier), for example, "CLC-500" (product name) and the VME bus 16.

The reference numeral 4-2 denotes a second scanner/printer interface circuit (the second SP interface circuit) and serves as an interface between a digital color copier 200 (thermal jet color copier), for example, "Piccel Jet" (product name) and the VME bus 16.

The main CPU circuit 1 is constituted of a CPU 5, for example, R3000 (product name) and a memory 6, which constitutes an operating system "OS." For example, under the control of VxWorks (product name), all programs are executed. A hard disk 7 is provided as an auxiliary device for the memory 6. The numeral 8 denotes a SCSI interface. The Ethernet circuit 2 comprises an Ethernet transceiver 9 and a DMA controller 10 which transfers data to the memory 6 in a DMA mode.

The Ethernet transceiver 9 is connected to an "Ethernet Local Area Network" (product name: LAN) 11.

The JPEG compansion circuit 3 comprises a JPEG compression, expansion controller 12 and an FIFO memory 13. A local bus, which couples the main CPU circuit 1, Ethernet circuit 2 and the JPEG compansion circuit 3 interrelatedly, is connected to the VME bus 16 through a VME bus transceiver 15-1.

The first SP interface circuit 4-1 comprises a page memory 17 and a first control circuit 18. Although the page memory 19 requires one page size memory area, this is because when the digital color copier 100 initiates printing or scanning functions, the flow control cannot be possible any more. The memory 17 is constituted as a compression memory because its price is very expensive.

An ADCT compression technique, which can achieve non-reversible, high compression rate compression, is employed on the memory 17 in view of the fact that the data stored in the memory 17 is only those rasterized by the memory 6. An ADCT compression chip not shown in FIG. 1 can be used with the same chip used in the JPEG compansion controller 12.

The compression data stored in the page memory 17 by using the ADCP compression technique is only used in a closed circuit herein and is not output herefrom so that no normalization is necessary. In fact, an improved JPEG is utilized as an effective method.

The first control circuit 18 is constituted of a CPU, for example, "Z-80" (product name) and used to send and receive control signals other than video signals to/from the copier 100.

A control command is serially transmitted in order to reduce a number of the interface.

The first SP interface circuit 4-1 is connected through the VME bus transceiver 15-2 to the VME bus 16.

The second SP interface circuit 4-2 which comprises a data direction converter 19, a buffer memory 20, a video processing circuit 21 and a second controller 22, is connected to the VME bus 16 thorough the bus transceiver 15-3. The data direction converter 19 converts a video data format into a vertical direction relative to the scanning direction in printing and converts a video data format which is a vertical direction relative to the scanning direction into the scanning direction, for which the buffer memory 20 is utilized.

The video processing circuit 21 is employed to supplement a video processing function which is lacked on the copier 200. The second controller 22, which provides the same function as those of the first controller 18, is constituted of a CPU, for example, "Z-80" (product name).

Hereinafter, operations will be explained. The first example is how to execute a network printing.

A page description language i.e., "CaPSL" (product name) input from LAN 10 through the Ethernet transceiver 9 is stored directly into a specific region (receiving buffer) of the memory 6 by the DMA controller 10, and converted into a raster image by a page description language interpreter program, which will be described later.

Although the JPEG compression video image signal can be expanded by the page description language (hereinafter called as PDL), the JPEG compansion circuit 3 is utilized for expanding in a high speed.

Figure 60:
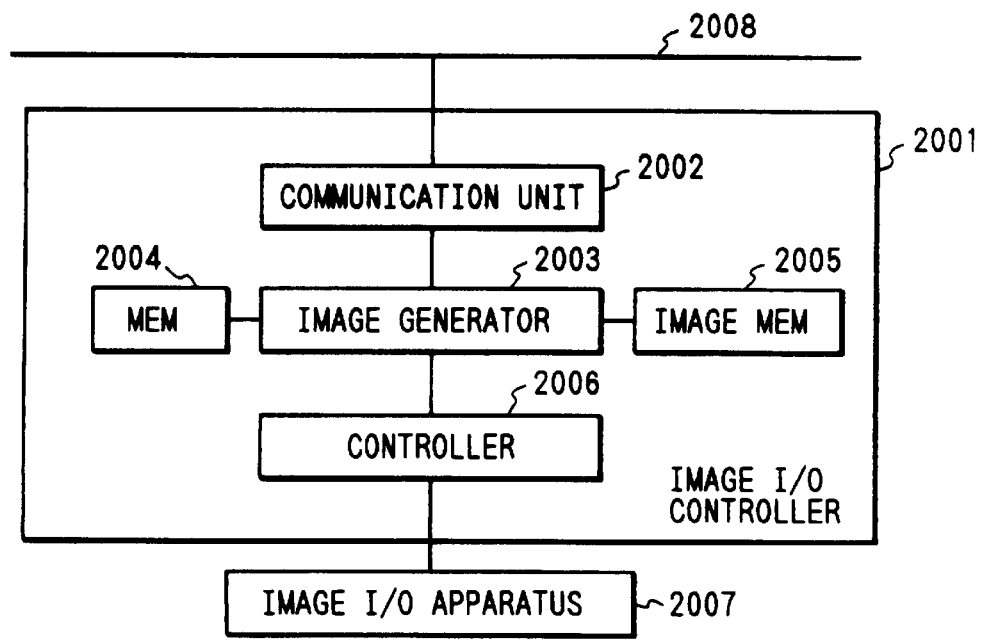
FIG. 60 is a schematic block diagram illustrating a communication control structure between a server device of the embodiment according to the present invention and a video image terminal device.
Figure 61:
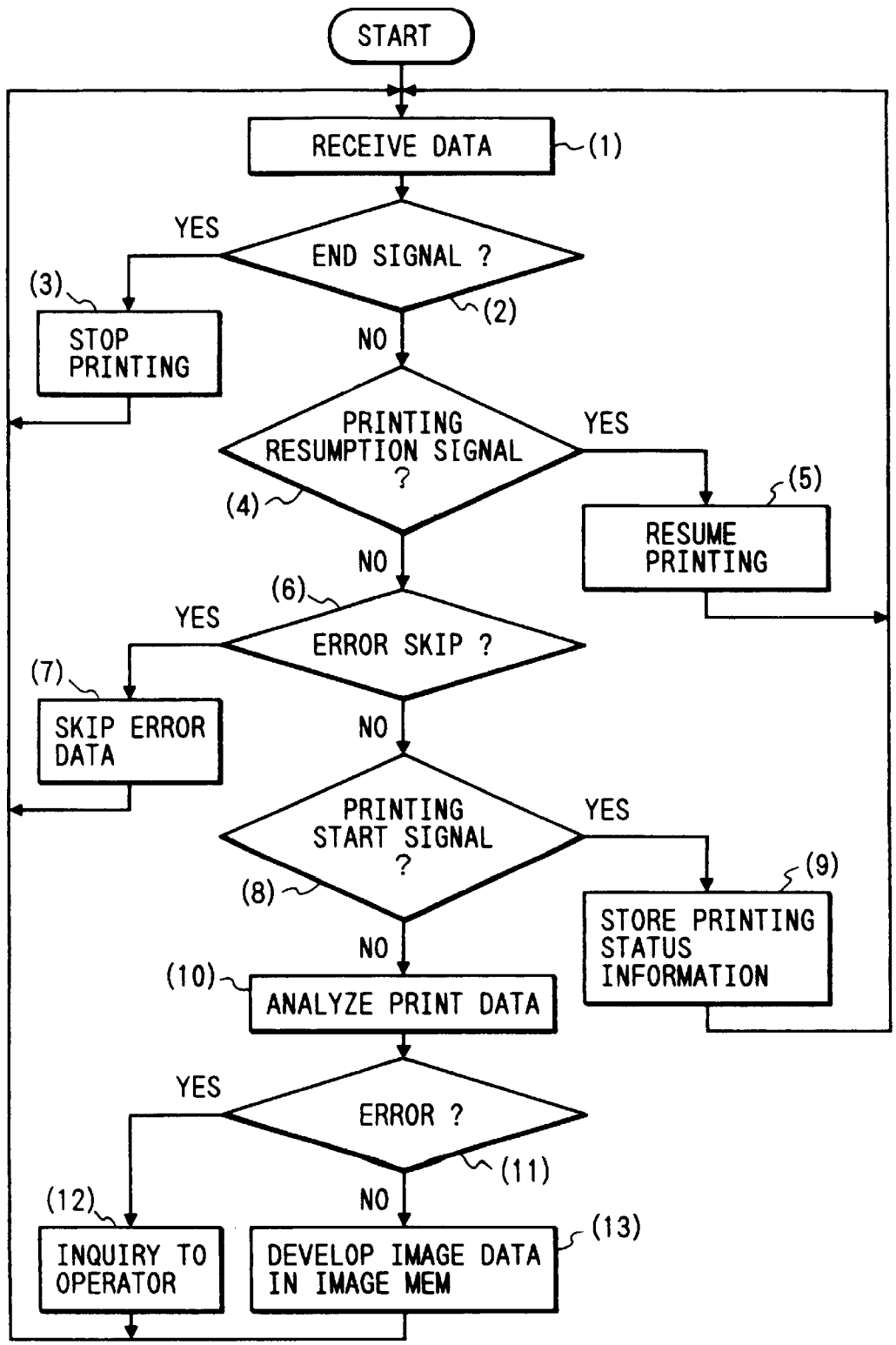
FIG. 61 is a flowchart illustrating a print control method of a server device of the embodiment according to the present invention.

In the first server device constituted above, the first video output control circuit (i.e., main CPU circuit 1) controls outputs, to the respective terminal devices, of the first video information signal input from the respective host through the network, the second video information signal read from the respective terminal devices (copier 100, 200) in accordance with instructions from the respective hosts and the third video information signal combined the first video information with the second one in accordance with instructions of the respective hosts. in accordance with flow charts shown in FIGS. 60 and 61. Accordingly, either of the first to third video information signals can be directly produced and directly output from the respective terminal devices in accordance with instructions of the respective hosts.

Further, since the second video output control circuit controls the second video information signal being output to the first host which requests the information or to the second hosts which is designated by the first host, the second video information fed from the respective terminal devices in response to instructions from the hosts can be directly transferred to the other host including its own host.

Since the memory 6 does not have enough capacity due to economical reasons to store one page data created by rasterizing a video plane, is employed a bunding method which executes partially the PDL, for example CaPSL for one time and proceeds multiple times in total. The rasterized data is transferred to either the first SP interface circuit 4-1 or the second interface circuit 4-2 and then output to the respective printers. A network scanning procedure will be described later.

FIGS. 2A and 2B are system block diagrams schematically illustrating a network system in which the server device shown in FIG. 1 is incorporated.

The network system in the embodiment is so constructed that a small number of scanners or printers connected thereto through the network can be commonly utilized from application softwares of the commercialized host computers, such as Macintosh (product name), IBM-PC (product name), SUN (product name), etc.

The network system shown in FIGS. 2A and 2B is divided into four blocks, namely from the left, Macintosh work station ST1, IBM-PC work station ST2, SUN work station ST3 and a color SP server SP1. Three work stations ST1–ST3 are commercialized host computers and the color SP server SP1 is an interface unit designed by the inventors of the present invention.

These blocks are mutually connected through a local area network 96, for example, Ethernet (product name). Numerals 94 and 95 denote a first color scanner/printer and a second color scanner/printer, respectively.

Macintosh work station ST1, IBM-PC work station ST2, SUN work station ST3 and the color SP server SP1 employ a common communication interface for mutual communication.

Numerals 51, 61, 71, and 81 denote Ethernet transceivers which are used for communication with the local area network (LAN) 96. Numerals 52, 62, 72, and 82 denote communication programs TCP/IP (product name) which are constructed on the LAN 96 and standards of U.S. Department of Defense.

The TCP/IP program provides an error-free data communication service (function) in End-to-End. Numerals 53, 63, 73, and 83 denote communication programs which provides services (functions) for special purposes to be utilized commonly from either Macintosh work station ST1, IBM-PC work station ST2 or SUN work station ST3. Numerals 53 and 63 denote communication programs to provide a client type service as an S/P client program and numeral 83 denotes a communication program to provide a server type service as an S/P server program.

Now, an Explanation will be made how to print on the first color scanner/printer 94 from Macintosh station ST1. In order to print the document produced by a commercialized application program 56, the "OS" called as Printing Manager 55 undertakes partially the control and initiates the control for printing.

The data format is standardized as "Quick Draw" (product name) in case of Macintosh.

Printing Manager 55 calls image drawing function groups of the conversion program 54 in a manner as they are written in the document.

The conversion program 54 consecutively converts Quick Draw into, for example, CaPSL (Canon Printing System Language) codes in the call and stores them into an unshown memory.

The communication program 53 transfers the obtained CaPSL codes to the color SP server SP1 in accordance with TCP/IP program 52 through Ethernet transceiver 51, LAN 96, Ethernet transceiver 81, TCP/IP program 82 and the communication program 83. The conversion programs 54, 64, 74, the communication programs 53, 63, 73, the scanner interface programs 57, 67, TCP/IP programs 52, 62, 72 can be supplied to the host computers either in a form of a floppy disk or an Ethernet transceiver, for example, a board circuit.

The whole operations of the color SP server (S/P server device) SP1 are controlled by a system control program 93. A receipt of the CaPSL codes is also informed to the system control program 93. The system control program 93 requests a PDL interpreter program 84, which will be described later, to rasterize the CaPSL coded document into a bit map video image.

The video image data rasterized into the bit map video image is transferred to a device driver 86 and further transferred to the first color scanner/printer 94 from the video interface Video I/F through, for example, the first printer control board 91 to be printed.

Although similar data flow is made when printed by using IBM-PC station ST2, a data format of the printed document is standardized as "GDI" (product name). The conversion program 64 mainly serves as GDI/CaPSL conversion program.

When printed by using SUN work station ST3, since the functions corresponding to the conversion programs 54, 64 are not standardized, communications are directly made by the application program 75 through the communication program 73.

In order to print by using a commercialized application program, for example, "Frame Maker" (product name), the conversion program 74 for MIF/CaPSL conversion is provided therebetween.

In case of scanning (reading) by using, for example, Macintosh station ST1, a scan request is issued by the scanner application program 58 through the scanner interface program 57. Then, the communication program 53 keeps an End-to-End communication route to the communication program 83 through Ethernet transceiver 51, LAN 96, Ethernet transceiver 81 and TCP/IP program 82. The scan instruction is also transferred to the system control program 93 and the system control program 93 requests the scanner control program to scan the first color scanner/printer 94.

The video image data of the scanned document is reversely transmitted from the first control board 91, through the device driver 86, the communication program 83. TCP/IP program 82, Ethernet transceiver 81, LAN 96. Ethernet transceiver 51, TCP/IP program 52, the communication program 53, the device driver 57, to the application program 58.

When scanned by using IBM-PC station ST2, a similar function will be made.

However, when scanned in SUN work station ST3, since the functions corresponding to the device driver 57 and the scanner interface program 67 are not standardized, communications are directly made by the scanner application program 76 through the communication program 73.

The scanner interface programs 57, 67 perform data control between the scanner application and the communication program.

The color SP server SP1 is connected to another scanner/printer, the second color scanner/printer 95, which controls the second color scanner/printer 95 as well through the second control board 92.

All programs including the system control program 93 of the color server SP1 work under control of the operating system "OS", for example, VxWorks (commercial name).

In order to receive requests from the UNIX work stations in which no such special programs such as the communication program 73 and the conversion program 74 are installed, there is installed a quasi-standard lpr/lpd communication program 90 in parallel with the communication program 83.

Figure 3:
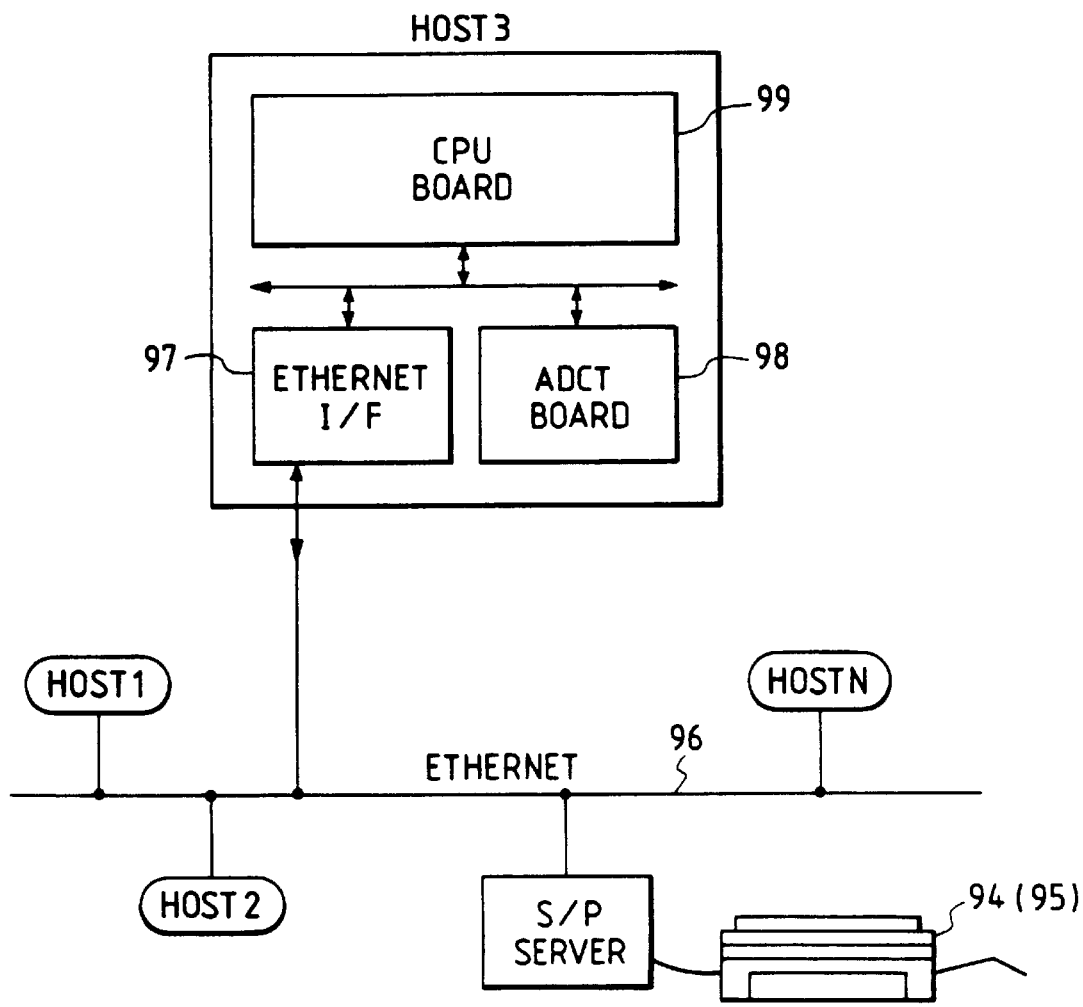
FIG. 3 is a view illustrating a network structure between a server device according to the present invention and its host device.

FIG. 3 is a view illustrating a network structure between a server device according to the invention and its host computers.

In the drawings, either Macintosh (commercial name), IBM-PC (commercial name) or SUN (commercial name) computer each "OS" of which controls its own data processing can be used as each of host computers HOST 1–N.

Each of the host computers HOST 1–N respectively incorporates an Ethernet interface board 97, a video image compansion (ADCP) board 98, and a CPU board 99 to communication with LAN 96.

ADCT board 98 can be replaced by a software which realizes the same function on a memory.

In case of not using a compression/expansion technique at the time of input/output of the video image data, there is unnecessary to provide the ADCP board 98. Although the embodiment employs "Ethernet" as the LAN 96, the other alternative "Apple talk" (commercial name), or "Taken Ring" (commercial name) can be also utilized.

This invention is also applicable to a system employing OS1 or IPX (both commercial names) instead of the communication program TCP/IP program.

Figure 4:
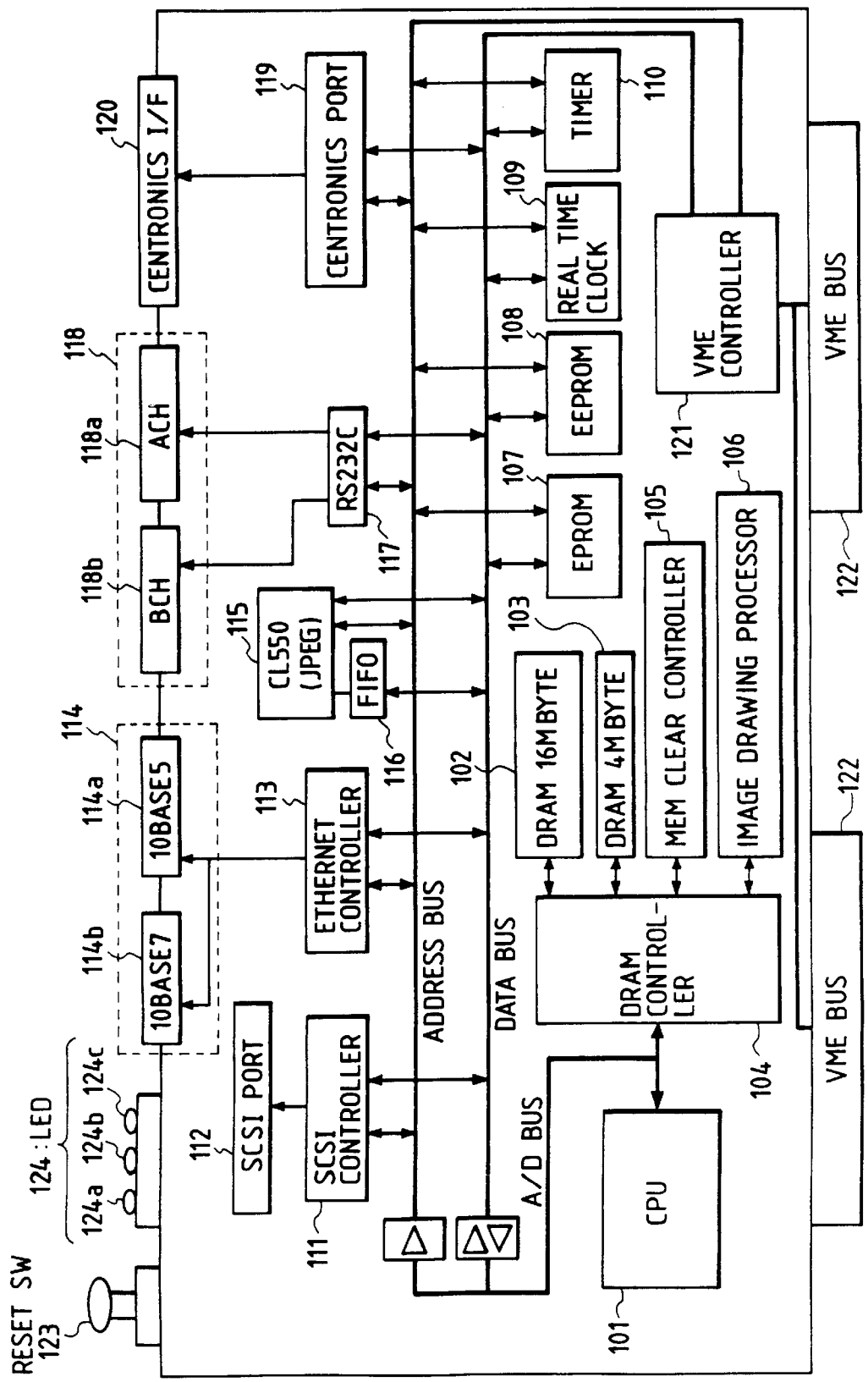
FIG. 4 is a circuit diagram illustrating a detailed structure of a main CPU board circuit shown in FIG. 1.

FIG. 4 is a circuit block diagram illustrating a detailed structure of a board circuit constituted of the main CPU circuit 1, the Ethernet circuit 2 and the JPEG compression circuit 3 shown in FIG. 1.

In the drawing, a CPU 101 which is constituted of, for example, IDP 79R3051 (commercial name) controls whole operations of the board circuit. A real time OS is incorporated on the board circuit.

The CPU 101 activates the communication program 83, the system control program 93, the scanner control program 85, and PDL interpreter program 84, all of which have been activated under the above OS's and controls all operations in multi-processes.

A main memory 102 serves as a work memory of the CPU 101. When the system turns on, the programs stored in an EPROM 107, in an auxiliary memory device such as a hard disk connected to a SCSI port 112, or in a host computer in the network are down loaded and arranged into the memory 102. Therefore, the program itself of each processes is located on the main memory 102 and works there.

A band memory 103 can store a few lines of video image data in use of a raster method. The band memory 103 expands the PDL data into a bit map data. Although PDL usually delivers one page bit map data to a printer engine, this system employs a method that one page is divided into a few bands and expanded into a bit map data.

This can be realized in that the PDL interpreter program 84 rearranges the PDL data. The bit map data expanded into the band memory 103 is delivered to a printer. Then, the next band is expanded and delivered again to a printer.

One page printing can be accomplished by repetition of the above operations.

The video image data read from the scanner, is also temporarily stored in the band memory. The CPU 101, or a block transfer function of a direct memory access (DMA) which is not described in the system, can read the video image data from the band memory 103 and delivers it to the host computer through a hard disk connected to the SCSI port 112 or the network connected to the Ethernet port 114. When one band data is delivered, next band scan data is input and repeated in the same way described above.

A memory access controller 104 controls access and refresh functions of the main memory 102 and a DRAM constituting the band memory 103.

Though there are usually several kinds of methods for accessing DRAMs; a method for accessing word (8, 16, 32, - - - bits) by word; a method for accessing serially with a predetermined bit length (page READ, Write); and an interleave method in which divided DRAM banks are alternatively accessed and addresses are generated in advance, all the above methods can be applied so as to speed up the memory access. When the main memory 102 and the band memory 103 are constituted of SRAMs, it is not required to refresh. A memory clear controller 105 clears the data in the band memory 103 in a high speed.

Figure 5:
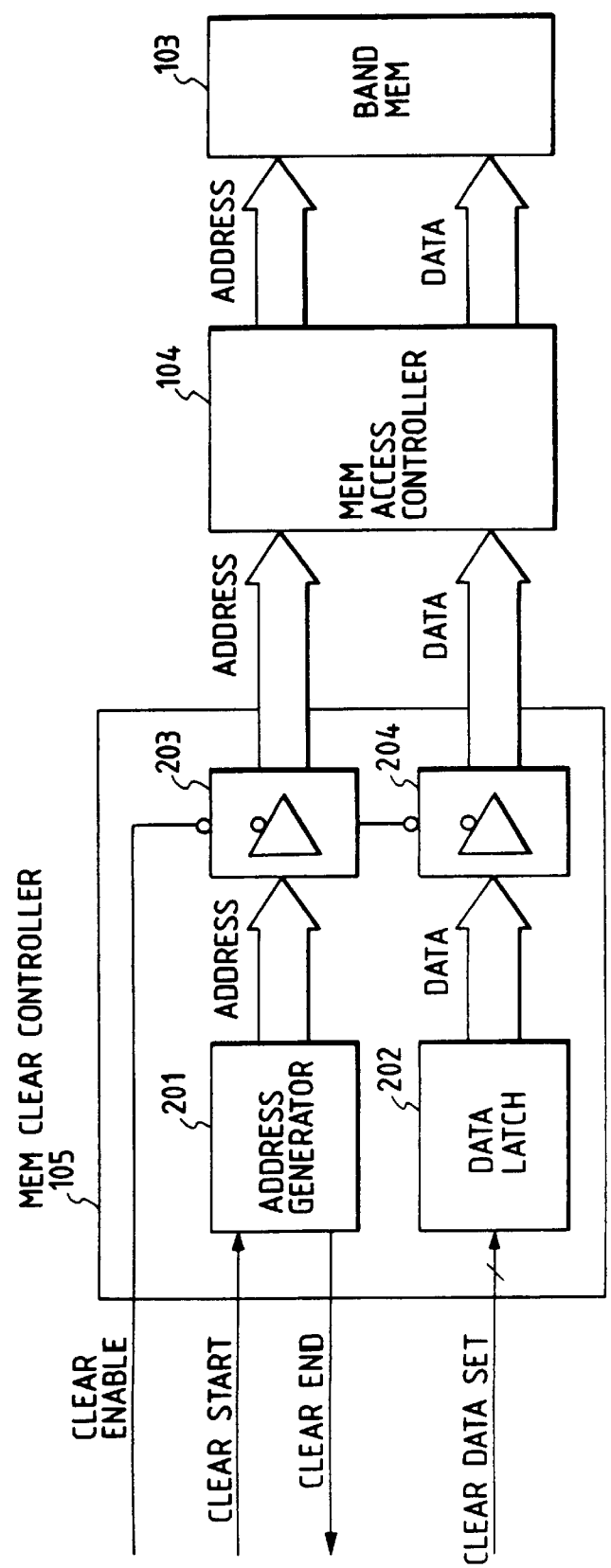
FIG. 5 is a block diagram illustrating a detailed structure of a memory clear controller shown in FIG. 4.

FIG. 5 is a block diagram illustrating a detailed structure of the memory clear controller 105 shown in FIG. 4.

In the drawing, an address generator 201 outputs addresses to be cleared at an address buffer 203 in response to a clear start signal. A data latch 202 outputs the clear data at a data buffer 204.

In the board circuit constituted of the main CPU circuit 1, the Ethernet circuit 2 and the JPEG compression circuit 3, when the CPU 101 confirms that the data of the band memory 103 is transferred to the other memory or interfaces, the address buffer 203 and the data buffer 204 are enabled, whereas the other access means to the band memory 103 are disabled. System initializing data, for example, "00" have been set in the data latch 202. The CPU 101 delivers a clear start signal to an address generator 201. In response to that, the address generator 201 generates consecutive addresses and the data latched at the data latch 202 is written in the band memory 103 through the memory access controller 104. After completion of writing into the whole memories, the address generator 201 sends a clear end signal to the CPU 101 and the clear operations are terminated.

A clear operation will be made after the video image data of the band memory 103 is delivered to a printer device. The video image data of the next band is expanded by the PDL interpreter program 84. On this moment, the PDL interpreter program 84 expands only the necessary portion into a bit map.

Figure 6:
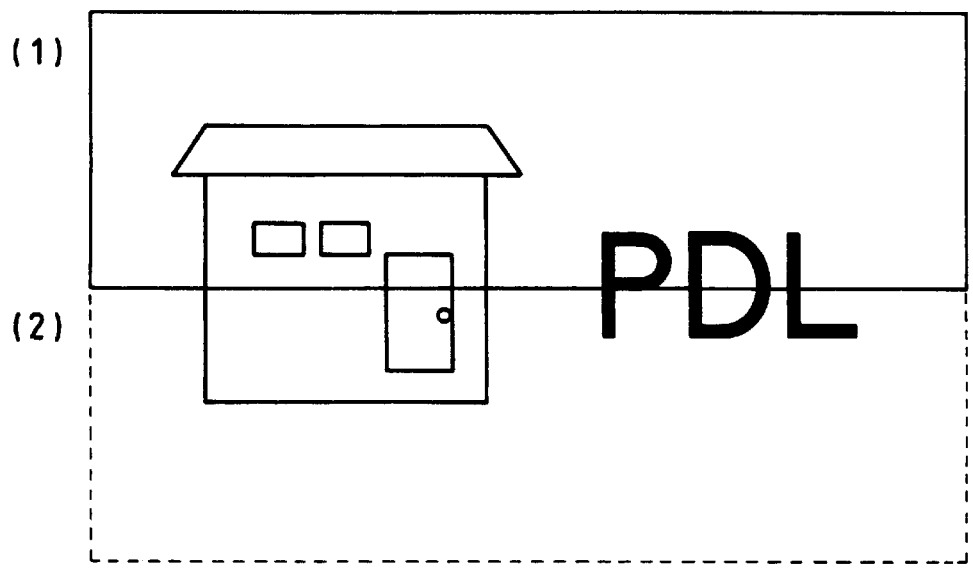
FIG. 6 is an explanatory view illustrating a band expansion process of video image information to a band memory shown in FIG. 5.

For example, as to the band expansion shown in FIG. 6 (1), (2), only the video image belonging to the area (2) is written. Accordingly, the video image data already transferred in FIG. 6. (1) remains as an unnecessary data.

If not cleared on the memory, the video image data mixing the area (1) and the area (2) stays in the band memory 103.

For that reason, the memory clear procedure is necessary. The memory clear controller 105 is constituted of hardware to proceed the memory clear procedure so that a high speed procedure can be realized.

The image drawing processor 106 is constructed in order to support with hardware drawing functions of the PDL interpreter program 84. The PDL interpreter program 84 requires relatively much time to draw lines and paint drawings.

Figure 7:
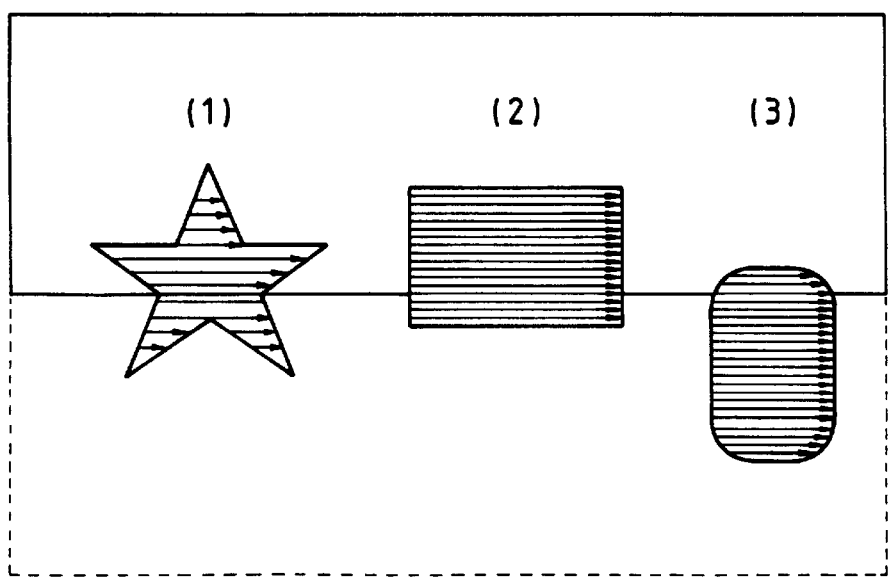
FIG. 7 is an explanatory view illustrating a band expansion process of video image information to a band memory shown in FIG. 5.

In order to paint, for example, the area enclosed with drawings (1) to (3) shown in FIG. 7, the painting procedure is performed in a direction shown as arrows in FIG. 7.

Figure 8:
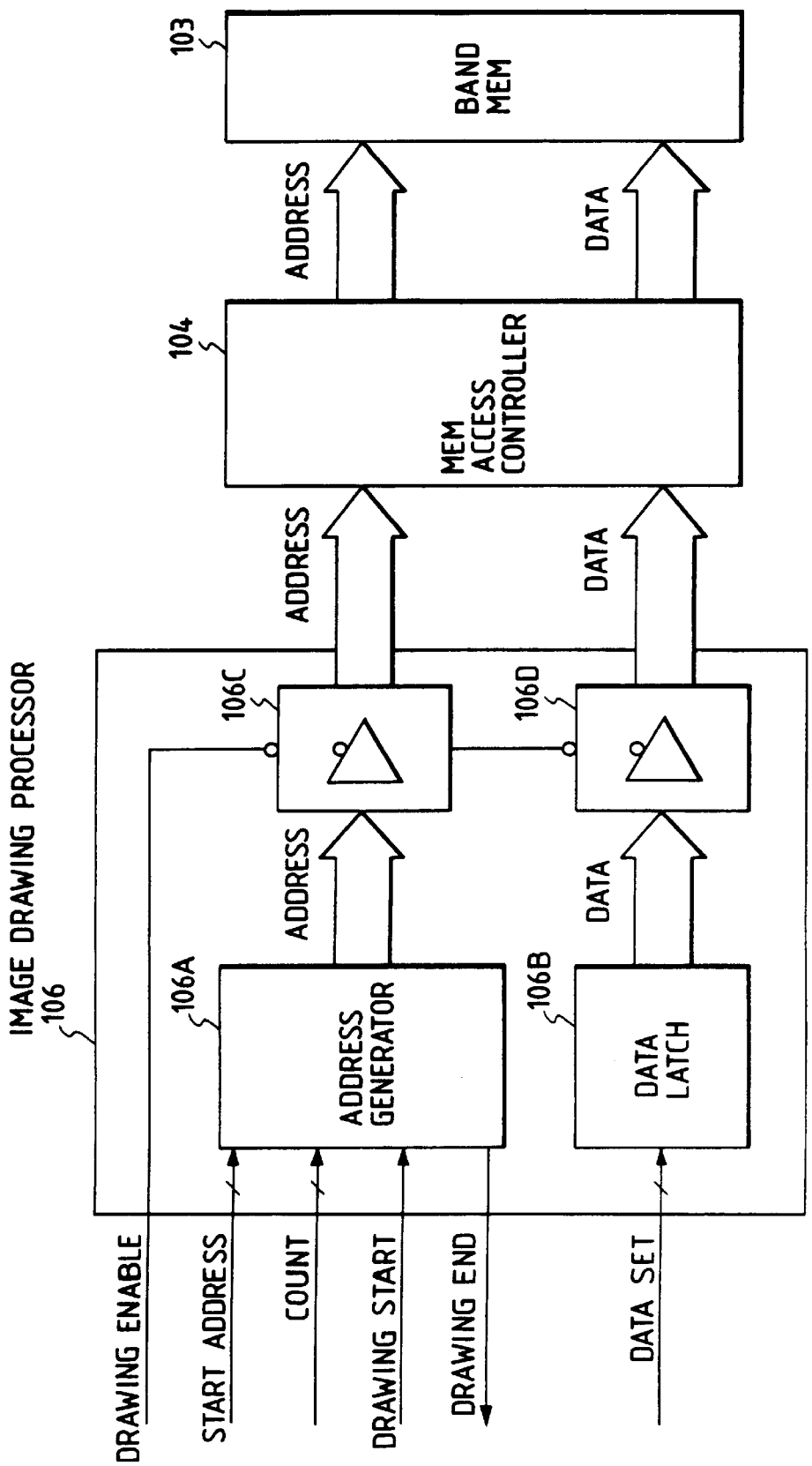
FIG. 8 is a block diagram illustrating a detailed structure of an image drawing processor circuit shown in FIG. 5.

FIG. 8 is a block diagram illustrating a detailed structure of the image drawing processor 106 shown in FIG. 5.

In the drawing, an address generator 106A delivers an address to be cleared to an address buffer 106C in response to a drawing start signal. A data latch 106B delivers a drawing data to a data buffer 106D.

In the board circuit constructed above, the CPU 101 instructs the image drawing processor 106 in view of the executed result by the PDL interprogram 84 when there exists drawing of lines or painting of drawings in the present band width.

The drawing data is firstly latched in the data latch 106B. Then, a start address and a count number (one line drawing volume) are set on the address generator 106A. The count number may be replaced by an end address. Next, the address buffer 106C and the data buffer 106D are enabled. In the contrary, the other access means to the band memory 103 are disabled. The CPU 101 delivers the drawing start signalto the address generator 106A. In response to that, the address generator 106A generates a series of sequential addresses from the start address value and the data latch 106B delivers its storing data to the band memory 103 through the memory controller 104.

When the counted number reaches to the predetermined number (end address), memory writing stops and the drawing end signal is delivered.

The memory writing will be restarted after the next start address and count number are determined and repeated up until the band is completely drawn.

The drawing operations are speeded up by employing hardware as the clearing operations are as well. Other structures can be employed wherein the specialized LSI undertakes the drawing procedure so that the supplemental operation of the CPU 101 is reduced.

In FIG. 4, the EPROM 107 in which above mentioned various programs for controlling the system are stored is firstly accessed by the CPU 101 when the power turns on.

There can be two methods for memorizing into the EPROM 107. The first method is to memorize in a manner that the programs can be executed as they are, whereas the second method is to compress and memorize the whole programs reversibly and to rearrange in the main memory 103 by expanding them when the power turns on.

The first method can save the main memory 102 then the method rearranging on the main memory 102 because the EPROM 107 can be executed without further ado. However, the first method has the shortcomings, that is, it requires much memory size of the EPROM 107 and an access time of the EPROM is relatively slow.

The second method can store a lot of programs in the EPROM 107 so that the memory size of the EPROM 107 can be reduced. And, since rearrangement is made on the main memory, an access time becomes relatively faster. However, it requires much memory size of the main memory 102.

In this embodiment, the second method is employed.

An EEPROM 108 is a device which does not loose the stored data even if the power turns off and can be rewritten data when the power turns on. Accordingly, it is well utilized for memorizing addresses on the network and for memorizing setting parameters of scanners and printers.

A time adjustable clock circuit (RTC) 109 is employed and time progresses even when the power turns off because it contains an internal battery, whereby real time can be known and utilized an information for scanning and printing. A timer 110 is an interval timer. Programs of the system are operated with a multi-program mode and its control is made by a real time OS.

The time 110 informs the CPU 101 of interval time with a few milliseconds.

Each programs are assigned to the CPU 101 in accordance with the timer 110 and a priority order scheduler.

A SCSI controller 111 controls a SCSI which is a standard for a peripheral device interface. A SCSI port 112 is a parallel input/output I/F port for connecting a peripheral device.

An Ethernet controller 113 connects the system with LAN 96, which is one of the network systems, and functions as a controller for data communications.

The Ethernet controller 113, in which a small buffer memory is incorporated, takes time matching between the nonsynchronous CPU and the synchronous network.

The data transferred from the network is stored in the buffer memory and the data to be transferred to the network is also delivered from the buffer memory.

The Ethernet controller 113 performs a control of electric timings and a control of data transmission and receipt. TCP/IP communication program 82 is controlled by the CPU 101 by utilizing the Ethernet controller 113.

The Ethernet 114 is made of a thick coaxial cable 114a, the interface I/F of which is constituted of a connector having 15 pins. The twist pain type port 114b is mode of four line medium, the interface I/F of which is constituted of a modular jack having 8 pins. These ports are utilized for connection with the Ethernetwork. An ADCT compression/expansion circuit 115 compresses or expands intermediate tone data (each color has 8 bit length) which are constituted of RGB (RED, GREEN, BLUE) by employing a JPEG algorithm standardized in CCITT.

In case of compression of color intermediate tone data read from a scanner, real video image data read from the scanner is compressed by the ADCT compression/expansion circuit 115 to reduce the memory size.

Accordingly, speed up of network transfer and reduction of stored memories can be realized.

The compressed video image data transferred through the network is expanded by the ADCT compression/expansion circuit 115 into color intermediate tone data and stored in the band memory 103. Then, they are transferred to a printer interface I/F to be printed by a printer device.

An FIFO memory 116 is used for transmitting or receiving compressed video image data to/from the ADCT compression/expansion circuit 115. The FIFO memory 116 is used for absorbing a data transfer timing gap due to data volume difference between compressed data and expanded data (real video image data) in compression and expansion operations.

An RS232C controller 117 controls a standard serial interface I/F. An RS232C port having two ports, A channel 118a and B channel 118b, has one port used for connecting terminal devices to display or to input data from a key board. Another port is used for connecting with a device having a serial interface, to which a character printer, like a laser beam printer, or a simple type scanner can be connected.

In this system, A channel is used for terminal devices and is used to receive command inputs or to change parameters. This system also employs a quasi terminal function in which a similar function of A channel can be achieved by making r-login from a host computer in the network.

Centronics I/F controller 119 performs and I/F control for connecting a printer with a modified Centronics type I/F.

If, in fact, outputs 8 bits data after confirming the status (BUSY/non) of a device to be connected. By repeating the above operation, data is delivered. The controller 119 performs other signal controls based on the modified Centronics I/F. Centronics I/F port 120 is electrically connected to a printer with a cable.

A VME controller 121 controls the CPU 101 of the system to access the other board having a modified VME bus standard. The VME bus standard permits address buses A16, A24, A32 and data buses D8, D16, D24, D32 be accessed. A bus usage right is given in accordance with an arbitration method. The circuit further realizes a control suitable for the VME bus standard.

A VME bus port 122 is electrically connected to a double height VME bus. The VME bus port 122 is constituted of two connector having 6 pins, among which an address bus and a data bus are disposed.

A reset switch 123 is finally depressed to restart the system when a system error occurred. Although the reset switch 123 is constituted of a hardware switch mechanism in this embodiment, a program RESET (warm RESET) can be employed which resets by using programs from a terminal connected to the above mentioned RS232C port 118 or a quasi terminal r-logged-in from the network.

An LED 124 is constituted of an LED 124a which indicates power ON, an LED 124b which indicates the CPU 101 is executing and an LED 124c which can be turned on by each program. An operator can visually confirm that the system is turned on when the LED 124a is turned on. An operator can also visually confirm that the CPU 101 is executing when the LED 124b is turned on and that the CPU 101 is waiting when the LED 124b is turned off. When the LED 124c turns on frequently, an operator can visually confirm that any procedure is currently executing. An operator can identify the program with which the LED is turned on by watching a duration time, a turning on interval and a turning on number.

A detailed description of a data flow will be made hereinafter under a process of a request for printing issued by a host computer in the network.

When the network, that is, the host computer connected with LAN 96 desires to print data, it transmits to a SP server system information designating the data and an output destination.

In this instance, when a hard disk is connected to the SCSI port, the data is temporarily stored (spooled) in the hard disk. When a hard disk is not connected, the data is temporarily stored in the main memory 102. Transferred data formats are shown hereunder as (1) to (3). (1) data with a PDL format, (2) data revealing a real video image and (3) data revealing a compressed video image.

In case of (1) the data with a PDL format, the PDL interpreter program 84 is activated and each band is expanded into a bit map which is written in the band memory 103. When the band memory fills the data, it transmit them to the printer and next band is expanded into a bit map.

In case of (2) the data revealing a real video image, the band memory 103 stores the data of each band width and transfers them to a designated printer. Then, the data of next band width is prepared. Since the data revealing a real video image contains much data volume, the host computer does not transfer all the data in the lump but transfer with being divided.

Accordingly, a job receiving the data from the network has been proceeded during the time of printing.

Further, in case of (3) the data revealing a compressed video image, the compressed video image data is stored in the FIFO memory 116 and converted by the ADCT expansion circuit 115 into a real video image data. The expanded data of each band width is stored in the band memory 103 and transferred to a designated printer. Hereinafter, the similar procedure will be repeated.

In some cases, the data format of video image data happens to be not a single format but a complexed format combining the above described data formats. In case of (1) data format and (2) data format or (1) data format and (3) data format both in combination the above described procedures are applied.

There are three cases in using an interface I/F of a printer device which transfers a video image data. The first case is to be connected through an interface board construct on the VME bus 122.

The second case is to be connected with the RS232C port 118. The third case is to be connected with the Centronics I/F port 120. The host computer determines its destination depending on which interface I/F connected to printers is used for printing.

Whenever the data of each band width in the band memory 103 is transferred the band clear controller 105 clears the memory. After that, the PDL expansion is again performed, with making the band width uniform, so that the data is transferred to an interface circuit designated by a printer and output at the printer under a control of an interface circuit (control board) by the device driver 86. The above procedures are repeated.

When a video image data is desired to be input from a scanner, the system receives from the host computer a designated information to activate the scanner and starts a video image input. There are two cases in using an interface I/F of a scanner device, one of which is to be connected through an I/F board constructed on the VME bus 122 and the other of which is to be connected with the RS232C port 118.

The above designation will be made by the host computer.

The video image data of each band width delivered from the scanner is stored in the band memory 103. In case that the video image data from the scanner is transferred to the designated host computer, the following two processings will be made depending on the scanner control program 85.

The first processing is to form a real video image data supplemented with a tag recording a video image information, and the second processing is to form a compressed video image data.

In case of the first processing, there are two methods; one of which is to transfer the data in the band memory 103 to a designated host computer consecutively through the network; the other of which to store the data temporarily in a hard disk connected with the SCSI port 112.

Either of both methods is chosen by the designated information from the host computer.

When a tag recording a video image information is supplemented, the data is transferred together with the tag.

In case of the second processing, the data in the band memory 103 is delivered to the ADCT compression circuit 115 so as to be compressed and the compressed data is written in the FIFO memory 116. Whenever the data is read out from the FIFO memory 116, it is transferred to the host computer and the next band data is processed repeatedly to obtain a compressed video image data. In case of using a hard disk, almost the same procedure, except temporarily storing the data in the hard disk, will be conducted.

Hereafter, referring to a circuit block diagram shown in FIG. 9, a detailed structure will be explained of the first SP interface circuit 4-1 shown in FIG. 1.

Figure 9:
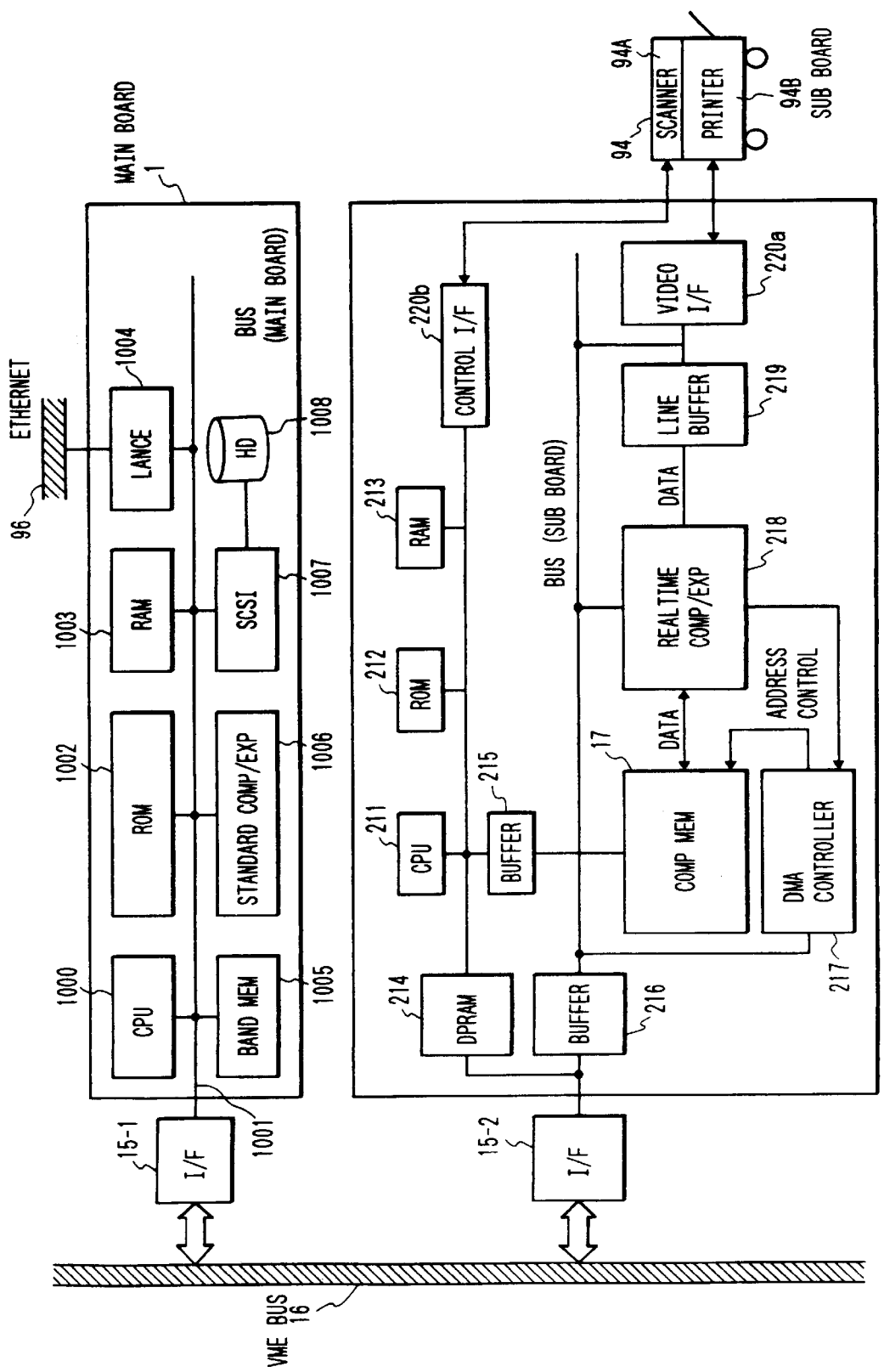
FIG. 9 is a block diagram illustrating an internal structure of the first interface circuit shown in FIG. 1.

FIG. 9 is a block diagram illustrating an internal structure of the first SP interface circuit 4-1 shown in FIG. 1. Identical elements shown in FIG. 1 bear the same reference numerals.

In the drawing, a CPU 1000 controls each device connected to an internal bus 1001 of the board circuit in response to the above mentioned various control programs stored in a ROM 1002. A RAM 10003 functions as, for example, a work memory of the CPU 1000. A network controller 1004 controls an access to a station connected to the LAN 96.

A band memory 1005 stores data of each band width. A standard COMP/EXP 1006 compresses and expands a video image data. A SCSI controller 1007 is connected with a hard disk 1008.

A CPU 211 which generally controls the first SP interface circuit 4-1 control each device connected to the board internal bus in response to control programs (supplemental programs for the device driver 86) stored in the ROM 212, makes initial setting of the necessary portions of the device and transacts commands with scanners and printers. A RAM 213 functions as, for example, a work memory of the CPU 211. A DPRAM 214 which transacts commands between the first SP interface circuit 4-1 and the board circuit is constructed such that both the CPU 211 and the CPU 1000 in the board circuit are mutually and independently accessed with each other through the VME bus 16.

Buffer memories 215, 216 are provided to avoid collision between the CPU 211 and the CPU 1000.

A real time COMP/EXP 218 is provided to compress and expand a multi-value video image data in real time.

Real time means to proceed with the same speed, for example, approximately 15 MHz (32 bits) with which a video image data is transacted, i.e., inputted through the video interface 220.

A COMP memory 17 stores data compressed by the real time COMP/EXP 218. A line buffer 219 is provided to preserve eight line data of a raster direction. The line buffer 219 can be randomly accessed by the real time COMP/EXP 218 applying with 8×8 matrix correspondingly to ADCT compression.

A DMA controller 217 transfers data between the COMP memory 17 and the real time COMP/EXP 218 without passing through the CPU 211.

A video interface 220a is provided to have an interface with a scanner 94A and a printer 94B. A reference numeral 220b denotes a control interface.

The first to the fourth mode procedures in response to the designated information from the host computer will be hereunder described in reference to FIG. 9.

Each mode procedure is performed by executing the control program 85 for image input device stored in the ROM 1002 and the device driver 86 stored in the ROM 212.

[The first mode procedure]

In the first mode procedure (video image print mode procedure) a real video image data stored in the band memory 1005 of the main CPU circuit 1 is received through the VME bus, compressed by the real time COMP/EXP 218, and stored temporarily in the COMP memory 17 as a form of compressed video image. This operation is performed with one page. When one page (one picture) is compressed, the printer 94B is actuated. The DMA controller 217 reads out the compressed video image data temporarily stored in the COMP memory 17 as a compressed video image and delivers it to the real time COMP/EXP 218. On this moment, it is restored into an unprocessed image data by the expansion circuit. The expanded unprocessed image data is consecutively transferred from the video interface 220 to the printer 94B. The video image expansion is performed in an ultra high speed synchronized with a data processing speed of the printer 94B.

In some cases, data is transferred to the printer 94B after the video image processing to perform the printer processing.

[The second mode procedure]

In the second mode procedure (video image scan mode procedure), a video image data received from the scanner 94A through the video interface 220a is compressed by the real time COMP/EXP 218 in an ultra high speed synchronized with its speed and the output compressed video image data is temporarily stored in the COMP memory 17. After the scan of one picture is completed, the CPU 1000 of the board circuit has the compressed video image data stored in the COMP memory 17 expanded again by using the expansion circuit of the real time COMP/EXP 218 to achieve the real video image data. The real video image data is transferred to the board circuit through the VME bus 16.

The board circuit transfers the real image data as it is to a designated host computer if the host computer is requesting it, and transfers the compressed video image data, which is achieved by compressing the real video image data, to the host computer if it is requested by the host computer.

[The third mode procedure]

In the third mode procedure (standard compressed video image print mode procedure), when the board circuit receives the compressed video image data from the host computer in the network, it transfers the compressed video image data as it is to a designated first SP interface circuit 4-1 without expanding. The first SP interface circuit 4-1 stores the compressed video image data in the COMP memory 17, activates the designated printer 94B, and expands the compressed video image data in synchronization with a printing speed of the printer 94B by using the real time COMP/EXP 218 in order to be printed.

[The fourth mode procedure]

In the fourth mode procedure (standard compressed video image scan mode procedure), a real video image data is compressed by the real time COMP/EXP 218 in an ultra high speed synchronized with a scanning speed of the scanner 94A and stored temporarily in the COMP memory 17. After the scan of one picture is completed, the CPU 1000 of the board circuit retrieves the compressed video image data as it is through the VME bus 16.

In the first and second mode procedures, since the first SP interface circuit 4-1 is interfaced with a real video image data, the standard compression/expression procedure which is necessary for video image communication is not always needed in the first SP interface circuit 4-1 so tat an independent compression/expansion procedure can be employed in accordance with a high speed demand or the other purposes.

In the second and fourth mode procedures, although the data read from the scanner 94A is directly compressed, it is not restricted for the real time COMP/EXP 218 to compress the data achieved by applying video image processing such as a line density conversion, a color space conversion, etc. to the data read from the scanner.

The video image processing means may be disposed between the video image COMP/EXP and the scanner 94A/printer 94B. The video image COMP/EXP may also be disposed in the scanner 94A/printer 94B.

The structure and the function of the real time COMP/EXP 218 will be explained hereunder referring to a block diagram shown in FIG. 10.

Figure 10:
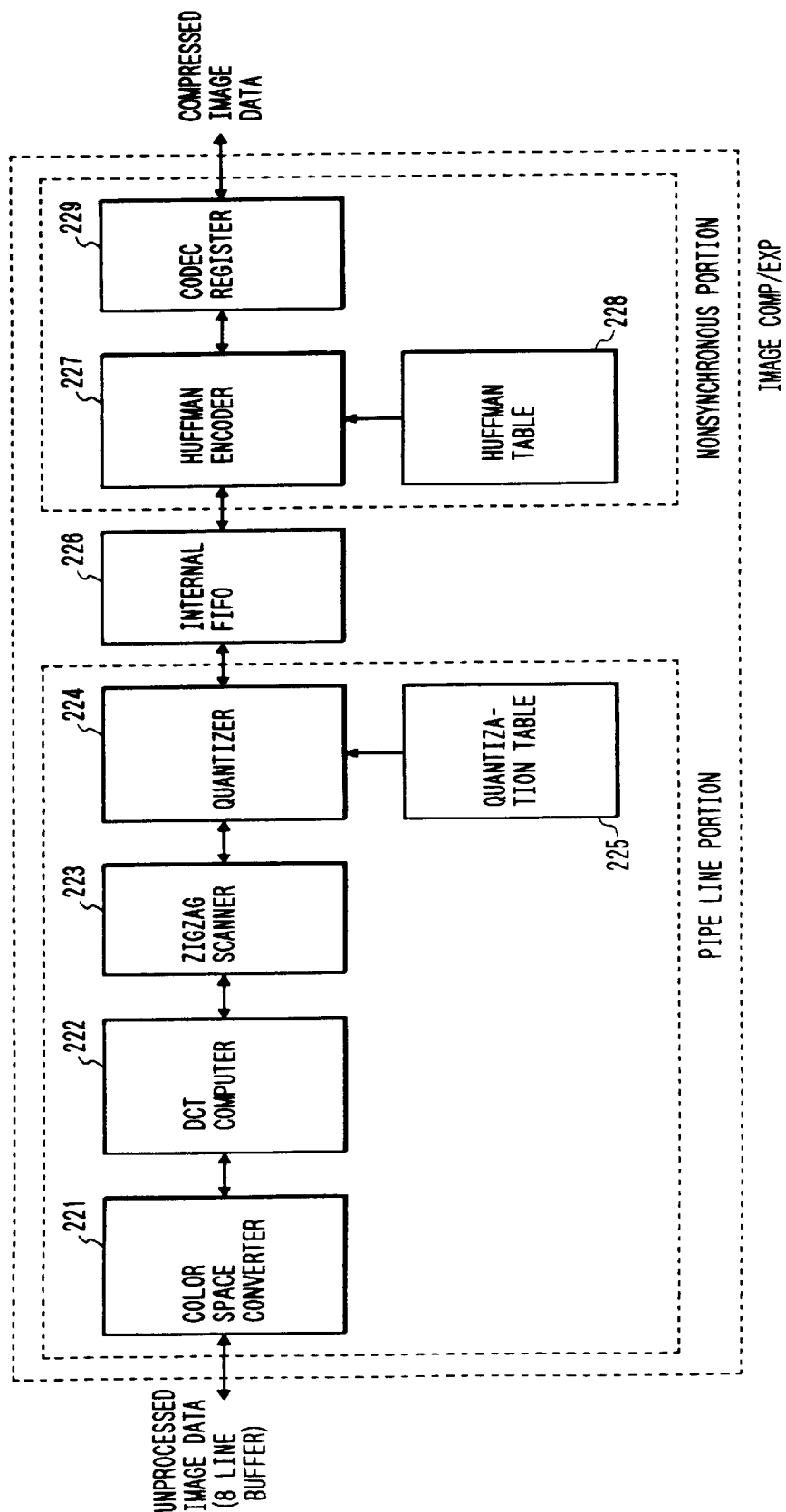
FIG. 10 is a block diagram illustrating an example of a detailed structure of a real time Compression/Expansion circuit shown in FIG. 9.

FIG. 10 is a block diagram illustrating a detailed construction of the real time COMP/EXP 218 shown in FIG. 9. An ADCT method is, in particular, employed as a compression/expansion method in the embodiment.

Figure 11:
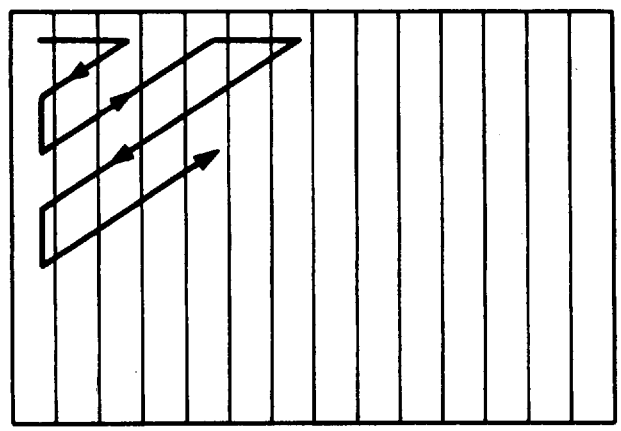
FIG. 11 is a view illustrating an example of a zigzag scan path made by a zigzag scanner shown in FIG. 10.

In a data compression, a real video image data is firstly stored in an external line buffer 219 and transferred to a color space converter 221 in which RGB data is converted into a color space data having Y, Cr, Cb data. In some cases, Cr, Cb data is sub-sampled as color difference components to discard the redundancy of the video image. Each of 8×8 picture elements is converted on a frequency space by a DCT computer 222. Then, as shown in FIG. 11, a DCT coefficient is scanned by a zigzag scanner 223 and quantized by a quantizer 224.

On this moment, a quantization coefficient which corresponds to 8×8 DCT coefficient has been stored in a quantization table 225. The compressed video image data, which is made by codifying data temporarily stored in an internal FIFO memory 226 in a predetermining timing referring to a Huffman table 228 by a Huffman encoder 227, is stored in a CODEC register 229 which can be accessed by an external host computer.

The color space converter 221, the DCT computer 222, the zigzag scanner 223, the quantizer 224 and the quantization table 225 constitute a pipe line operational block operable at a high speed in synchronization with a timing clock. The Huffman encoder 227, the Huffman table 228 and the CODEC register 229 constitute a non-synchronous operational block operable at a not high but compatible speed with those of CPU and DMA in synchronization with a speed at which the external CPU accessed the CODEC register 229. The pipe line operational block is constructed in such a manner to be able to operate at a high speed so that it can follow a video image transfer clock of the scanner 94A/printer 94B.

Accordingly, the internal FIFO memory 226 serves an operational speed buffer between the synchronous pipe line operational block and the non-synchronous operational block.

If the compression ratio is reduced to improve the image quality, compressed data will increase, the amount of data to be processed by the nonsynchronous operating part will increase and the operating speed of the nonsynchronous operating part will be insufficient for processing. However, in processed image data interface of the color space connecter 221 can be connected to the portions other than the scanner 94A and the printer 94B and a nonsynchronous access from the CPU or the like can be received by a FIFO memory which is externally provided. In this case, the pipeline operating part can be operated at a low speed or temporarily stopped. Therefore, there will be no problem in the operating speed of the nonsynchronous operating part.

In this embodiment, a plurality of image compression/expansion parts (for example, two parts) are provided to divide unprocessed image data into a plurality of data blocks and supply these data blocks to the image compression/expansion parts, respectively, thus enabling connection to the scanner and the printer which operate at high speeds. As in compression of a plurality of image data divided as described above, the problem of the operating speed can be similarly solved.

Operation for expansion is bascially a reverse process to compression and, when compressed image data is transferred to the CODEC register, the image data is reversely Huffman-coded or decoded in the Huffman encoding part 227 while referring to the Huffman table 228. The values obtained are inversely quantized in the quantizer 224 after having been speed-controlled in the FIFO memory 226. Inverse quantization is carried out by multiplying the values by a quantizing coefficient 8×8 of the quantizing table 225. Image data is zigzag-scanned by the zigzag scanner 223 and transferred DCT coefficient to the DCT computer 222. Then the image data is returned from Y, Cr, Cb and the like which are compressed color spaces to original RGB space or the like in the color space converter 221.

The DCT computer 222 processes DCT computation and inverse DCT computation in the same circuit only by changing parameters. Also in the color space converter 221, linear transformation can be similarly carried out by converting parameters.

In addition, the quantizer 224 carries out division for quantization and multiplication for reverse quantization. In this case, division is a kind of multiplication if the quantizing coefficient for division serves as a reciprocal and therefore compression and expansion can be done in the same circuit. The following describes in detail the operations of respective modes of the first SP interface circuit 4-1 as an example while referring to FIGS. 12 to 15.

Figure 12:
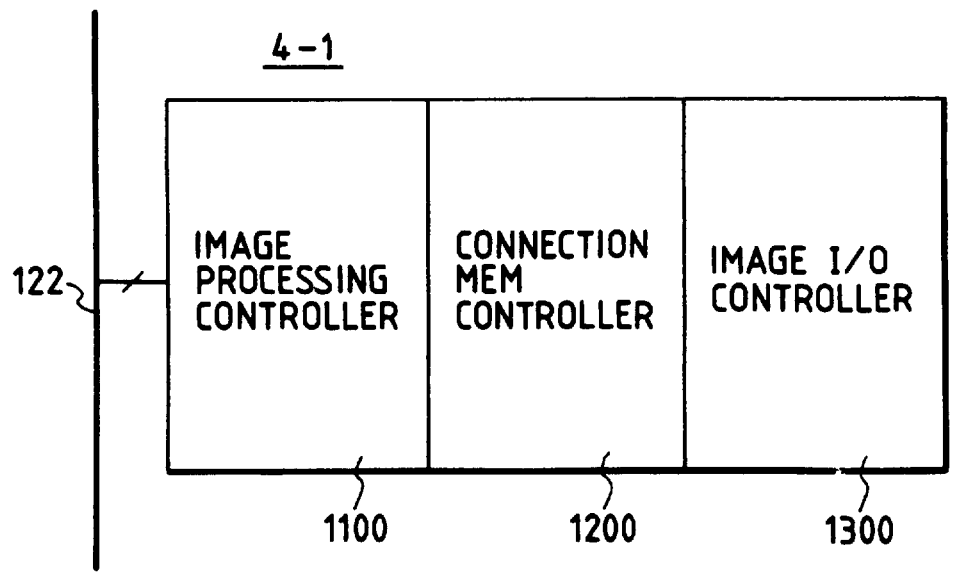
FIG. 12 is a block diagram illustrating a partial schematic structure of the first SP interface circuit shown in FIG. 1.

FIG. 12 is a block diagram illustrating an outline of the partial configuration of the first SP interface circuit 4-1.

Figure 13:
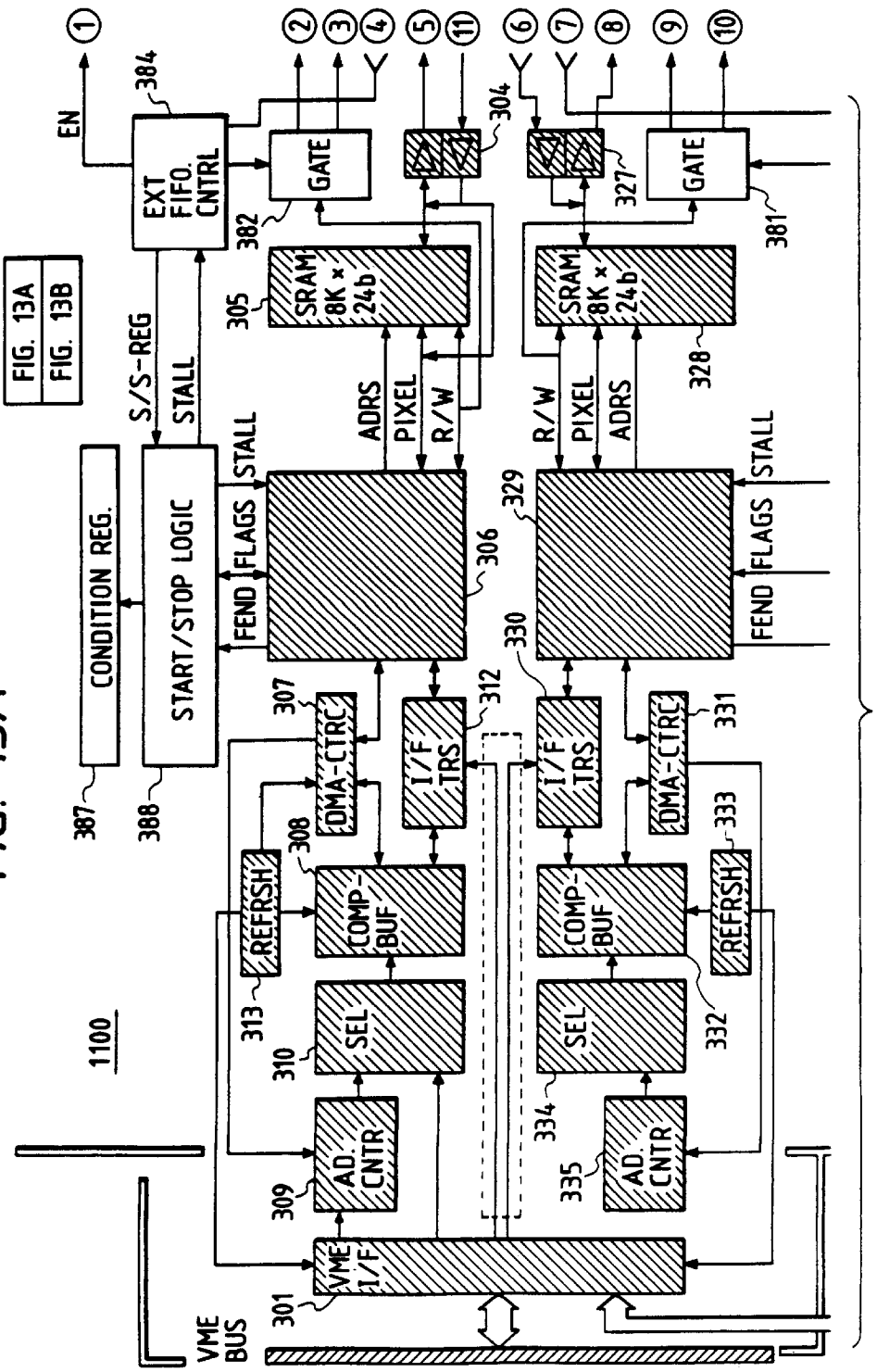
FIG. 13 is comprised of FIGS. 13A and 13B showing circuit diagrams illustrating a detailed internal structure of the first SP interface circuit shown in FIG. 1.
Figure 13B:
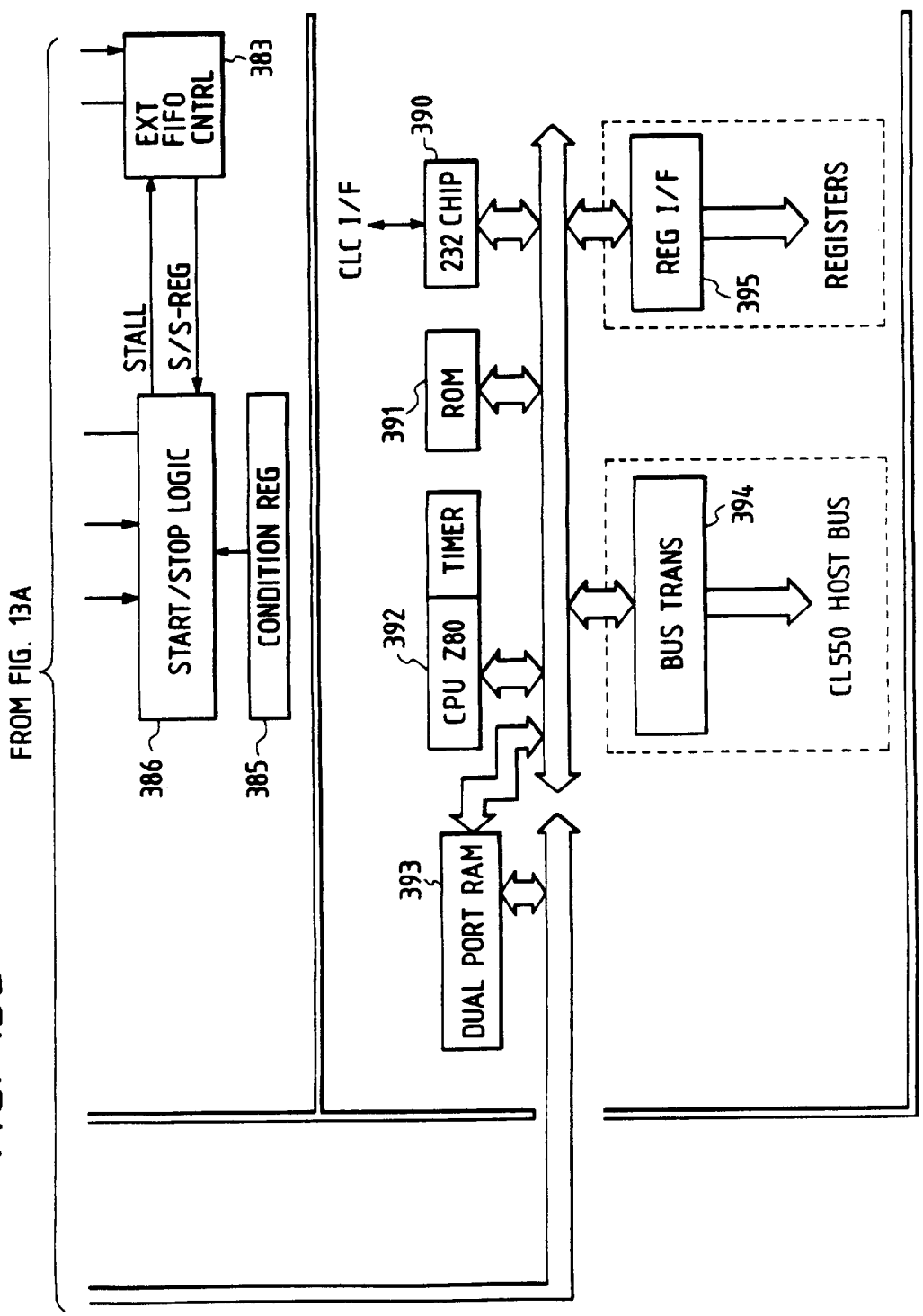
Figure 14:
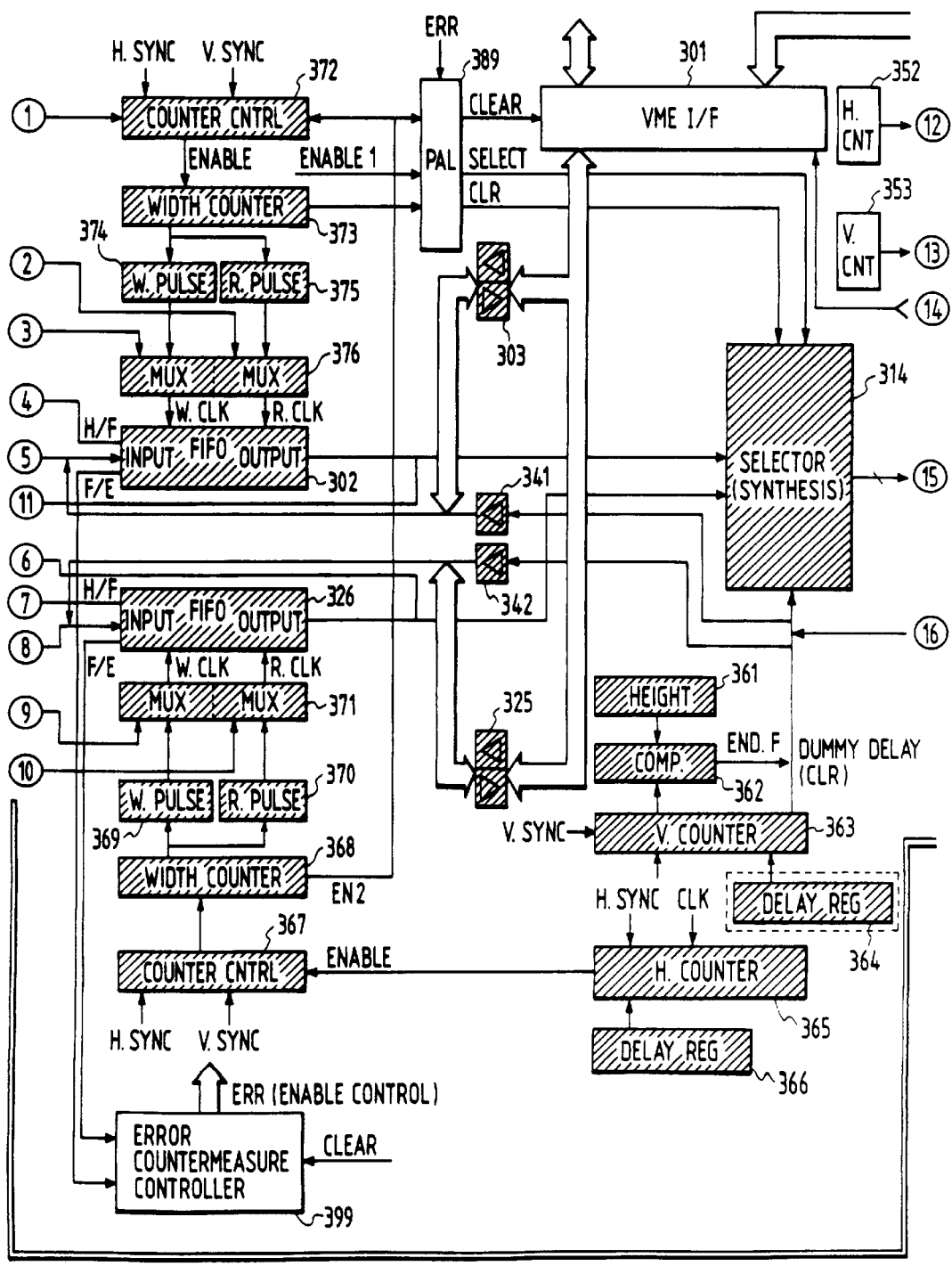
FIG. 14 is a circuit diagram illustrating a detailed internal structure of the first SP interface circuit shown in FIG. 1.
Figure 15:
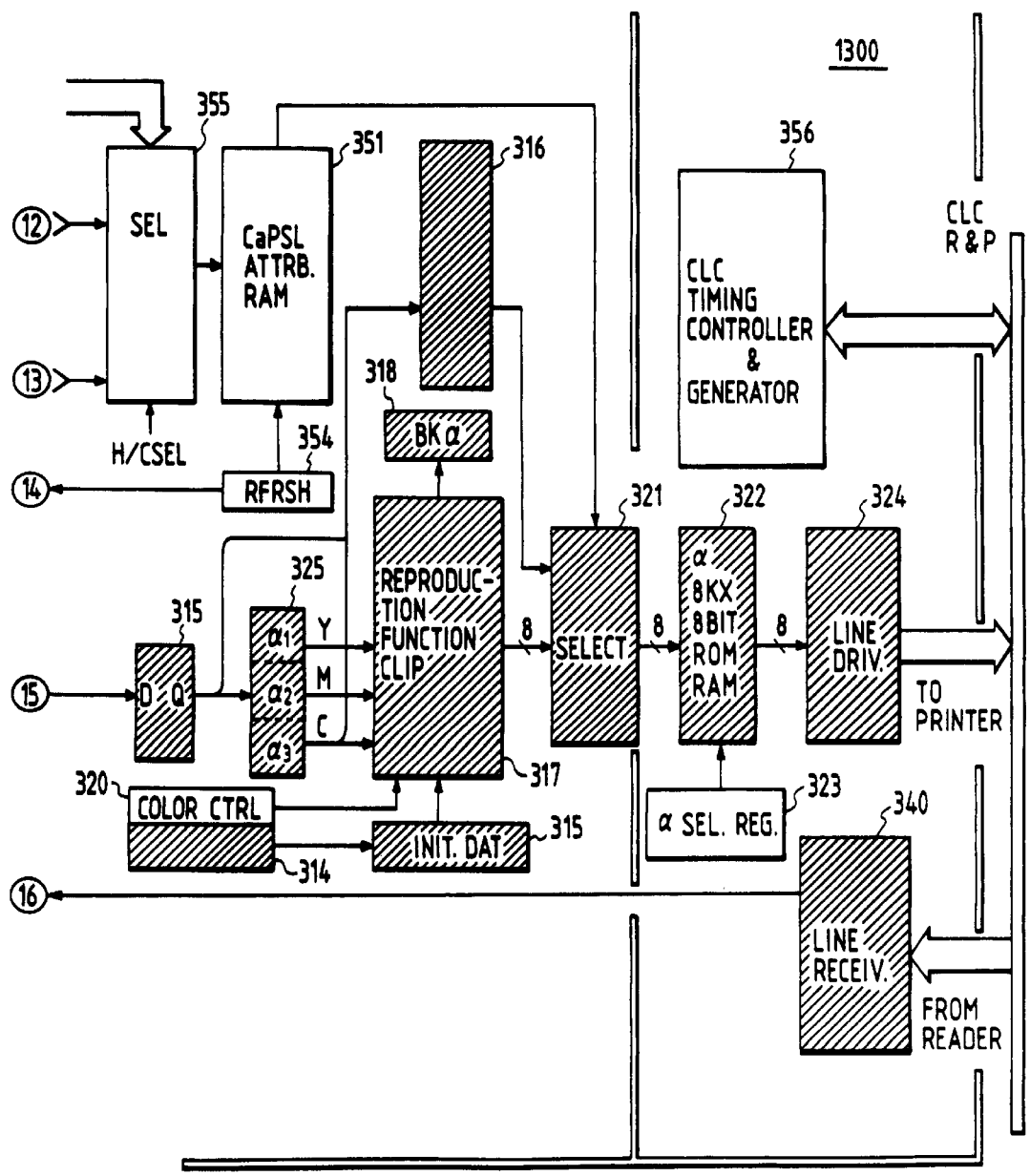
FIG. 15 is a circuit diagram illustrating a detailed internal structure of the first SP interface circuit shown in FIG. 1.

In FIG. 12, 1100 is an image processing controller which comprises a VME bus interface, image compression/expansion part and a CPU circuit. The details are shown later in FIGS. 13A and 13B. 1200 is a connection memory controller whose details are shown later in FIG. 14. 1300 is an image I/O controller which controls I/O operation to/from the scanner, the color laser copier (CCLC) provided with a printer, scanner and the thermal jet color copier (BJC) with a printer. The details are shown later in FIG. 15.

FIGS. 13A to 15 are respectively a block circuit diagram illustrating the detailed interval configuration of the first SP interface circuit 4-1 shown in FIG. 1 and the same components as in FIG. 1 are given the same reference number.

In processing of the right-side data frame of a two-divided image from the CPU 1000 of the board circuit shown in FIG. 9, image data is written from the VME interface 301 into the FIFO memory 302 through the buffer 303. Image data is temporarily stored from the FIFO memory 302 into the RAM 305 through the buffer 304. The SRAM 305 operates synchronized with the pipe line part of the image compression/expansion part. When the data as much as 8 lines in the vertical direction of the image are stored in the RAM 305, the image compression/expansion part 306 reads every horizontal and vertical 8×8 units from the SRAM 305 and the compressed data obtained are sequentially written into the DRAM 308 through the DMA controller 307. At this time, the DMA controller 307 operates the address counter 309 to generate an address or counts up the address to give it to the DRAM 308 through the selector 310. In the third mode, the CPU 1000 of the board circuit issues the address through the VME interface 301 and the selector 310 and up dates the data in conjunction with the DRAM 308 through the interface converter 312. Accordingly, the compressed data can be directly sent to the DRAM 308 and standard compressed data for which the image is not divided into two portions can be processed. However, such processing is unsuitable for those data of a low compression ratio.

The DRAM 308 is always refreshed by the refresh circuit 313 and the data is maintained. The following describes the operation for outputting the data of the DRAM 308 to the printer 94B. When data is read out from the DRAM 308 to the compression/expansion part 306 in the same control as in the write operation by the DMA controller 307, unprocessed data from the buffer 304 and output data from the FIFO memory are supplied to the latch 315 since one of right and left frames of the image is selected by the selector.

Next, the image data is gamma converted or LOG-converted by the gamma converter. Then, masking for CG is carried out by the masking circuit 316 and masking for a natural image is carried out by the masking circuit 317, and one of these masked images is selected by the selector 321 in accordance with the nature of the image. Finally, the image is converted by the output gamma controller 322 and outputted to the printer 94B through the line driver. In this case, the output gamma controller 322 is controlled by the gamma setting register 323. The masking circuit 316 comprises a ROM and the masking circuit 317 is a logic circuit to which a black table for generating the black color is connected and a timing controller 320 is connected to its periphery so that a value of the initial data ROM 319 may be initially loaded. If the printer 94B is for the plane sequential system, expansion is carried out as many times as the number of planes and the masking circuits 316 and 317 perform masking in response to the output color.

The above describes the processing flow for the right side frame of a frame which is divided into two parts and the same processing flow is carried out for the left-side frame. In other words, 8-line image data stored in the SRAM 328 through the buffer 325, FIFO memory 302 and the buffer 327 is compressed in the image expansion part 329 and controlled by the DMA controller 331, address controller 335 and selector 334 and written as compressed data in the DRAM 332. As a matter of course, the CPU 1000 of the board circuit can directly write compressed data through the VME interface 311 to the selector 334 and the interface converter 330. A refresh circuit 333 refreshes and maintains the data of the DRAM 332. In printing an image, the data read out from the DRAM 332 is controlled by the control 331 of the DMA controller 331, expanded by the image compression/expansion part 339, supplied to the selector 314 through the SRAM 328, buffer 327 and FIFO memory 326 and outputted after having been processed as described above. The processing of mode 1 is carried out as described above.

The following describes the processing of the second mode below.

Image data which are transmitted from the scanner 94A after various image processings are received by the line receiver, and the right-side frame of the image is stored through the buffer 341 and the left-side frame, through the buffer 342 into FIFO memories 303 and 326 in sequence. Subsequent operations are the same as in the first mode. In other words, the processing of the right-side frame is such that, of image data written into the FIFO memory 302, those image data as much as eight lines are read out and stored in the SRAM 305 through the buffer 304, then compressed data is generated in the DRAM 308 by the compression/expansion part 306.

On the other hand, in the fourth mode, the CPU 1000 of the board circuit is able to directly read compressed image data through the VME interface 311, interface converter 312 and selector 310. In the second mode, however, compressed data of the DRAM 308 is expanded and transferred to the CPU 1000 of the board circuit. Compressed image data from the DRAM 308, which have been controlled through the interface converter 312 DMA controller 307, address counter 309 and selector 310 and read out in the sequence of write, are expanded in the image compression, expansion part 306, written into the SRAM 305 in terms of 8×8 unit, continuously read out in the horizontal direction through the buffer 304 at a timing when all data for eight lines are written and stored in the FIFO memory 302. Image data of the FIFO memory 302 is read out as unprocessed image data to the CPU 1000 of the board circuit through the buffer 303 and the VME interface 301 in accordance with the timing of the CPU 1000 of the board circuit.

The selector 321 is controlled to select one of two masking circuits 316 and 317 according to the data which is obtained by generating the addresses of positions of pixels to be processed by a horizontal direction counter 352 and a vertical direction counter 353 in response to the attribute of the image as to the CC image or the natural image which is stored in the RAM 351, stored in the RAM 351 through the selector 355 and read out for such selection. Therefore, the attribute of the image is stored in advance on the RAM 351. The interface between the scanner 94A and the printer 94B is controlled by the S/P timing controller 356.

The following describes the changeover of the right and left-side frames of the image.

A vertical direction counter 363 is for transmitting effective image signals of an effective portion of an image in the vertical direction and a delay register 364 is for setting a margin portion of the top end of the image. A length register 361 is used to set an effective length of the image and sends effective image signals to respective corresponding portions if the length of the image is within the effective length in a comparator 362. A delay-register 366 is for setting a margin length in the horizontal direction in addition to the effective image range in the vertical direction is connected to generate an effective signal after the left end of the image is counted. The counter controller 367 starts a horizontal left width counter 368 when the above effective signal is received. This horizontal left width counter 368 functions as a down counter to count the width of the image and generates an enable signal of the left-side image during counting. When the counting of the left-side image is finished, the counter 368 generates an enable signal to the counter controller 372, which counts the width of the right-side image at its width counter 373 and gives the information of completion to the controller 389. The controller 389 informs the selector 314 of the end of the effective image width and clears the output. The width counter 368 causes the light pulse generator 369 to generate the signal of the effective width of the left-side image in compression, writes the scanner data of the left-side image in the FIFO memory 326 through the multiplexer 371, and supplies the read pulse of the compression/ expansion part 329 through the gate 381 and the multiplexer 371.

For expansion of image data, the read pulse generator 370 receives the effective signal of the left-side image from the width counter 368 and outputs from the FIFO memory 326 to the printer 94B through the multiplexer 371.

On the other hand, a write pulse of the image compression/expansion part 329 is supplied to the multiplexer 371 through the write pulse gate 381 and expanded data is written.

For the right-side image, of course, the write pulse generator 374, read pulse generator 375, multiplexer 376 and gate 382 similarly operate as described above. In the image compression/expansion part 329, the status of the interval FIFO memory 302 is given to a start/stop logic 386 and the status of a register 385 for detecting the peripheral status is given to the start/stop logic 386. In addition, the status of the external FIFO memory 326 is given to the start/stop logic 386 through the FIFO memory controller 383 to enable to control the internal FIFO memory 302 and the external FIFO memory 326 so that an overflow or underflow does not occur therefrom and stop or start the pipe line 329 of the image compression/expansion in accordance with the situation.

Similarly, the pipeline of the compression/expansion part 306 is controlled to start or stop by the status register 387, start/stop logic 386 and FIFO controller 384. In start/stop operations, the internal FIFO memory 302 may overflow due to excessively high transmission rate of the pipeline at the time of compression, the internal FIFO memory 302 may underflow due to excessively high transmission rate of the pipeline at the time of expansion, the external FIFO memory 326 may underflow due to excessively high processing speed of the image compression/expansion part at the time of compression, and the external FIFO memory 326 may overflow due to excessively high processing speed of the image compression/expansion part at the time of expansion.

Since the external FIFO memory 326 and the internal FIFO memory 302 overflow or underflow when the processing speed of the image compression expansion part 306 delays due to excessively high operating speed of the scanner 94A and the printer 94B, the counter error controller 399 temporarily stops video signals (video=image) at the scanner 94A and the printer 94B. Simple error processing is carried out so that video signals in the unit of one line are abandoned from the scanner 94A and margin data in the unit of one line is outputted from the printer 94B to prevent of the flow of video signals from destruction due to the overflow or underflow from the FIFO memory. Accordingly, when the counter error controller transfers error information to the controller 388, the controller 389 checks a margin of one line and effective parts of left-side image and right-side image and outputs an error cancel signal at the delimitation of one line, while the controller 389 indicates other related parts to clear input/output data of the scanner 94A and the printer 94B and enables the image compression/expansion part 306 to carry out compression or expansion up to the delimiting point of one horizontal line despite that the image compression/expansion part 306 operates behind the processing of the scanner 94A and the printer 94B during processing of the error. This permits error resetting again at the delimitation of one line. However, for compression, the white line is compressed during error processing to accelerate the compression speed and, for expansion, image data is abandoned because it cannot be sent in time to the printer 94B.

Though the above description states that the CPU 1000 of the board circuit carries out almost all controls, the first SP interface circuit 4-1 according to this embodiment is provided with an internal CPU 392 which is capable of sharing the processing which can be handled in the first SP interface circuit 4-1. The first SP interface circuit 4-1 is also provided with a dual-part RAM 393 both parts of which are connected to the CPU 1000 of the board circuit through the XEM bus interface 311 and the internal CPU 392 through the internal CPU bus. Information is thus communicated to the CPU 1000 of the board circuit and the internal CPU 392 through this dual-port RAM 393.

Therefore the accesses from these CPU 1000 and CPU 392 to the VME bus in the first SP interface circuit 4-1 will not come in collision. In this case, the image compression/ expansion parts 306 and 329 are interfaced by a bus convertor 394 connected to the internal bus of the CPU 392. The bus converter 394 has the same functions as the interface converters 312 and 330 to interface with the registers in the board through a register interface 395 and has also the function as the interface for the VEM bus.

In addition, the internal CPU bus has a ROM 391 for storing the programs of the CPU 392 and a serial communication part 390. A command for controlling the operation in conjunction with the scanner 94A and the printer 94B is sent to the serial communication part 390. Accordingly this embodiment is adapted so that the CPU 1000 of the board circuit shown in FIG. 9 controls the scanner 94A and the printer 94B through the internal CPU 392 shown in FIGS. 13A and 13B or directly controls the scanner 94A and the printer 94B. Control commands for the CPU 1000 include an activation command for the scanner 94A and the printer 94B as well as a status detection command and a status setting command as execution commands. The status detection commands are intended to detect the presence of print sheet, presence and size of the cassette, remaining amount of toner, and jamming of print sheet as well as current operation mode, that is, distinction of monochrome, three colors or four colors, resolution, and other parameters for image processing as to the printer 94B. These commands are almost identical to the scanner 94A, enabling to know the pressure of the original on the original rest plate and wire break of a lamp.

On the other hand, the status setting command are intended to set the parameters for the image processing system such as selection of a cassette size, selection of an upper or lower stage of the cassette, operation mode, the number of print sheets and so on.

For the scanner 94A, the status setting commands similarly cover, for example, setting of the variation and magnification, setting of binary 1 multi-valued system, standard color space conversion, specific color space conversion, precision (resolution conversion), setting of area designation, and setting of gamma conversion.

In this embodiment, the scanner 94A has many image processing functions and therefore the image data is not processed on the first SP interface circuit 4-1 and is compressed. In addition, RGB data is received from the scanner 94A.

On the other hand, the input to the printer 94B is CMYK input, and masking, gamma conversion, LOG conversion and CMYK generation are processed on the first SP interface circuit 4-1 since the printer section is not provided with so many functions for image processing.

Figure 16:
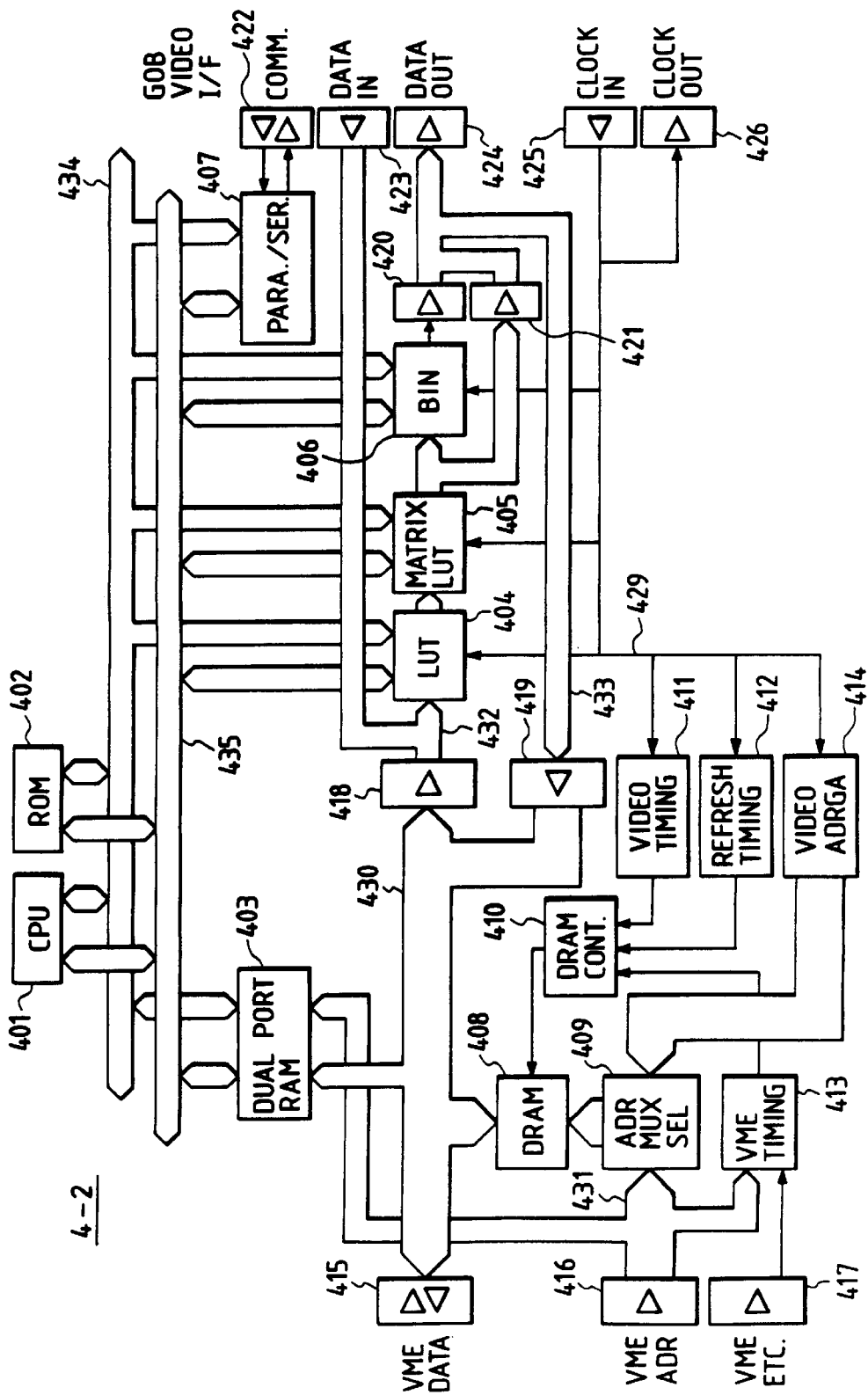
FIG. 16 is a circuit diagram illustrating a detailed internal structure of the second SP interface circuit shown in FIG. 1.

FIG. 16 is a block diagram illustrating a detailed configuration of the second SP interface circuit 4-2 shown in FIG. 1 and this second SP interface circuit 4-2 interfaces a thermal jet type scanner printer 95 (printer 95B and scanner 95A) and an S/P server unit SPI. The second SP interface circuit 4-2 is formed as an integrated interface board.

In FIG. 16, a CPU 401 receives a command from the board circuit connected to the VEM bus through the dual port RAM 403, interprets the command and internally controls the second SP interface circuit 4-2. The CPU 401 generates an interrupt of every 2 m seconds from the built-in interval timer and communicates a command to the thermal jet type printer 95B and the scanner 95A. The CPU 401 initializes and changes various parameters for image processing circuits 404, 405 and 406.

A ROM 402 for programming stores a control program (a program which supplements the device driver 86) to be executed by the CPU 401 and the initial values and the preset values of image processing circuits 404, 405 and 406.

A dual port RAM 403 functions as a work area for the CPU 401 and accesses to both the CPU 1000 of the board circuit and the CPU 401 to execute communications between these CPUS.

The image processing circuit 404 is formed as an image processing ASIC to carry out graduation conversion according to the lookup table. For example, the image processing part 404 performs LOG conversion when converting RGB data to CMYK DATA. This can be implemented by providing in advance a conversion table in the ROM 402 and transferring it to the RAM in the image processing circuit 404.

The image processing circuit 405 is formed as an image processing ASIC and carries out graduation conversion according to 4×5 matrix operation and a lookup table. This circuit 405 carries out NTSC-RGB color space conversion as the RGB spaces and the standard color space of the characteristics of the sensor of the scanner 95A, or conversion (referred to as masking) from CMY(K) after conversion by the image processing circuit 404 to CMYK adjusted to the characteristics of the printer 95B through this matrix operation. In addition, color balance can be adjusted by the lookup table. These processings are set by preparing various tables, storing these tables in the ROM and selecting the tables in accordance with the application as in the case of the image processing circuit 404.

The image processing circuit 406 is formed as an image processing ASIC to carry out a binary-coding processing. The binary coding algorithm used in this embodiment is an average density preserving method. A serial/parallel converter 407 converts 8-bit parallel data from the CPU 401 to serial data for communications to the scanner 95A and the printer 95B.

A DRAM 408 for images is an image memory adapted to the type of band adjusted to the number of pixels of the head of the printer 95. In the scanner 95A or the printer 95B, data flows according to the clock signals for images during one scanning and the operation cannot be stopped and therefore a buffering for the size of one band is requires. Therefore, the image data as much as are band to be scanned by the scanner 95A and printed by the printer 95B are buffered.

A scanning system is converted between a raster type access from the VME bus side and a vertical access from the printer 95B.

An address selector 409 for the DRAM which serves as a multiplexer changes over the address for the access from the VEM bus to the DRAM 408 and the access from the scanner 95A and the printer 95B to the DRAM 408. The address to the DRAM 408 is supplied as being divided to a ROW address and a COLUMN address and the DRAM 408 carries out this multiplexing.

A timing controller 410 for the DRAM generates the signals for controlling DRAM such as RAS, CAS, WE and OE and carries out arbitration with refresh signals.

A timing circuit 411 generates a timing signal for accessing of the scanner 95A and the printer 95B. This circuit serves to generate the access timing based on a image clock and a sync signal from the scanner 95A and the printer 95B.

A refresh timing controller 412 generates a timing signal for a refresh signal to the DRAM 408. This controller utilizes an interval between the accesses by the scanner 95A and the printer 95B and controls to avoid collision of accesses of the scanner 95A and the printer 95B.

A VME timing controller 413 processes the control signals for accessing from the VME bus, including decoding of AM codes and high order addresses and interrupts.

An access address generator 414 for the scanner 95A and the printer 95B generates an address for specific access for the scanner 95A and the printer 95B to the memory contents written in the raster system for accessing from the VME bus since the accesses of the scanner 95A and the printer 95B differ from an ordinary raster system. The scanning direction is reversed in accordance with the size of band.

A VME bus interface buffer 415 accesses image data in a 32-bit width and commands in a 8-bit width.

A VME bus interface address buffer 416 accesses image data in a 24-bit address space and commands in a 16-bit address space.

A buffer 417 serves as a buffer for the parts other than the data and addresses of the VME bus interface.

A buffer 418 for an entry port to the image processing part carries out accessing from the VME bus and accessing to the DRAM in a 32-bit width. In the image processing part, processing is carried out in a 8-bit width. Therefore, 32-bit R, G, B and X data is serially converted to 8-bit data in order.

A buffer 419 for an exit of the image processing part, contrary to the buffer 418, carries out conversion of the data line of 8-bit width which varies in the sequence of colors to 32-bit wide data of four colors totally.

A buffer 420 for use after binary coding processing functions to expand one-bit data which is binary-coded by the image processing circuit 406 to 8-bit data, that is "0" to "0×00" and "1" to "0×FF".

A buffer 421 is used for bypassing binary coding processing by the image processing circuit 406, and one of outputs of the buffer 420 and the buffer 421 is selected to change over binary-coded data to multi-valued data.

A buffer 422 of the communications part is for interfacing the scanner 95A and the printer 95B.

A buffer 423 for input data is for interfacing the scanner 95A and the printer 95B.

A buffer 424 for output data is for interfacing the scanner 95A and the printer 95B.

An input buffer 425 for clock and control signals is for interfacing the scanner 95A and the printer 95B.

An output buffer 426 for clock and control signals is for interfacing the scanner 95A and the printer 95B. 429 is a clock input line.

430 is a 32-bit image data bus, 431 is a 24-bit address bus, 432 is a 8-bit image data bus, 433 is a 8-bit image data bus, 434 is a 16-bit local address bus, and 435 is a 8-bit local data bus. The following describes the operation of the printer 95B.

[Operation for Printing]

When various parameters for printing are written into the dual-port RAM 403 from the board circuit through the VME bus, the CPU 401 reads out the data and interprets and control it. For example, for printing RGB data, the CPU 401 sets a table with a through-operating characteristic which does not cause LUT data of the image processing circuit 404 to change, sets the coefficients for conversion from NTSC-RGB to 13J-RGB in the coefficient table for the matrix of the image processing circuit 405, and controls the gates of buffers 420 and 421 so as to pass through the binary coding processing of the image processing circuit 406.

In addition, parameters for data sizes are set. Parameters such as data sizes are sent to the printer 95B through the parallel/serial converter 407. Then, image data as much as one band is transferred from the board circuit to the memory 408 through the VME bus. At this time, image data from the VME bus is stored in the RGBX data format by 32-bit accessing. R, G and B are respectively image data for color components of red, green and blue, and X is control data including information of block characters. Next, a command for printing operation is transferred through the dual-port RAM 403. The CPU 401 transmits a start command for printing operation. When the start signal returns from the printer controller of the printer 95B, a timing pulse generator 411 starts accessing to the memory 408. In this case, the data is read out in a direction along the BJ head of the printer 95B and therefore the data is read out according to an address generated by the address generator 414. Data read out from the memory 408 is converted to 8-bit data in the order of R, G, B and X in the buffer 418 and entered into the image processing part. The image is processed in accordance with the predetermined parameters, and NTSC-RGB data is converted to RGB color spaces to be internally used in the printer 95B and transferred to the printer 95B through the buffer 421 and the interface 424. When the processing of one-band data is finished, next band data is received through the VME bus and the above described operation is repeated. Processing of one page data is completed after the predetermined number of times of processing. The following describes reading operation of the original by the scanner 95A according to a control program stored in the ROM 402.

[Operation in Scanning]

Various parameters for scanning operation are written from the board circuit into the dual-port RAM 403 through the VME bus. The read and interprets the data and carries out the control. For example, when binary-coded RGB data is scanned in the size of 1024×1024 at the position of 512×512, the CPU 401 sets a table with a through-operating characteristic in the LUT of the image processing circuit 404 and the coefficients for conversion from BJ-RGB to NTSC-RGB in the matrix coefficient table of the image processing circuit 406 and controls the gates of buffers 420 and 421 so as to pass through binary coding processing of the image processing circuit 406. In addition, a size of the image to be scanned is set to 1024×1024 and the scan start position is set to 512×512. These parameters are transferred to the scanner 95A through the parallel/serial converter 407. Then the CPU 401 transmits a scan start command to the scanner 95A. Image data entered from the reader part of the scanner 95A is entered into image processing circuits 404, 405 and 406 through the interface 423. Here image processing is carried out according to the predetermined parameters and 32-bit format RGBX data is stored in the memory 408 through the buffer 419. At this time, the memory 408 stores RGBX data as described above. In this example, the scanner 95A is set to scan binary-coded RGB image data and therefore X is meaning less data. Though R, G and B color components are binary-coded data. One byte is assigned to one pixel. In this case, the board circuit carrier out a processing for which data is processed in a common format requested for binary-coded image data, for example, by packing bytes to arrange RGB data in the order of raster lines. Image data stored in the memory 408 is transferred to the board circuit through the VME bus interface 415. One scanning operation is completed by repeating the above processing as many times as the number of bands.

The following describes image data processing by the scanner 94A and the printer 95B shown in FIG. 1.

In this embodiment, the color image copier is formed integral with the scanner 94A and the printer 94B and therefore only one system for image processing function is provided. If the scanner 94A and the printer 94B are separated, the system configuration includes only one of them for each processing. In addition, the scanner is provided with almost all image processing functions, and the printer 94B mainly has those functions such as variation of magnification, designation of area, color space conversion, gamma conversion, and color masking processing.

Since the scanner 94A is provided with the color space converter and the color masking processor, standard RGB (RGB for NTSC, etc.) is prepared as the mouth of the video interface and RGB data can be obtained in point sequential or parallel simultaneous scanning. Accordingly, the image data should be given as C, M, Y and K data to the printer 94B because the printer is not provided with the image processing part. Image data should be transmitted to the video interface after such image processing as conversion to C, M and Y, black color generation (K), color masking, resolution conversion and trimming have been externally finished as required. Moreover, in this case, image data should be transmitted by repeating the processing four times for C, M, Y and K colors in plane sequential scanning. In addition, both the scanner 94A and the printer 94B cannot be stopped during processing.

On the other hand, the video interface includes the horizontal sync signal, vertical sync signal and video clock signal for synchronization with video data. Moreover, status information such as ON/OFF of the power supply for the scanner and the printer are provided to enable to externally check the status. A function for command interface in serial communications is provided to permit detection and setting of the status of the scanner 94A and the printer 94B and generation of execution commands such as for activating the scanner and the printer.

Figure 17:
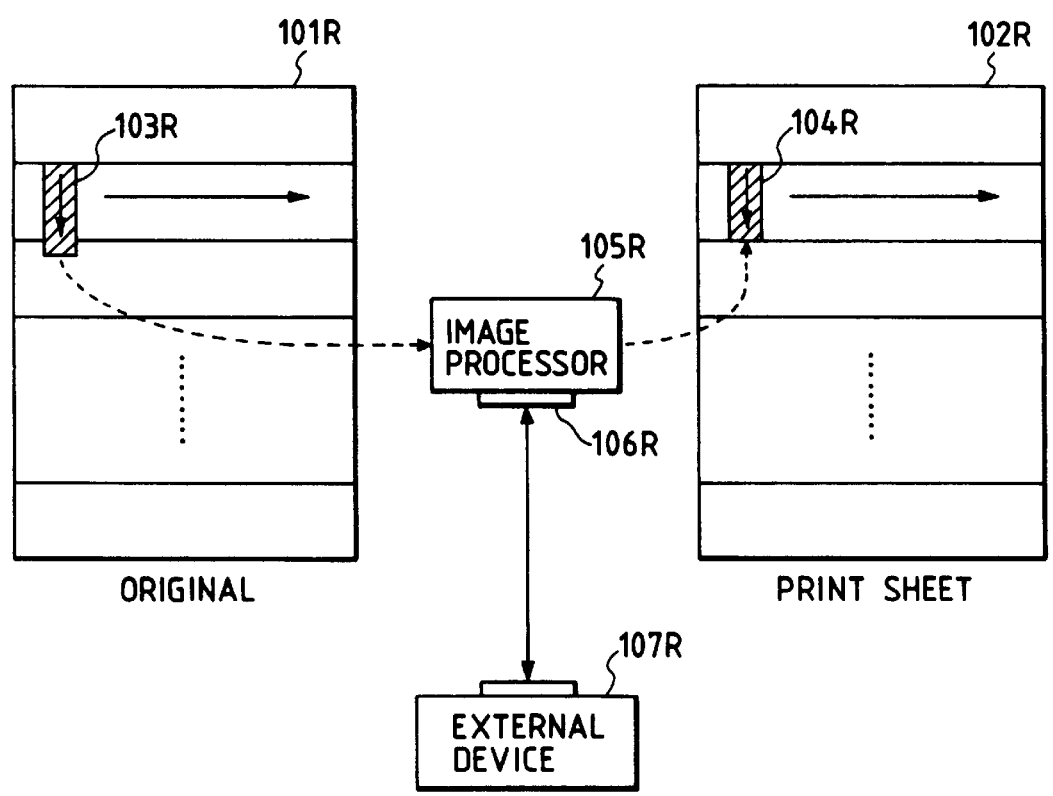
FIG. 17 is an explanatory view illustrating an image recording process of a scanner/printer shown in FIGS. 2A and 2B.

The following further describes the operation of the scanner 95A and the printer 95B, referring to FIGS. 17 and 18.

FIG. 17 is a typical diagram illustrating the image recording process of the scanner/printer 95 shown in FIGS. 2A and 2B.

In FIG. 17, 101R denotes an original to be scanned and 102R denotes a print sheet for printing. These original and the print sheet are of the A4 size. 103R denotes the sensor head of the scanner and 104R denotes the print head of the printer. The print head 104R of the printer is provided with an array of nozzles from which ink is injected by the bubble jet system and comprises, for example, nozzles 108.

On the other hand, the sensor can output data of, for example, 144 pixels so that more pixels than 128 can be scanned. For colors, the sensor head of the scanner has the scanning segments for three colors R, G and B and the printer head has the printing segments for four colors C, M, Y and K. 105R denotes the image processing part which processes RGB signals entered from the scanner sensor and transmits them as binary-coded CMYK signals with the characteristics adapted to the printer head.

The image processing part 105R can transfer 8-bit RGB color data from the interface 106R on the way of the image processing system to external sources. In the scanner/printer 95, the sensor of the scanner 95A and the printer head of the printer 95B operates in synchronization, and the image processing part 105R has a pipeline arrangement to make it possible to carry out processing without requiring a large capacity image memory. Therefore, the scanning method for data to be transferred through the interface 105R is of a specific type. 107R denotes external equipment.

Figure 18A:
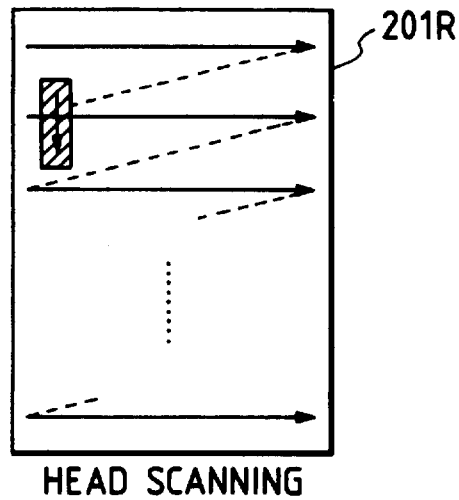
FIGS. 18A to 18C are explanatory views illustrating a document scanning operation of a scanner/printer shown in FIGS. 2A and 2B.
Figure 18B:
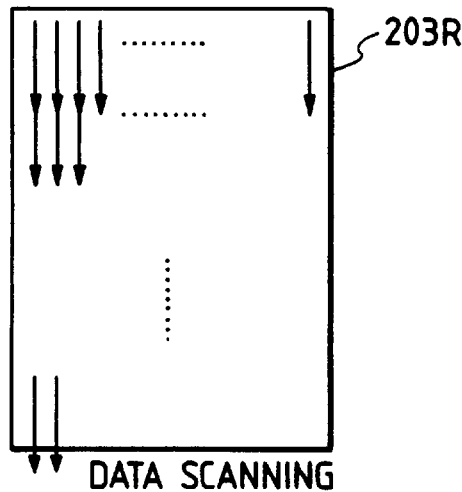
Figure 18C:
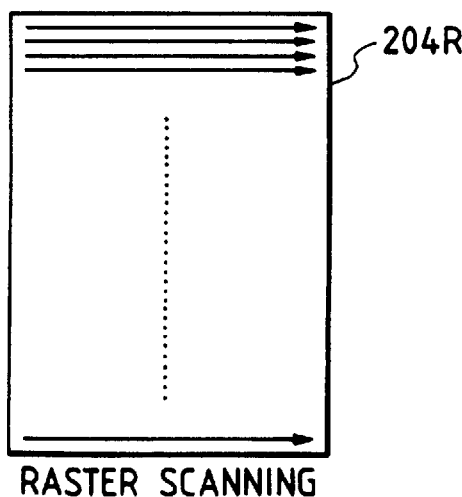

FIGS. 18A to 18C are typical diagrams illustrating the scanning status of the original by the scanner 95A of the scanner/printer 95 shown in FIGS. 2A and 2B.

In FIGS. 18A to 18C, 201R shows a motion of the sensor head of the scanner. The sensor head itself moves in a transversal direction main scanning direction) as shown for the original (print sheet) and the pixel segments of the sensor are arranged at right angles to this direction. Therefore data 203R is aligned to 201R. On the other hand, data is aligned as data 204R in general raster scanning systems.

Figures 19, 20:
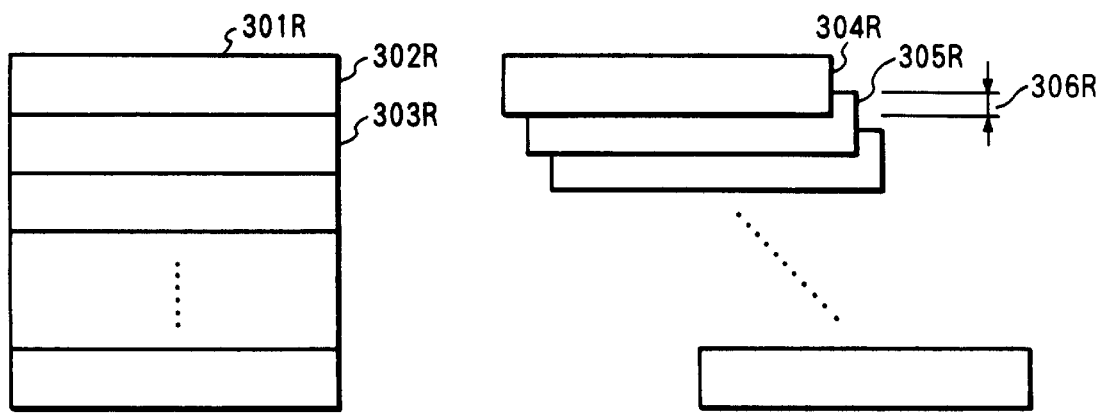
FIG. 19 is an explanatory view illustrating a band document scanning operation of a scanner/printer shown in FIGS. 2A and 2B.
FIG. 20 is a view illustrating an example of an interface signal between a server device according to the present invention and a printer.

FIG. 19 is a typical diagram illustrating the status of scanning of a band original by the scanner 95A of the scanner/printer 95 shown in FIGS. 2A and 2B.

In FIG. 19, 301R denotes one page, 302R denotes the first segment and the 303R denotes the second segment. In the case of the image data which is outputted from the scanner sensor and will be binary-coded through the image processing system, the segment 304R scans a larger image than for the segment 305R and the image as far as 306R is doubly scanned.

The following describes an example of the printer capable of using the Centronics interface software which can be controlled by the S/P server unit shown in this embodiment. The Centronics interface is the standard software for transfer of data from a computer to a printer developed by Centronics, Inc. in the United States, permitting inexpensive and high speed data transfer. Almost all printer are standardized according to this Centronics system.

Data transfer according to the Centronics software is carried out through three control lines for DATASTROBE signal, ACKNOWLEDGE (ACK) signal and BUSY signal and the DATA line as shown in FIG. 20.

The DATASTROBE signal indicates that data is outputted to the DATA line. The BUSY signal indicates that the printer is currently operating and the data cannot be received or that the data buffer is fully occupied.

The ACK signal indicates that reading of data is correctly completed.

Though the above three control lines are basically sufficient, the signal line for warning NO PRINT SHEET is also defined for proper control of the printer. In FIG. 20, the signal name, input/output and remarks are shown. Since the pin number varies as 36 pins, 25 pins and 14 pins, depending on the types of connectors and the definitions differ with manufacturers or deleted in some cases, the pin numbers are omitted.

Figure 21:
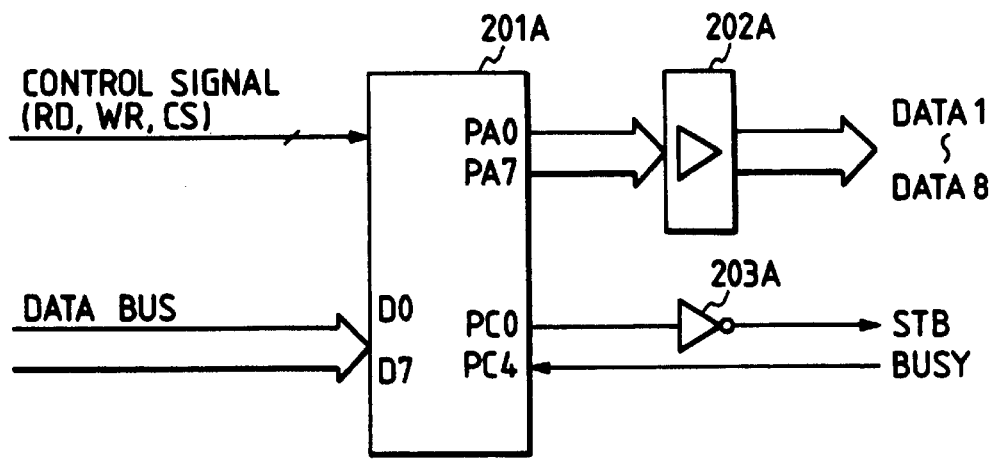
FIG. 21 is a circuit diagram illustrating an example of an interface between a server device according to the present invention and a printer.

FIG. 21 is a block diagram showing an example of the Centronics I/F control circuit.

Figure 22:
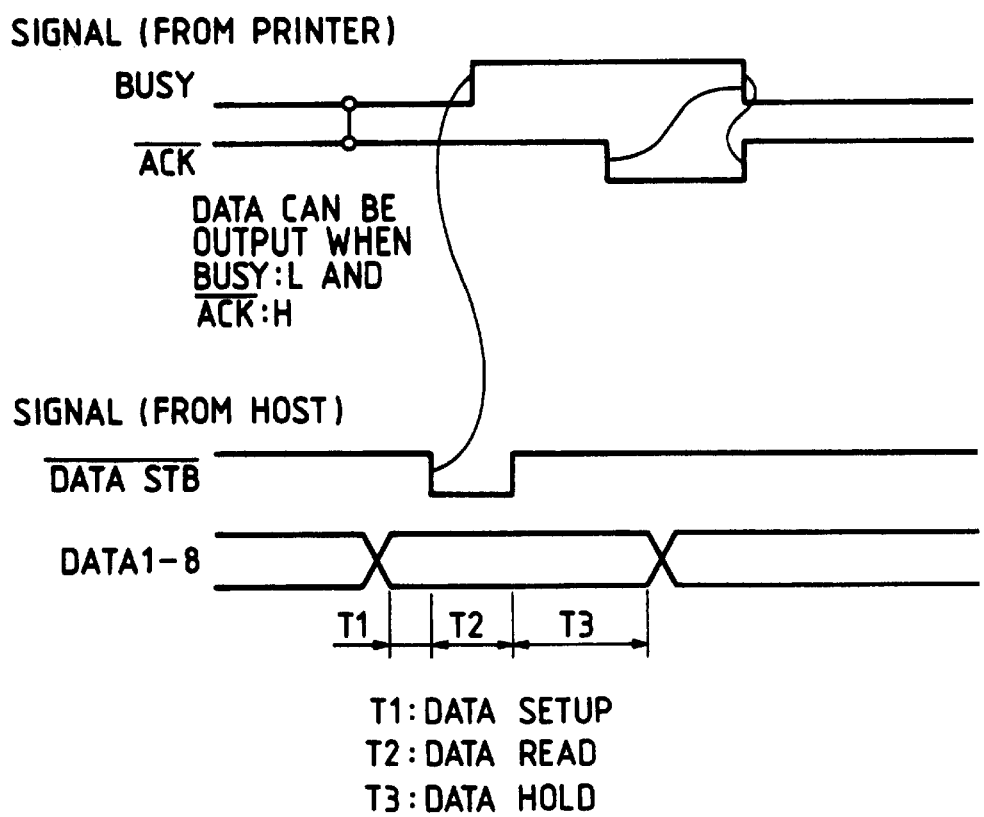
FIG. 22 is a timing chart illustrating an operation of the circuit shown in FIG. 21.

In FIG. 21, a Centronics I/F control circuit 201 is provided with the data buffer 202A and the control line buffer 203A, and data is processed according to the timing chart shown in FIG. 22.

Figure 23:
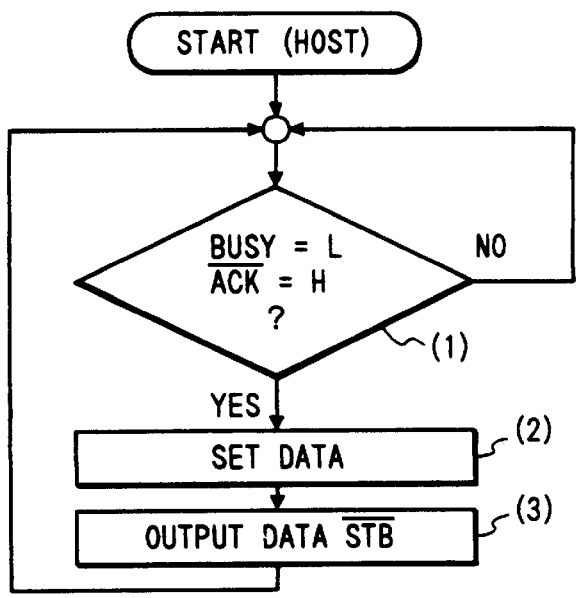
FIG. 23 is a flowchart illustrating an example of a signal processing procedure in a host of a Centronics I/F circuit shown in FIG. 21.

FIG. 23 is a flow chart showing an example of signal processing procedure between the host computer and the printer by the Centronics I/F control circuit shown in FIG. 21. (1)–(3) denote the steps of the procedure, particularly corresponding to the processing in the host computer.

When the BUSY signal is "L" and the ACK signal is "H" (1), data is set (2), the DATASTROBE signal is outputted (3) and the operation is returned to step (1).

Figure 24:
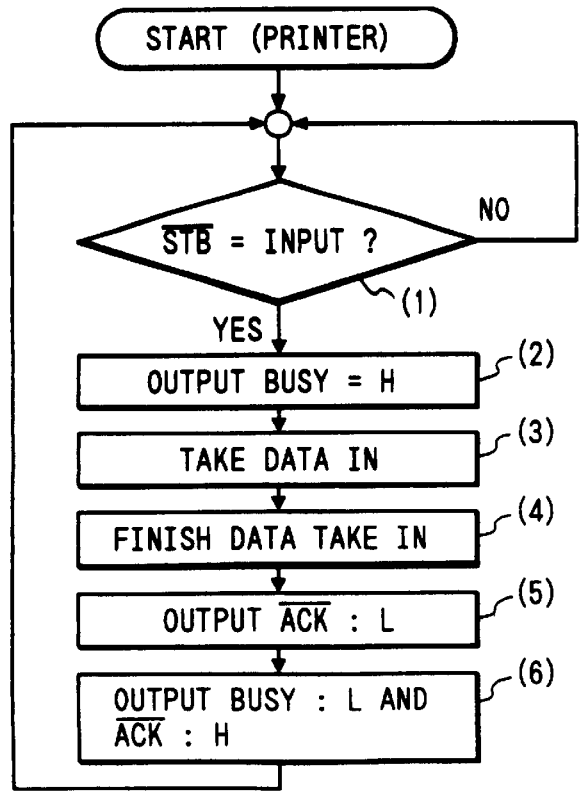
FIG. 24 is a flowchart illustrating an example of a signal processing procedure in a printer of a Centronics I/F circuit shown in FIG. 21.

FIG. 24 is a flow chart showing an example of signal processing procedure between the host computer and the printer by the Centronics I/F control circuit shown in FIG. 21. (1)–(6) denote the steps of the procedure, particularly corresponding to the processing in the printer adapted to the Centronics standard.

The BUSY signal is "L" (1), then the BUSY signal is set to "H" (2), and data fetching from the data bus is started (3). Subsequently, data fetching is finished (4), the ACK signal is set to "L" (5), the BUSY signal is set to "L" and the ACK signal to "H" (6), and the operation returns to step (1). Data transfer is carried out as described above.

In most cases, the Centronics printer is controlled by a method for which "ESC" (0×1B) is affixed to the top of a command and data. For example, for transferring data to a printer, a command is sent as ESC (A COUNT COLOR DATA. (1B 28 41 COUNT COLOR DATA).

In this case, "ESC (A" is a control code. "COUNT" is the number of data. "COLOR" defines the color spaces such as RGB and CMY. "DATA" is color image data. The printer performs printing by continuously transmitting such data commands as described above. The control codes and configuration differ with the printer manufacturers. However, the control methods using "ESC" are relatively identical.

This system allows to use various Centronics printers by connecting the Centronics printer to the Centronics port and supporting the control codes with a software program.

Figure 25:
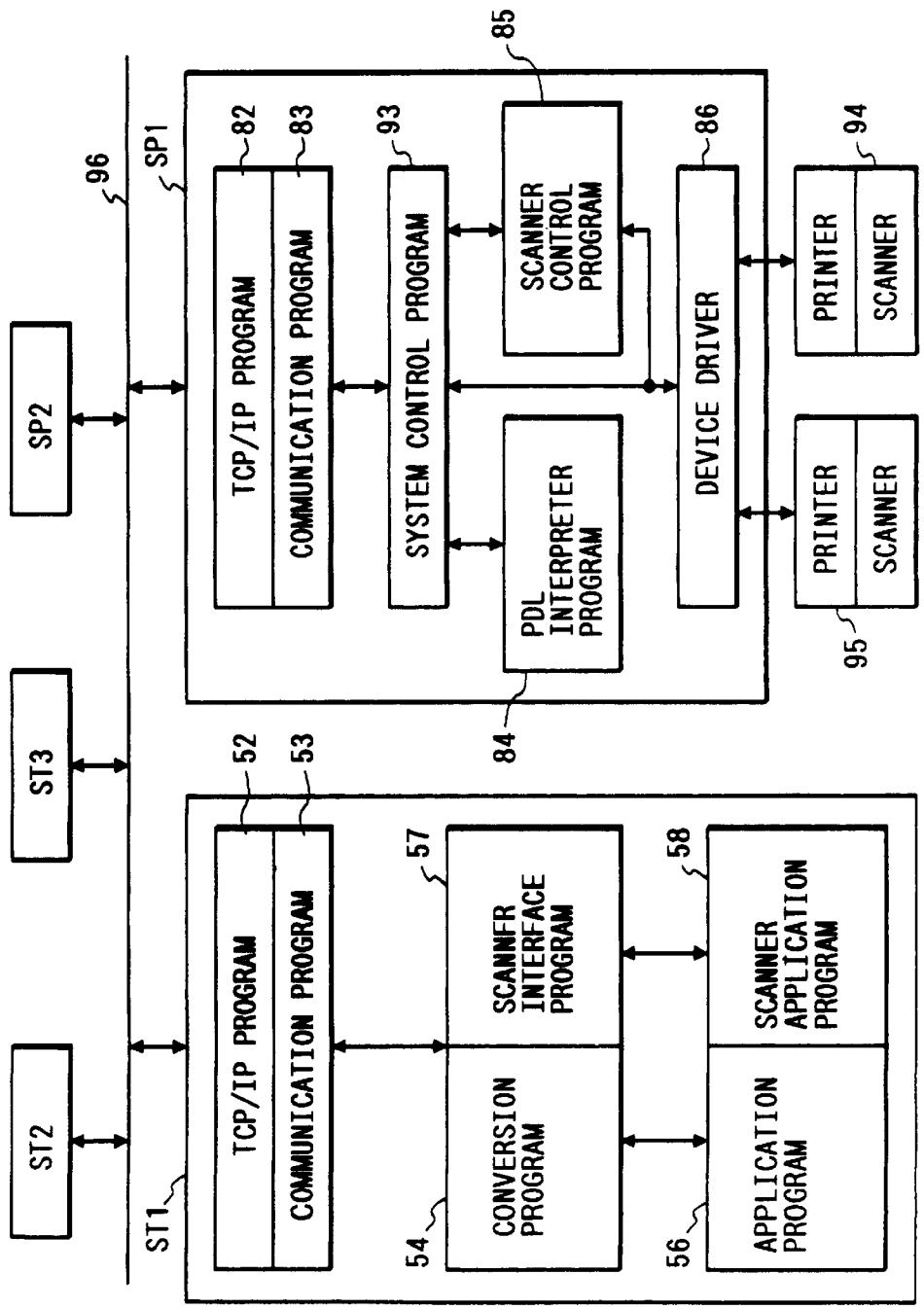
FIG. 25 is a view illustrating a program structure between a server device according to the present invention and a host computer.

FIG. 25 illustrates a program structure of the scanner printer server (network server) SP1 and the host computer in accordance with the present invention. The following briefly describes the overall flow of the system. The same components as in FIGS. 2A and 2B are given the same reference numbers and symbols. The host computer as an example shown in FIG. 25 is the Macintosh station ST1 and can be the station ST2 or ST3 or others.

When the operator for the host computer (station) selects and designates a desired scanner printer network server, printer, size of print sheet, and data format to be transferred to print the print data prepared by using the application program 56, the application program 56 transmits the data (including instructive information) to the conversion program 54. The conversion program 54 converts the data sent by the application program 56 to a data structure which can be accepted by the selected network server SP1 and transmits it to the communications program 53 and the TCP/IP program 52. For example, the Macintosh station ST1 converts QuickDraw data to CaPSL data and the IBM station ST2 converts GDI data to CaPSL data.

The communications program 53 transmits the data transferred from the conversion program 54 to the network server SP1 through the TCP/IP program, and the communications program 83 of the network server SP1 receives the data through the TCP/IP program 82 and transmits it to the overall system control program 93. The overall system control program 93 analyzes the data transferred and carried out the following processing according to the status of the network server at that time and the data transferred.

The overall system control program 93 sends print data to the PDL interpreter program 84. The PDL interpreter program 84 receives print data and converts it to data which can be accepted by the designated printer (for example, the printer of the scanner/printer 95). For example, the data is converted from PDL data such as Postscript (trade name) and CaPSL to the image data. The overall system control program 93 transfers the data converted by the PDL interpreter program 84 to the device driver 86 which serves as the image I/O unit control program and the device driver 86 transfers the data to the designated printer for printing.

When the operator for the host computer ST1 selects and designates a desired scanner printer network server, scanner, image area, resolution, multi-color or mono-color, type of compression for entry of image data by using the scanner application program 58, the scanner application program 58 transmits data to the communications program 53 through the scanner interface program 57. The communications program 53 transmits the data transferred through the scanner interface program 57 to the network server SP1 designated through the TCP/IP program, the communications program 83 of the network server SP1 receives the data through the TCP/IP program 82 and transmits the data to the overall system control program 93. The overall system control program 93 sends the entered selection and designation commands (image input commands) to the scanner control program 85, the scanner control program 85 sends the commands to the device drive 86 which serves as the image I/O unit control program according to the commands, and the device driver activates the designated scanner (for example, the scanner of the scanner printer 95) and transfers the image data to the scanner control program 85. The scanner control program 85 transfers the image data to the overall system control program 93, the overall system control program 93 transfers the image data to the communications program 83, the communications program 83 of the network server SP1 transfers the image data to the communications program (for example, the communications program 53) of the host computer designated through the TCP/IP program 82. The image data received by the communications programs 53 through the TCP/IP program 52 is further transferred to the scanner application program 58.

When an inquiry command as to the status of the scanner printer server is sent to the scanner printer server (for example, the scanner printer server SP1) designated by the work station ST1, the overall system control program 93 obtains the status (for example, the type of the scanner printer connected to the network server SP1, resolution, size of print sheet, color processing ability, etc.) of the network server SP1 and the communications program 83 transmits the data obtained to a host computer (for example, the work station ST1) through the TCP/IP program 82.

When an error occurs in the scanner printer 94, 95 serving as the image I/O unit or the network server SP1, the overall system control program 93 controls the actualities of error and the communications program 83 transmits the information to the host computer (for example, the host computer SP1) designated through the TCP/IP program 82.

With the program structure as described above, in this embodiment, the printer designated by the host computer can carry out printing according to the application program (for example, a DTP software) of the host computer. Furthermore, the image data can be entered from the scanner designated by the host computer according to the scanner application program (for example, a DTP software) of the host computer, and the image data entered from the designated scanner can be transferred to the other host computer. In addition, the status (status of the scanner printer to be connected) of the designated network server SP1 can be recognized.

In FIG. 25, no matter how many host computers and scanner printer servers are connected to the LAN 96, the application of the present invention will not be hampered.

The following describes network processing of the host computer and between the host computer and the network server SP1.

Processing for printing in the host computer is primarily divided into the first to third processing: the first processing for preparation of data according to the application program (for example, a DTP software), the second processing for conversion of prepared data to the CaPSL codes according to the application program, and the third processing for transfer of the CaPSL codes to the network server SP1.

Data prepared in the first processing depends on the type of a machine to be used and an application program. When, for example, the Frame Maker (trade name), a DTP program of Frame Technology, Inc., is used in the SUN work station, the data is outputted as an MIF (trade name) file or an IPL (trade name) file. When an application program adapted to the Windows (trade name) is used in an IBM personal computer, GDI functions are invoked.

Conversion of the data prepared according to the application program to the CaPSL codes in the first processing depends on the type of machine to be used and the file format to be applied. When, for example, the above described Frame Maker is used in the SUN work station, a program for converting the MIF file or the IPL file to the CaPSL codes is used. When an application program adapted to the Windows (trade name) is used in an IBM personal computer, conversion from CDI functions to the CaPSL codes is carried out according to a conversion program. In addition, when an Apple's Macintosh (trade name) computer is used, conversion of QuickDraw functions to the CaPSL codes is carried out according to a conversion program.

In addition, the transfer of CaPSL codes to the network server SP1 in the third processing depends on a program to be used in transmission. For example, the communications program 83 shown in FIGS. 2A and 2B is used, and a host computer which used UNIX as the OS uses the 1pq/1pd program 90.

When a scanner process is to be carried out in the host computer, the first and second processing is carried out.

First, image data is received from the network server SP1. Second, the image data is displayed and stored according to a scanner application program.

Image data received in the first processing is stored in the image format which can be processed by the scanner application program to be used in the second processing. The communication program 83 shown in FIGS. 2A and 2B is used as a program to be used to receive the image data from the network server SP1.

In the second processing, the image data format which can be used depending on the use of the scanner application program is determined. And the image data format which can be used for input and output is determined. For example, the bit map and the TIFF format are permitted as input. The TIFF format is used for storing as files. The bit map can be used for display.

A plurality of programs are used to connect the host computer and the network server SP1 with a network. The main program is the communications program 83 shown in FIGS. 2A and 2B.

The communications program 53 shown, for example, in FIG. 25 and the communications program 83 for the network server SP1 are available. The communications program for the host computer mainly performs the first to third processing.

The first processing is linked with the network server SP1 through a lower layer. In the second processing, the CaPSL data is transferred to the network server SP1. In the third processing, image data is received from the network server SP1 and transferred to a higher layer.

On the other hand, the network server SP1 mainly carries out the first and second processing. In the first processing, the CaPSL data received by the communications program 83 through the TCP/IP program 82 is transferred to the overall system control program 93. In the second processing, the image data received from the overall system control program 93 is transferred to the communications program 83.

Printing and scanning are started when a print request and a scan request from the upper layer of the host computer are received by the communications program 53. The communications program 53 forms a linkage using the lower layer. When the hose computer is connected through, for example, the Ethernet, the TCP/IP program 52 uses for data transmission and reception. After the circuit is linked, the communications program 53 transfers the specific data for printing and scanning and sets the printer and the scanner to an adaptive condition. The CaPSL data is transmitted from the a client to a server for printing after the settings of the printer and the scanner have been completed, and the image data is transmitted from the server to the client for scanning after the setting of the scanner has been completed. As a program, the 1pd program shown in FIGS. 2A and 2B can be used. When a UNIX machine is used as the host computer, printing is enabled by using 1pr which is the standard print command for the UNIX. This 1pd program 90 (see FIGS. 2A and 2B) is used only for printing. Even when there is no spool disk at the server side, the output by default setting is possible.

Basic operations of the overall system control program 93 are to carry out processing in response to an event to be entered, inquire a status of the input/output unit which has fallen in an error, and resume a job which has been interrupted due to the error and has restored from the error.

Figure 26:
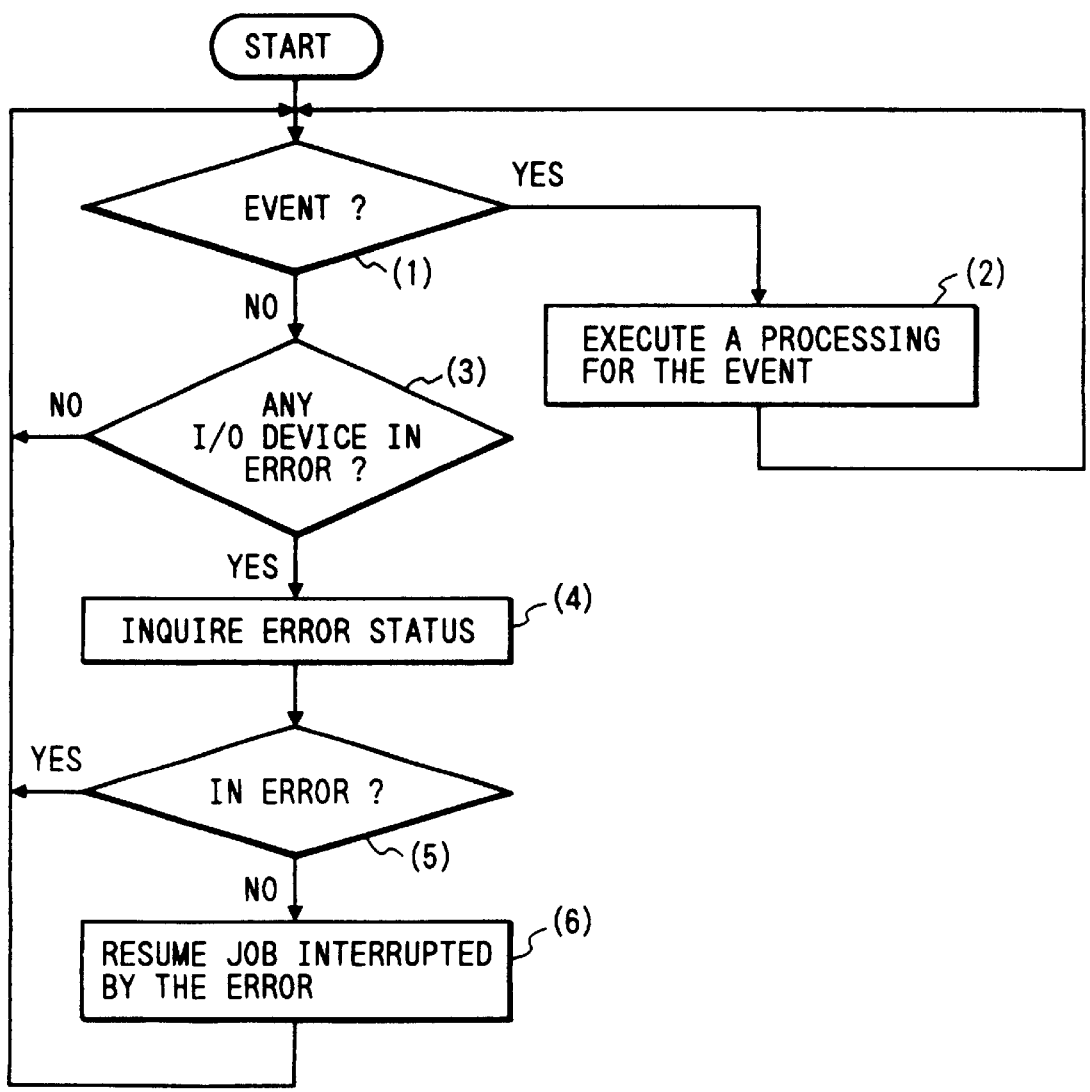
FIG. 26 is a flow chart illustrating an example of a total control procedure in a server device according to the preset invention.

The following describes the overall control operation in accordance with the present invention, referring to the flow chart shown in FIG. 26.

FIG. 26 is a flow chart showing an example of the overall control procedure in the server unit in accordance with the present invention. (1)–(6) respectively denote the steps of the procedure.

In step (1), it is determined whether there is an event (1), a processing in response to the event is carried out in step (2) and, if it is determined that there is no event, it is checked in step (3) whether there is an input/output unit suffering from the error. If it is checked that there is an input/output unit suffering from the error, it is inquired in step (4) whether the unit is suffering from the error and it is determined in step (5) whether the unit is suffering from the error. If the unit is recovered from the error, a job which has been interrupted due to the error is resumed in step (6). The overall system control program 93 can communicate with the TCP/IP program 82, communications program 83, PDL interpreter program 84, scanner control program 85 and device driver 86 in the network server SP1 and receives various events. Those events sent from the communications program 83 include an arrival of a job and an end of data transfer, those events sent from the PDL interpreter program 84 include an end of processing of data received, end of page drawing and end of print job, and those events sent from the scanner control program 85 include an image data transfer request, end of page print, occurrence of error and normal status.

In the overall system control program 93, the operations for respective events are specified. For example, when a job arrival signal is sent from the communications program 83, the contents of the job are analyzed, the data of a print job is transferred to the PDL interpreter program 84 and the data of an image input job is transferred to the scanner control program 85.

In addition, error sent to be from the device driver 86 include no paper, no ink, paper jam and power off.

In this embodiment, the network server SP1 uses the CaPSL as the page descriptive language for the printer. The following describes the function and processing of the CaPSL. However, the page descriptive language for the printer is not limited to the CaPSL.

The function of the CaPSL is a task for producing an image in a drawing area referred to as a band memory of the network server SP1 by entering the control codes which denote a figure, character and image.

The overall system control program 93 maintains direct communication with the PDL interpreter program 84. The communication includes the first and second communications described below.

The first communication is transferred to the CaPSL by the overall system control program 93 and its contents are a file name of a file which stores the CaPSL codes, a leading address and size of a memory which stores the CaPSL codes, possibility of drawing of the band memory, etc.

The second communication is transferred to the overall system control program 93 by the PDL interpreter program 84 and is contents are an end of band memory drawing, end of page drawing, end of document drawing, band memory drawing area and information of the unoccupied band memory.

In this case, the following processing is carried out in the PDL interpreter program 84.

The network server SP1 has a memory called the band memory which has a certain width and the PDL interpreter program 84 should partially develop an image as much as the band width. The PDL interpreter program 84 enters a control command as shown in FIG. 27. The CaPSL code is replaced with an intermediate code shown in FIG. 28 in the PDL interpreter program 84 according to a program referred to as the layouter (not shown). In this embodiment, the intermediate code is a practical expression of an abstractive expression of a figure. If the intermediate codes as many as one page are prepared, a raster image is developed in the band memory while referring to the intermediate codes according to a program (not shown) referred to as a painter.

Figure 29:
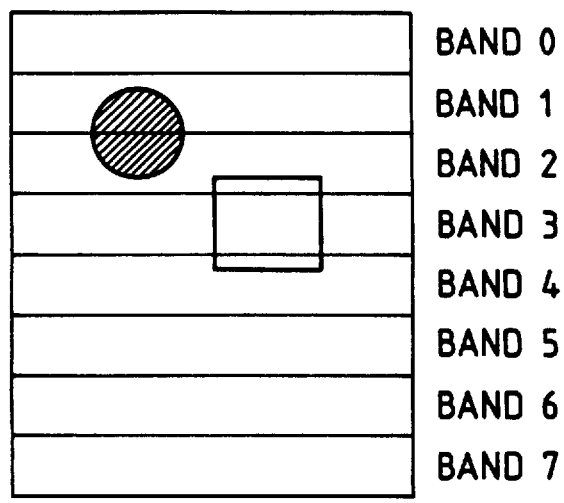
FIG. 29 is an explanatory view illustrating an expanding procedure of a graphic information to a band memory in a server device according to the present invention.
Figure 30:
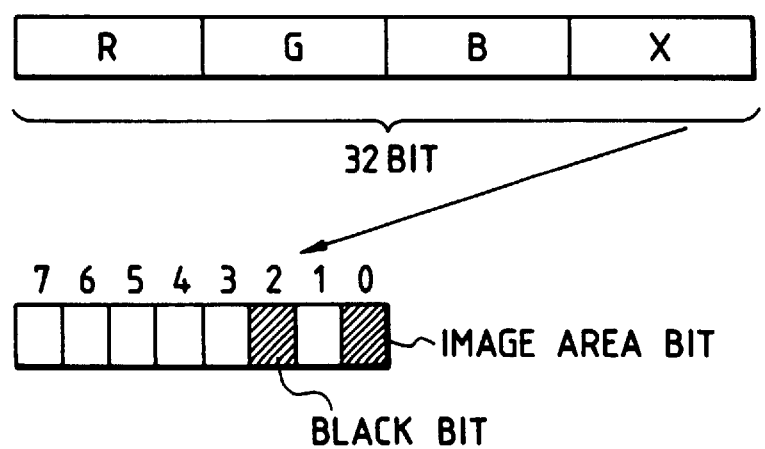
FIG. 30 is an explanatory view illustrating a structure of a single picture element expanded with a page description language in a server device according to the present invention.

When the layouter receives, for example, a CaPSL code for drawing a figure as shown in FIG. 29, the layouter replaces the CaPSL code with an intermediate code shown in FIG. 28 which depends on the device. Then the layouter computes the numbers of bands in which the figure is drawn in accordance with the size of the figure and registers the result of computation in the intermediate code. In an example shown in FIG. 29, a circle is drawn in 1–2 bands and a rectangle is drawn in 2–4 bands. The numerals after the numbers of bands denote the position of the figure in the device coordinates and the diameter of the figure.

The painter (a program for actually drawing a figure on the memory) develops a figure as shown in FIG. 29 and draws it on the band memory while referring to the intermediate codes. Actually, the memory has a capacity as large as the band width and therefore, when a band is drawn, the data is sent to the printer, the memory is cleared and the next band is drawn. When the intermediate code is referred to draw the zeroth band, it is known that the zeroth band does not contain the data to be drawn and the painter starts the operation of the next band. Then the painter searches the data to be drawn in the first band, detects a circle and draws the circle as much as one band. Shifting to the second band, the painter knows that the circle and the rectangle be drawn and draws the continuing portion of the circle and the rectangle as much as one band. Thus, the painter draws the data as much as one page.

A structure of one pixel of data to be developed by the CaPSL code is composed of 32 RGBX bits as shown in FIG.

30. These bits include RGB 24 bits for color data and 8-bit additional information X for additional information. In this case, Bit 0 is the additional information X is the image area determining bit and, when an image is drawn on the band memory according to the CaPSL codes, this bit is turned on. Bit 2 is a black information bit and, when the color of a figure or character developed by the CaPSL codes is 0 for RGB, this bit 2 is turned on. These information are analyzed for printing out through the first interface circuit 4-1 and contribute to improvement of the image quality.

Next, with reference to a data process chart shown in FIG. 31, operations of scanners 94A and 95A will be described. For simplicity, the same portions as FIG. 25 are denoted by the same reference numerals.

Figure 31:
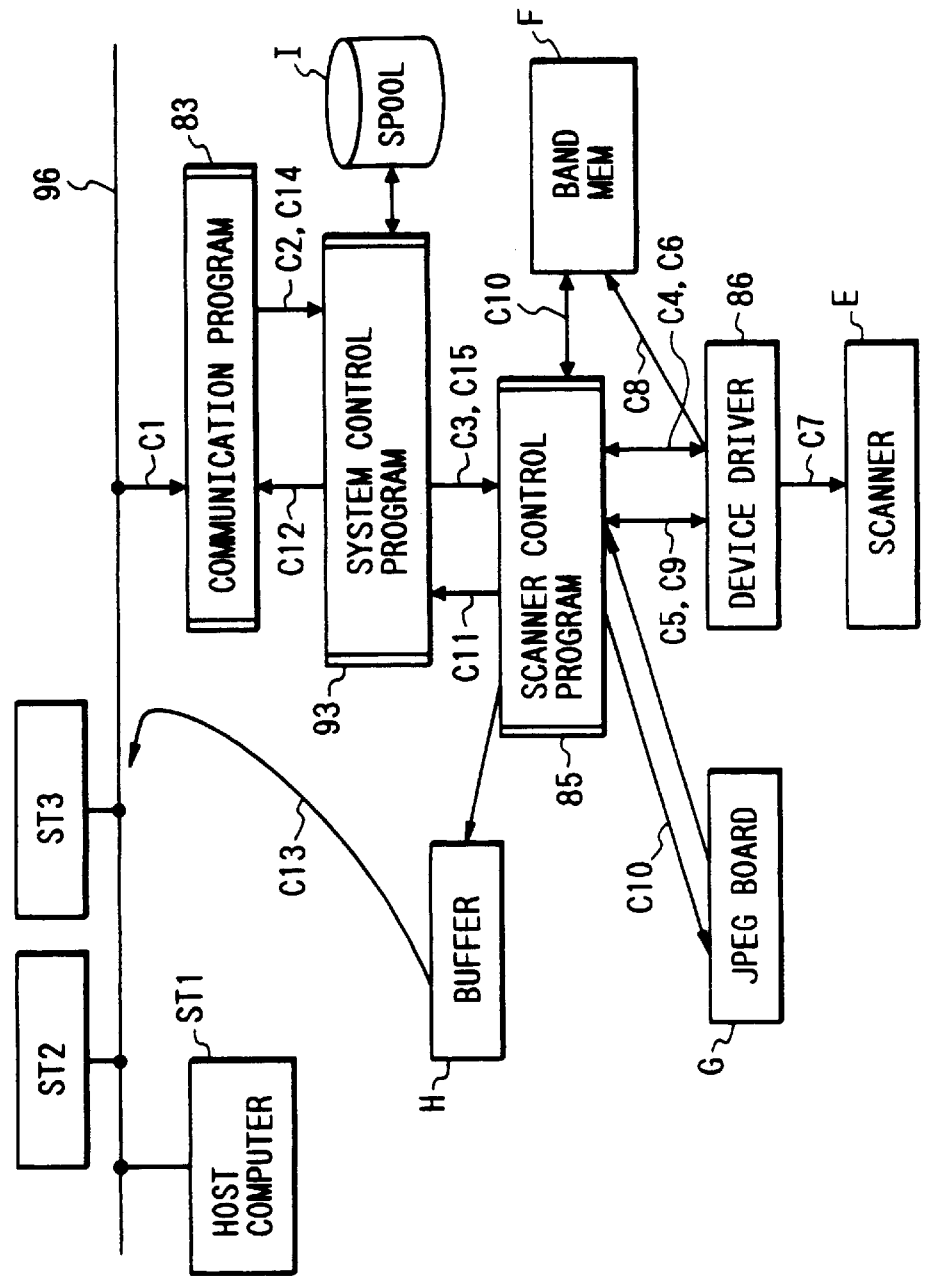
FIG. 31 is a view illustrating a data processing path for explaining an operation of a scanner shown in FIGS. 2A and 2B.

FIG. 31 is a data process chart for explaining the operations of scanners 94A and 95A shown in FIGS. 2A and 2B. Since the operation of a scanner that scans an image as divided bands is slightly different from the operation of a scanner that scans an entire image at a time, their tasks will be separately described.

In the case of the scanner that scans an image as divided bands, when receiving a scan command C1 from a host computer ST1 that is a client machine through a TCP/IP program 83, the communication program 83 sends a scan program C2 to a system overall control program 93.

When the apparatus has a spool I, the system overall control program 93 creates a spool file corresponding to the scan command C2, which has been received, and stores the spool file. The system overall control program 93 sends a file name C3 to a scanner control program 85. When the apparatus does not have the spool I, the system overall control program 93 sends the scanner command C3 directly to the scanner control program 85.

The scanner control program 85 interprets the scanner command C3 and sends a scanner condition setting command C4 to a device driver 86 so as to activate a designated scanner. The scanner condition setting command C4 contains for example resolution. The device driver 86 is a function corresponding to the scanner control program 85.

The device driver 86 that has set scanner conditions sends a return value C5 to the scanner control program 85. When receiving the return value C5, the scanner control program 85 sends a scan start command C6 to the device driver 86 so as to activate the designated scanner. The device driver 86 activates a scanner E so as to read image data and stores the image data in a band memory F. After having written one band of image data in the band memory F, the device driver 86 sends a scan completion return value C9 to the scanner control program 85. When receiving the return value C9, the scanner control program 85 performs image process for image data stored in the band memory F (namely, compresses the image data with for example a JPEG compressing board) and writes the compressed data in a buffer region H.

After having processed all data stored in the band memory F, the scanner control program 85 sends a transfer request C11 to the system overall control program 93. In addition, the scanner control program 85 sends a scan start command C6 to the device driver 86 so as to activate the scanner. The scanner control program 85 causes the scanner to read image data from the last end point of the preceding scanning operation.

When receiving the transfer request C11, the system overall control program 93 sends a transfer request C12 to the communication program 83. When receiving the transfer request C12, the communication program 83 sends the processed image data stored in the buffer region H to the host computer, which is a designated client machine. At this point, since the communication program 83 and the system overall control program 93 are programs different from the scanner control program 85, even if the scanner that is controlled by the device driver 86, which is a function of the scanner control program 85, is operating, the communication program 83 and the system overall control program can transfer image data.

After having transferred the image data, the communication program 83 sends a transfer completion signal C14 to the system overall control program 93. When receiving the transfer completion signal C14, the system overall control program 93 sends a transfer completion C15 to the scanner control program 85. When receiving both the return value C9 (which represents the completion of the scanning operation) from the device driver 86 and the transfer completion C15 from the system overall control program 93, the scanner control program 85 performs an image process for the image data stored in the band memory F and writes the processed data in the buffer region H. By repeating these steps, the image data is sent to the host computer ST1. When another host computer (for example, a host computer ST2 or a host computer ST3) is designated, image data can be sent to the designated host computer.

When having determined that all image data has been transferred, the scanner control program 85 informs the communication program 83 of the completion through the system overall control program 93.

On the other hand, in the case of the scanner that scans entire image at a time, when receiving a scan command C1 from for example a host computer ST1, which is a client machine, the communication program 83 sends a scan command C2 to the system overall control program.

When the apparatus has a spool I, the system overall control program 93 creates a spool file corresponding to the scan command C2 that has been received and stores this spool file. The system overall control program 93 sends a file name C3 to the scanner control program 85. When the apparatus does not have the spool I, the system overall control program 93 sends the scanner command C3 directly to the scanner control program 85.

The scanner control program 85 interprets the scanner command C3 and sends a scanner condition setting C4 (such as resolution) to the device driver 86 so as to activate a designated scanner. The device driver 86, which has set scanner conditions, sends a return value C5 to the scanner control program 85. When receiving the return value C5, the scanner control program 85 sends a scan start command C6 to the device driver 86 so as to activate a scanner E. The scanner E cannot be stopped in the middle of the reading operation thereof.

When receiving a command C10, the device driver 86 activates the scanner E so as to read all image data. In addition, the device driver 86 performs an image process or the image data being read (for example, JPEG compresses the image data with for example a JPEG board) and stores the compressed data in the buffer H.

Image data that has not been compressed may be written to the buffer H. When the buffer H becomes full, the scanner control program 85 sends a transfer request C11 to the system overall control program 93. When receiving the transfer request C11, the system overall control program 93 sends a transfer command C12 to the communication program 83. The communication program 83 transfers data stored in the buffer H to the designated host computer ST1. When another host computer (for example, a host computer ST2 or a host computer ST3) is designated, image data can be sent to another host computer.

After having transferred the data to the host computer, the communication program 83 sends a transfer completion signal C14 to the system overall control program 93. When receiving the transfer completion signal C14, the system overall control program 93 sends a transfer completion C15 to the scanner control program 85. When receiving the transfer completion C15, the scanner control program 85 performs an image process for the image data stored in the band memory and writes the processed data to the buffer H. By repeating these steps, image data can be sent to a designated host computer, which is a client machine.

When having determined that all the image data have been transferred, the scanner control program 85 informs the communication program 83 of the completion through the system overall control program 93.

Next, with reference to FIGS. 32 and 33, data flow from a host computer of the server apparatus according to the present invention to an S/P server apparatus will be described.

In the data flow from the host computer to a designated S/P server apparatus (network server) SP1, for example a host computer ST1 creates a document corresponding to a DTP application program 56 that is running. The data format of the document depends on the model of the host computer and the application program. Thus, the data of the document should be converted into a format that the designated S/P server apparatus SP1 can interpret. Reference numeral 54 is a converting program. The DTP application program 56 sends data corresponding to the system of the host computer to the converting program 54. The converting program 54 converts the received file into for example CaPSL code. The file, which has been converted into the CaPSL code, is sent to a communication program lpd 505 or a communication program 53.

These communication programs serve to connect a host computer and an S/P server apparatus SP1 through a network so as to communicate data therebetween. In this embodiment, one of these communication programs is provided.

First, the operation of the communication program 53 will be described.

Corresponding to the communication program 53, a communication program 83 is used for the S/P server apparatus SP1. Between these communication programs, a TCP/IP program is used. When data is printed out, the communication program 53 has two functions, one of which is to link with the communication program 83 through a lower layer (TCP/IP), the other of which is to transmit CaPSL data file generated by the converting program to the S/P server apparatus SP1.

The communication program 83 links with the communication program 53 and the system overall control program 93 so as to exchange information necessary for a print process and optimally print out data. In other words, the communication program 83 receives data from the communication program 53 and informs the system overall control program 93 of the data reception. At this point, the received CaPSL data and the associated information are temporarily stored in a reception buffer. When an error took place in the S/P server apparatus SP1, the communication program 83 sends information about the error to the communication program 53.

Next, a print-out process performed by the communication program 83 will be described.

The document data created by the DTP application program 56 has been sent to the S/P server apparatus SP1. The communication program 83 sends a job arrival event to the system overall control program 93. The job is for example a print-out process of a color laser copier (CLC). The system overall control program 93 that is an event drive type program always waits for events that are sent from the communication program 83, the device driver 86, and the PDL interpreter program 84. When receiving an event, the system overall control program 93 determines the source of the event and the contents thereof and performs a corresponding process. Now assume that an event representing "a job has arrived" has been received from the communication program 83. At this point, the system overall control program 93 analyzes the event and temporarily spools document data stored in the reception buffer when the apparatus has a hard disk 51. When a plurality of jobs area queued, the system overall control program 93 optimally activates the jobs corresponding to the contents of the jobs, the conditions of the printer and scanner, and the job priority.

When the apparatus does not have the hard disk 519, since it cannot store data, the system overall control program 93 informs the PDL interpreter program 84 of an address block in which the data is stored and the size of the data so as to immediately perform the print-out process. In this embodiment, assume that the hard disk is provided. The system overall control program 93 determines the contents of the job and sends the spooled file name to the PDL interpreter program 84 so as to activate the print-out process.

Next, with reference to a block diagram shown in FIG. 33, this embodiment will be described in more detail.

Figure 33:
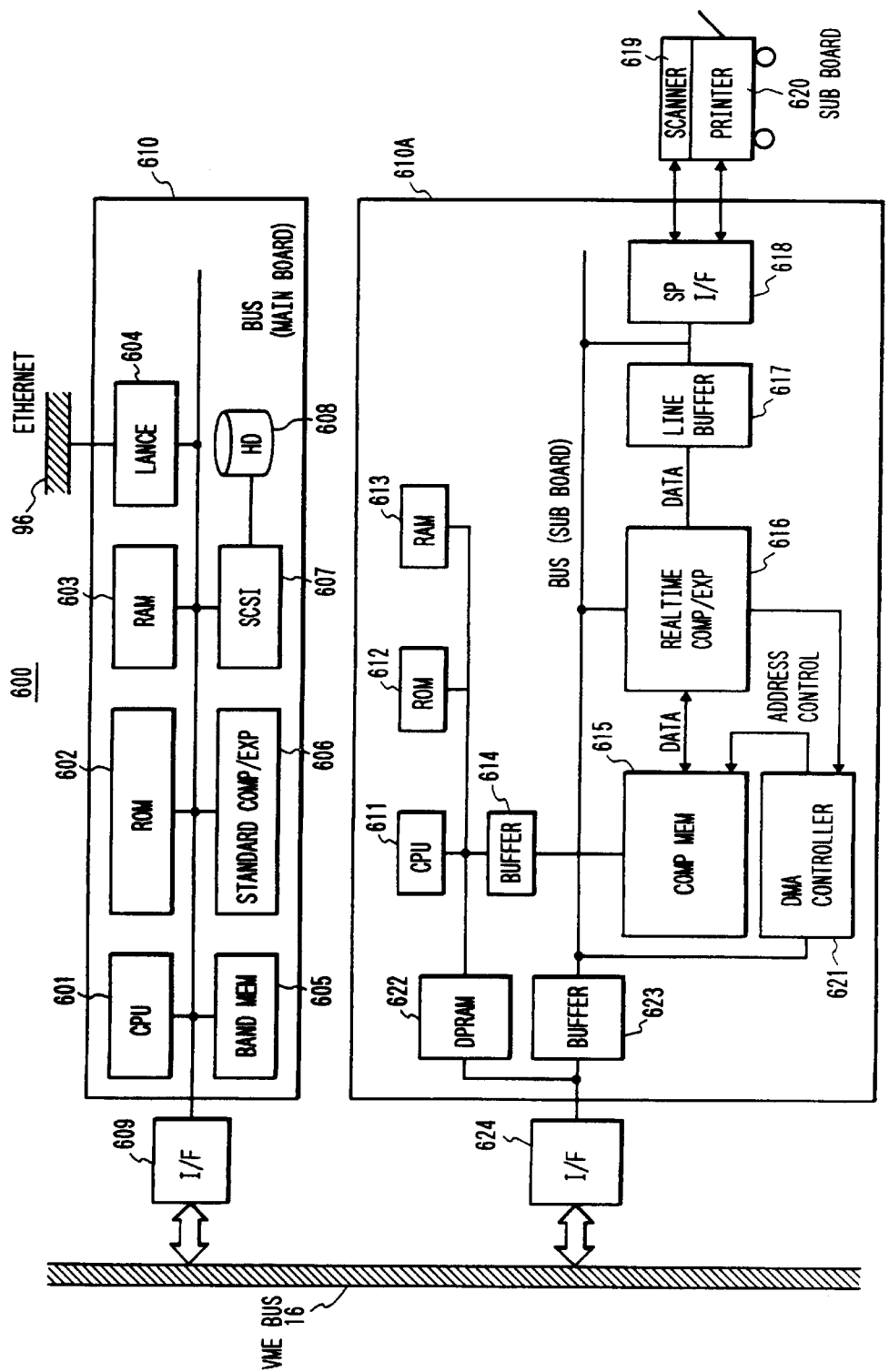
FIG. 33 is a block diagram illustrating a data processing state between a server device according to the present invention and a color laser copier.

FIG. 33 is a block diagram for explaining data processes of the S/P server apparatus SP1 according to the present invention and for example a color laser copier (CLC).

Figure 32:
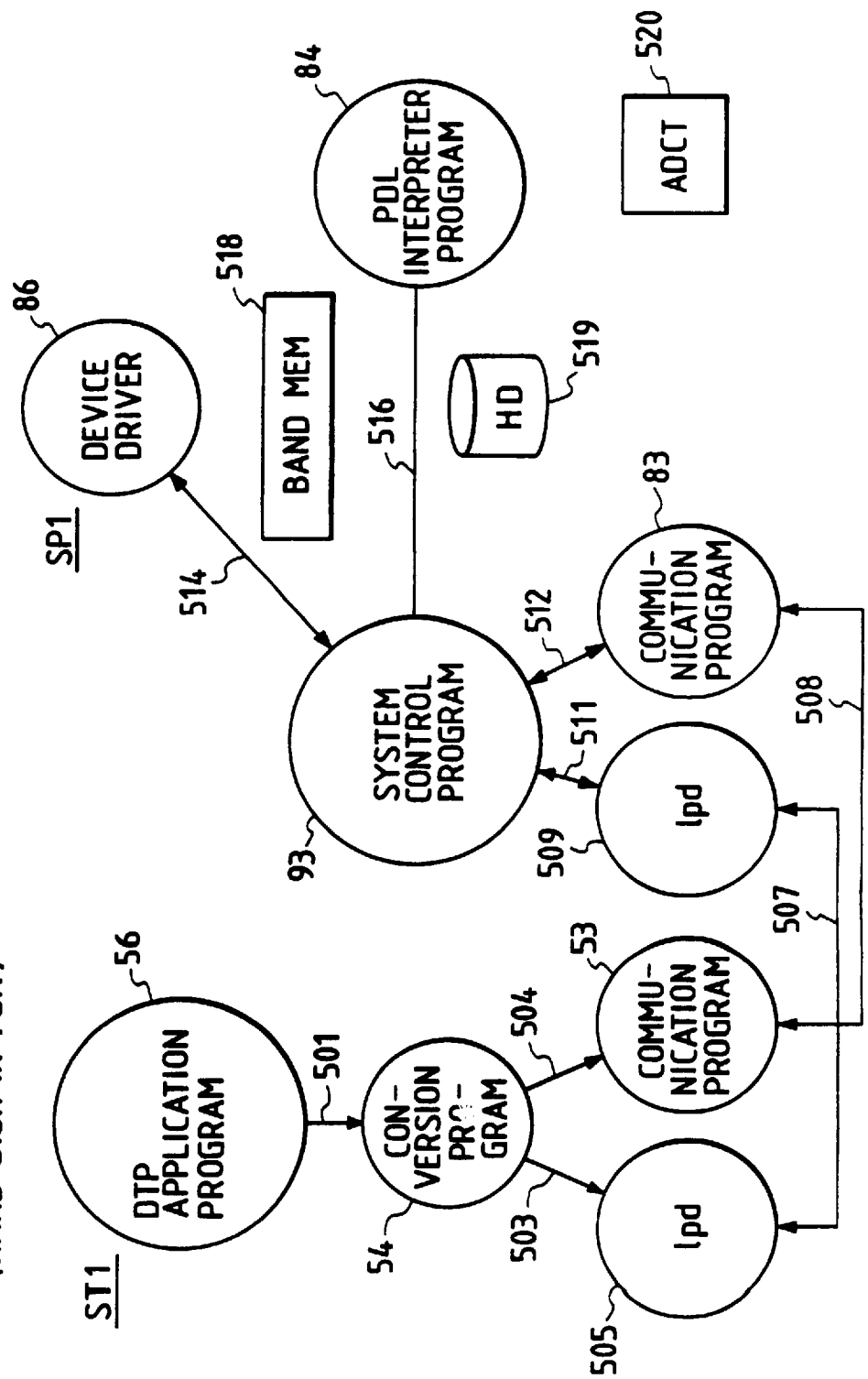
FIG. 32 is a block diagram illustrating a data processing state between a server device according to the present invention and a color laser copier.

A PDL interpreter program 84 shown in FIG. 32 reads CaPSL data from a spool file, interprets the data, and writes figures, letters, and images to a band memory 518. When the CaPSL data contains compressed and encoded image data, the PDL interpreter program 84 causes a standard compressing and decompressing portion 606 to decompress image data and store the decompressed image data in the band memory. After one band of image data has been stored in the band memory, the PDL interpreter program 84 issues a "one band write completion" event to the system overall control program 93. When receiving the event, the system overall control program 93 issues a "one band paper output" request event to the device driver 86.

Next, data flow from the band memory 605 to the compressing memory 615 will be described. First, the operation of the device driver 86 will be described.

When receiving the "one band paper output" event, the device driver 86 transfers data stored in the band memory 605 to a line buffer 617 of a sub board 610A. The data stored in the line buffer 617 is transferred to a real time compressing and decompressing portion 616, block by block. The real time compressing and decompressing portion 616 compresses image data, block by block, and stores the compressed image data in the compressing memory 615. Addresses and write signal for the compressing memory 615 are generated under the control of a DMA controller 621.

After having compressed one band of data, the device driver 86 sends a "one band paper output completion" event to the system overall control program 93. When receiving the event, the system overall control program 93 outputs a "one band write request" event to the PDL interpreter program 84. Whenever each band of data has been written, the compressing process is repeatedly performed until one page of compressed image is stored in the compressing memory 615. When the last band of data has been stored in the compressing memory 615, the PDL interpreter program 84 issues a "one page write completion" event to the system overall control program 93. When receiving the event, the system overall control program 93 issues a "one page paper output command" to the device driver 86.

When receiving the "one page paper output command", the device driver 86 performs the following process so as to print out one page of compressed image stored in the compressing memory 615.

The CPU 611 activates a DPRAM 622 and initializes the real time compressing and decompressing portion 616 and a DMA controller 621. In addition, the CPU 611 sends commands to a designated printer 620 and issues a decompression start command to the real time compressing and decompressing portion 616. The real time compressing and decompressing portion 616 accesses the DMA controller 621. The DMA controller 621 generates addresses and a read signal. The compressing memory 615 outputs the compressed data to the real time compressing and decompressing portion 616. After having decompressed the compressed data, the real time compressing and decompressing portion 616 outputs the decompressed data to the line buffer 617, block by block. The line buffer 617 converts block sequence data to raster sequence data and outputs the converted data to the printer 620 through an SP I/F 618. After one page of data has been printed out, the device driver 86 sends a "one page paper output completion" event to the system overall control program 93. The system overall control program 93 issues a "second page write command" to the PDL interpreter program 84. Thus, a plurality of pages of document are output.

After the last band of the last page of data has been written, the PDL interpreter program 84 issues a "document completion" event to the system overall control program 93. The system overall control program 93 issues a "one page paper output command" to the device driver 86. The device driver 86 performs a print process and issues a "one page paper output completion" event to the system overall control program 93. If necessary, the system overall control program 93 issues a "print completion" event to the communication program 83. The communication program 83 informs the communication program 53 in the host computer that the print process has been completed.

When an error took place (for example, a paper jamming or a paper empty took place in the printer 620), the device driver 86 sends an "error occurrence" event to the system overall control program 93. The system overall control program 93 informs the PDL interpreter program 84 and the communication program 83 that the error took place. The PDL interpreter program 84 performs an error countermeasure process (such as saving the program state). The communication program 83 sends the occurrence and type of error to the communication program 83 of the host computer. The system overall control program 93 can determine whether the apparatus has been recovered from an error in the following two methods. As the first method, the system overall control program 93 periodically asks the device driver 86 whether the apparatus has been recovered from an error. The device driver 86 informs the system overall control program 93 whether or not the apparatus has been recovered from the error.

As the second method, the system overall control program 93 always monitors an occurrence of an error and a recovery therefrom. When the apparatus has been recovered from the error, an "error recovery" event is issued to the system overall control program 93.

Next, with reference to FIGS. 32 and 34, a print data output process where the host computer outputs print data to for example a thermal jet color copier will be described.

Figure 34:
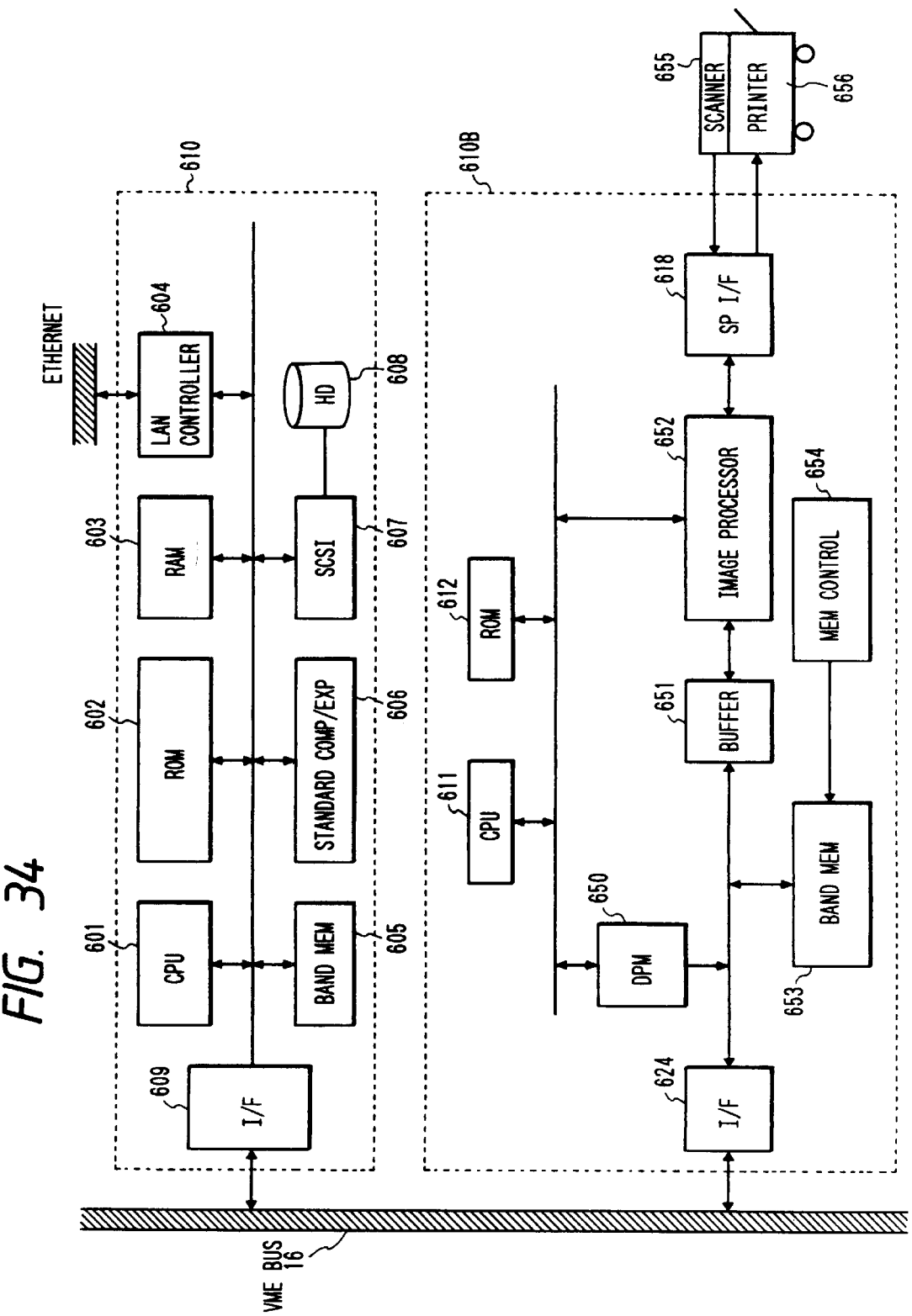
FIG. 34 is a block diagram illustrating a data processing state between a server device according to the present invention and a thermal jet color copier.

FIG. 34 is a block diagram for explaining data processes performed by the S/V server apparatus SP1 according to the present invention and for example a thermal jet color copier (BJC).

As data flow from the host computer to the S/P server apparatus SP1 shown in FIG. 32, the host computer executes a DTP application program 56 so as to create a document. The data format of the document depends on the model of the host computer and the application program. Thus, the data of the document should be converted into a format that the designated S/P server apparatus SP1 can interpret. Reference numeral 54 is a converting program. The DTP application program 56 sends data corresponding to the system of the host computer to the converting program 54. The converting program 54 converts the received file into for example CaPSL code. The file, which has been converted into the CaPSL code, is sent to a communication program lpd 505 or a communication program 53.

These communication programs serve to connect a host computer and an S/P server apparatus SP1 through a network so as to communicate data therebetween. In this embodiment, one of these communication programs is provided.

First, the operation of the communication program 53 will be described.

Corresponding to the communication program 53, a communication program 83 is used for the S/P server apparatus SP1. Between these communication programs, a TCP/IP program is used.

When data is printed out, the communication program 53 has two functions, one of which is to link with the communication program 83 through a lower layer (TCP/IP), the other of which is to transmit CaPSL data file generated by the converting program 54 to the communication program 83.

The communication program 83 links with the communication program 53 and the system overall control program so as to exchange information necessary for a print process and optimally print out data. In other words, the communication program 83 receives data from the communication program 53 and informs the system overall control program of the data reception. At this point, the received CaPSL data and the associated information are temporarily stored in a reception buffer.

When an error took place in the S/P server apparatus SP1, the communication program 83 sends information about the error to the communication program 53. When a print-out process is performed corresponding to the communication program 53 of the host computer, the document data created by the DTP application program 56 has been sent to the designated S/P server apparatus SP1. The communication program 83 sends a job arrival event to the system overall control program 93. The job is for example a print-out process of a BJ color laser copier. The system overall control program 93 that is an event drive type program always waits for events that are sent from the communication program 83, the device driver 86, and the PDL interpreter program 84. When receiving an event, the system overall control program 93 determines the source of the event and the contents thereof and performs a corresponding process.

Now assume that an event representing "a job has arrived" has been received from the communication program 83. At this point, the system overall control program 93 analyzes the event and temporarily spools document data stored in the reception buffer when the apparatus has a hard disk 51. When a plurality of jobs are queued, the system overall control program 93 optimally activates the jobs corresponding to the contents of the jobs, the conditions of the printer and scanner, and the job priority.

When the apparatus does not have the hard disk 519, since it cannot store data, the system overall control program 93 informs the PDL interpreter program 84 of an address block in which the data is stored and the size of the data so as to immediately perform the print-out process. In this embodiment, assume that the hard disk is provided. The system overall control program 93 determines the contents of the job and sends the spooled file name to the PDL interpreter program 84 so as to activate the print-out process. A PDL interpreter program 84 reads CaPSL data from a spool file, interprets the data, and writes figures, letters, and images to a band memory 518. When the CaPSL data contains compressed and encoded image data, the PDL interpreter program 84 causes a standard compressing and decompressing portion 606 to decompress image data and store the decompressed image data in the band memory. After one band of image data has been stored in the band memory, the PDL interpreter program 84 issues a "one band write completion" event to the system overall control program 93. When receiving the event, the system overall control program 93 issues a "one band paper output" request event to the device driver 86.

When data stored in the band memory 518 is printed out, the device driver 86 that has received a "one band paper output" request event controls the interface board 610B so that the designated thermal jet color printer (BJ printer) 656 prints out the data. One band of image data stored in the band memory 605 of the main CPU board 610 is transferred to the band memory 653. The data stored in the band memory 653 is read corresponding to a scanning type of a head of the BJ printer 656 and sent to an image processing portion 652 through a buffer 651. The image processing portion 652 performs a process corresponding to predetermined parameters. Normally, the image processing portion 652 converts NTSC-RGB data stored in the band memory into RGB data for the BJ printer 656. The converted data is sent to a printer engine portion of the BJ printer 656 through an interface 618. The BJ printer 656 is controlled by a CPU 611 that interprets commands received from the CPU 601. Reference numeral 650 is a dual port RAM.

After the last band of data has been written, the PDL interpreter program 84 issues a "document completion" event to the system overall control program 93 so as to complete the print process. If necessary, the system overall control program 93 issues a "print completion" event to the communication program 83. The communication program 83 informs the communication program 53 in the host computer that the print process has been completed.

When an error took place (for example, a paper jamming or a paper empty took place in the printer 656), the device driver 86 sends an "error occurrence" event to the system overall control program 93. The system overall control program 93 informs the PDL interpreter program 84 and the communication program 83 that the error took place. The PDL interpreter program 84 performs an error countermeasure process (such as saving the program state). The communication program 83 sends the occurrence and type of error to the communication program 83 of the host computer. The system overall control program 93 can determine whether the apparatus has been recovered from an error in the following two methods. As the first method, the system overall control program 93 periodically asks the device driver 86 whether the apparatus has been recovered from an error. The device driver 86 informs the system overall control program 93 whether or not the apparatus has been recovered from the error.

As the second method, the system overall control program 93 always monitors an occurrence of an error and a recovery therefrom. When the apparatus has been recovered from the error, an "error recovery" event is issued to the system overall control program 93.

When a color image is transmitted between different type apparatuses, input and output devices of these apparatuses cannot be simply connected. Since characteristics of these apparatuses differ each other, colors cannot be properly reproduced. To prevent this problem, a technique where each device employs an intrinsic color space and a communication path uses a standard color space is being studied. A color space converting process based on such a requirement will be described.

Now assume that the color space of an input device on a transmitting side is referred to as A, the color space on a communication path is referred to as B, and the color space of a receiving printer is referred to as C.

Next, YCrCb color space, which is relatively well known as a color space for a communication path, will be described. The YCrCb color space has been widely used for a color image encoding process.

Normally, the color space A on the transmitting side differs from the YCrCb color space in color regions. Both the color spaces are coupled as given by formula (1).

$$\begin{bmatrix} Ra \\ Ga \\ Ba \end{bmatrix} = \begin{bmatrix} a11 & a12 & a13 \\ a21 & a22 & a23 \\ a31 & a32 & a33 \end{bmatrix} \begin{bmatrix} y \\ cr \\ cb \end{bmatrix} \quad (1)$$

where Ra, Ga, and Ba are coordinates (Ra, Ga, Ba) at any point in the color space A. The coordinates of the corresponding point in the YCrCb color space are (y, cr, cb). To approximate this formula for any color space, coefficients (a11 to a33) are obtained by for example least square method. Thus, the input color space of the device is converted into the color space on the communication path corresponding to the formula (1).

On the other hand, when a standard color space on a communication path is converted into a color space on a recording side, one of several methods may be used. In this embodiment, the following method is used.

When the standard color space on the communication path is YCrCb, YCrCb data is converted into RGB data. Since the YCrCb space is linearly converted into NTSC color space, the NTSC color space will be described in this embodiment.

Although the NTSC standard color space is based on additive mixture of color stimuli, printing color space is based on subtractive mixture of color stimuli. Thus, the additive mixture of color stimuli should be converted into the subtractive mixture of color stimuli. This conversion cannot be easily performed due to very complicated constructed. In this embodiment, a color space of an additive mixture of color stimuli that is close to a color space on the recording side is treated as an inner standard color space on the recording side. In this embodiment, a HDTV (High Definition TV) color space that is narrower than the NTSC color space is treated as a standard color space D on the recording side.

The relation between the inner standard color space D on the recording side and the device color space C is given by formula (2).

$$\begin{bmatrix}Y\\M\\C\\K\end{bmatrix} = \begin{bmatrix}A11 & A12 & A13\\A21 & A22 & A23\\A31 & A32 & A33\\A41 & A42 & A43\end{bmatrix}\begin{bmatrix}Rh\\Gh\\Bh\end{bmatrix} \quad (2)$$

where Y, M, C, and K are printing prime colors that are yellow, magenta, cyan, and black components; Rh, Gh, and Bh are standard color space components on the recording side; A11 to A43 are coefficients at a plurality of points representing the relation between printing color space and recording inner standard color space. These coefficients A11 to A43 are calculated by least square method.

The standard color space on the communication path is converted into the inner standard color space on the recording side in the following method.

For the NTSC standard color space on the communication line, representative information on three-dimensional outermost peripheral plane of colors corresponding to basic stimuli represented by NTSC system is obtained. Likewise, representative position information on the outermost peripheral plane of the HDTV inner standard color space on the recording side can be obtained.

When components (Rh, Gh, Bh) on the HDTV color space are obtained from components (Rn, Gn, Bn) on the NTSC color space, Rn, Gn, and Bn are converted into Ln, an, bn with CIEL*a*b*. Likewise, (Rh, Gh, Bh) are converted into (Lh, ah, bh) with CIEL*a*b*. When Ln is constant, the outermost peripheral approximation positions on the HDTV and NTSC color spaces that almost satisfy θ=a tan (an/bn) are obtained from the above-mentioned table. When the NTSC outermost peripheral plane position is (Lon, aon, bon) and the HDTV outermost peripheral plane position is (Lon, aoh, boh), ah and bh are given by formula (3).

$$ah=(aoh/aon)*an$$
$$bh=(boh/bon)*bn \quad (3)$$

where ah and bh are color space compressed positions on the HDTV color space.

Thus, any point (Rn, Gn, Bn) on the NTSC color space is converted into (Rh, Gh, Bn) on the recording standard color space. Consequently, the amounts of components Y, M, C, and K to be printed are obtained by the formula (2).

In this embodiment, a standard color space is provided on a recording side. This is because the number of standard color spaces on the communication line is not limited to one. Thus, a plurality of standard color spaces may be used. However, according to this embodiment, even if a color space on a communication path is not an NTSC color space, when the color space can be defined, it may be converted into the standard color space.

Explanation will be made below as for the abnormal countermeasure process of a peripheral device with reference to FIG. 35.

Figure 35:
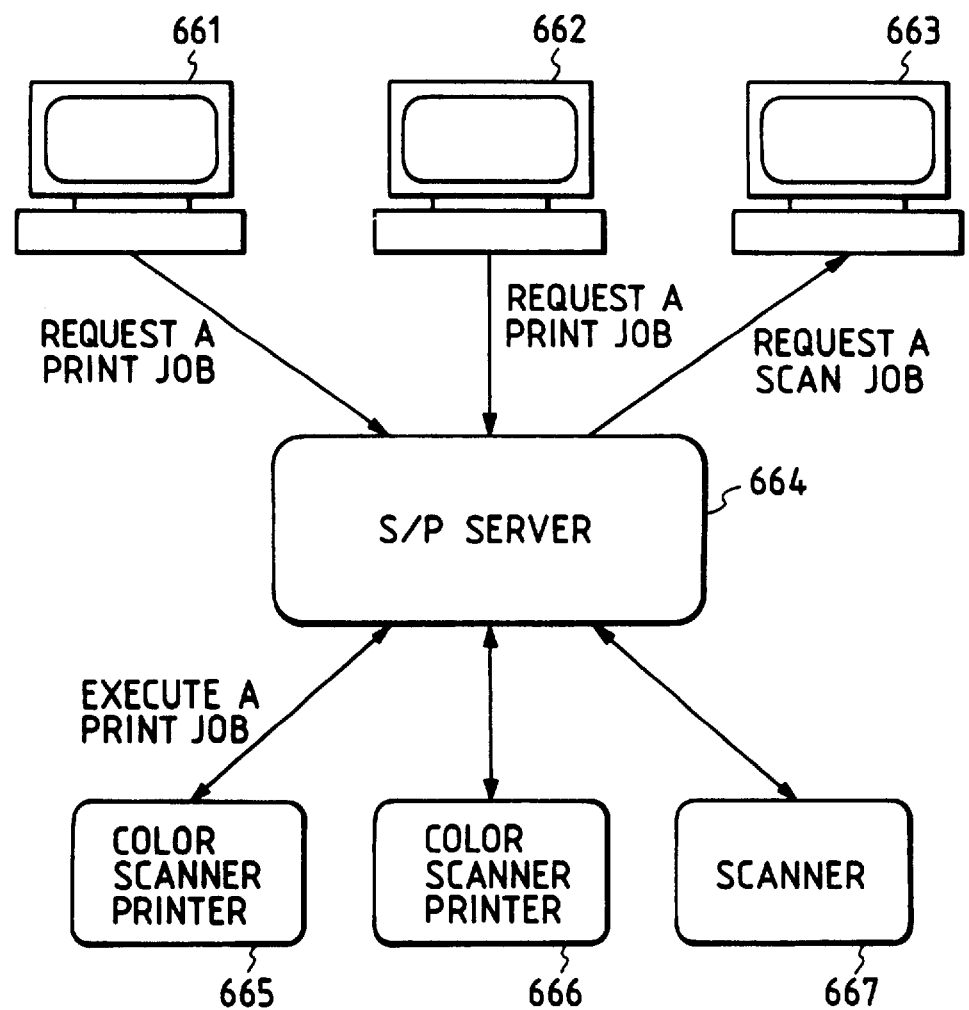
FIG. 35 is a block diagram illustrating a structure of a network system in which a server device according to the present invention is incorporated.

FIG. 35 is a block diagram used for explaining the configuration between the network system and the server device according to the present invention.

When an abnormal state occurs in a peripheral device during a job operation, the S/P server device SP1664 preferentially executes the job (to be described later) operable in the state, without waiting till the peripheral device is recovered from the trouble. The job can be resumed after a recovery of the troubled peripheral device by registering the job (hereinafter referred to an error job) in the S/P server device SP1664, the job dealing with the peripheral device in abnormal state as a process waiting job involved in an error state during an operation, after necessary information has been stored to resume the job. The registration to resume the error job depends on the degree of the abnormal state or the setting by the SP server.

An example will be explained as for the case where three computers 661 to 663, two color scanner printers 665 and 666, and a scanner 667 are connected together.

Figure 36:
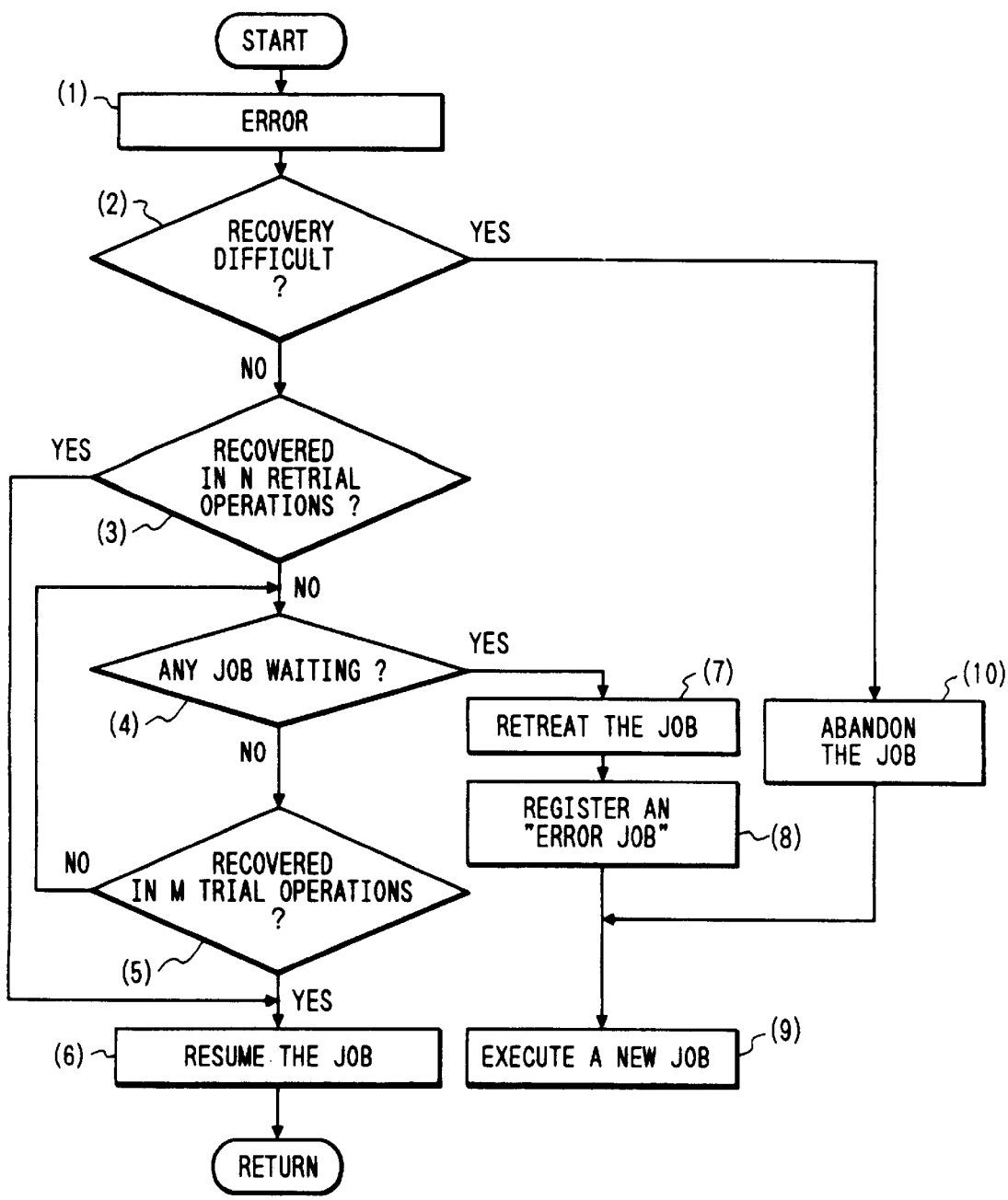
FIG. 36 is a flowchart illustrating an example of a procedure with which an abnormally generated job is processed in a server device according to the present invention.

The color scanner printers 665 and 666 can deal with printing and scanning job, respectively. Hereinafter, an abnormal occurrence job countermeasure operation will be explained with reference to the flow chart shown in FIG. 36. FIG. 36 is a flow chart showing an example of abnormal occurrence job countermeasure procedure in the server device according to the present invention. Numerals (1) to (10) represents steps.

For example, it is assumed that the host computer 661 requests the S/P server device 664 to execute a print job to the color scanner printer 665; the host computer 662 requests the entire system control program 93 to perform a print job and then is in a waiting state; and the host computer 663 requests the entire system control program 93 to perform a scan job and then is in a waiting state. If an abnormal state occurs in a printer portion of the color scanner printer 665 during printing (1), the S/P server device 664 examines whether it is difficult to recover the abnormal state (2). If the S/P server device SP1 judges that it is difficult to recover the abnormal state occurred in the color scanner printer 665, it immediately discards the error job (10) to select and execute the next operable job (9).

According to the present embodiment, an operable job represents a job except a print job done to the color scanner printer 665 in which an abnormal state occurs currently, that is, a scan job to the color scanner printer 665, a print job to the color scanner printer 666, a scan job to the color scanner printer 666, or a scan job to the color scanner printer 667. If there are plural operable jobs, the job is performed according to the following system.

If the S/P server device does not judge that the abnormal state occurring in the color scanner printer 665 is a fatal abnormal state, it executes a retrial process (refer to FIG. 37) to the color scanner printer 665.

The retrial is repeated up to N time (for example, 5 times) predetermined. When the color scanner printer 665 recovers from the abnormal state (or the retrial success) by the retrials of N times, the job is resumed (6). When the N times retrial cannot recover the abnormal state of the color scanner printer 665 (or fails), the S/P server device 664 examines whether there are other operable jobs (4). If there are no operable jobs, the S/P server device 664 executes M times (for example, once) the retrial process predetermined independently from the retrial number (5). If the retrial succeeds, the error job is resumed. If the retrial fails, it is judged again whether there are operable jobs (4). When there is operable jobs, the S/P server device 664 executes the job save of the error job (7); registers the error job as a job that an error has occurred on the way to processing (8); and executes the next operable job (9).

In the present embodiment, a job save is a process where information necessary for resuming job such as the status information of the S/P server 664 at an error job execution are stored, for example, in memory means (for example, hard disc), a memory in the S/P server device, or a program within the S/P server device.

Figure 37:
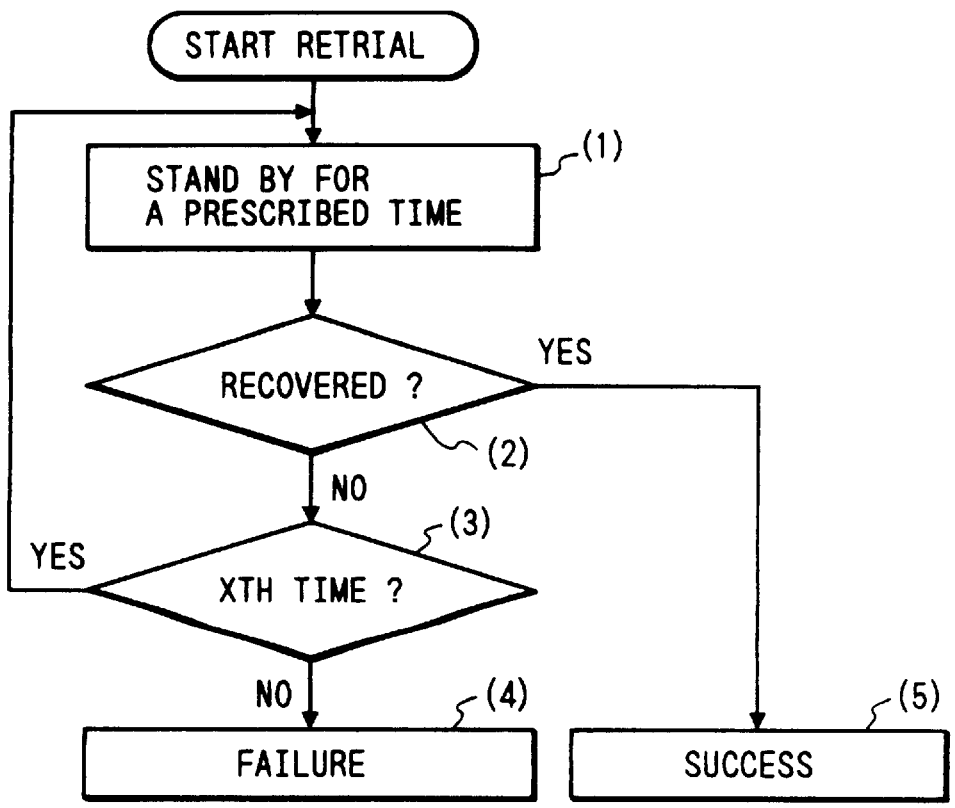
FIG. 37 is a flowchart illustrating an example of a procedure with which a retrial job is processed.

FIG. 37 is a flow chart showing an example of a retrial process procedure in the server device according to the present invention. Numerals (1) to (5) represents steps.

In the retrial process, it is examined whether the peripheral device in an abnormal state has been recovered the abnormal state (2) after waiting for a predetermined time (for example, 30 seconds) (1) and the process is repeated a predetermined times X (for example 5 times) (3). If the peripheral device is recovered from the abnormal state by the time the retrial is repeated the predetermined times, the retrial is judged to be succeeded. If the peripheral device is not recovered, it is judged that the retrial has been failed.

The multiprint control operation of the server device according to the present invention will be explained below.

The scanner/printer network server (SP network server) can be connectable to many devices including a color laser beam copying machine (CLC) constituted of a scanner and a printer, a thermal jet color copying machine (BJC) constituted of a scanner and a printer, a bit map printer connected to a standard interface, a PDL printer (CaPSL, PS), and commercially available scanners. The host machine on a network can control the following various jobs to use freely these devices.

For example, it is assumed that a request which outputs a 10 page document from the host computer A to the color laser beam copying machine is sent to the SP network server; the host computer B produces a request which inputs a color manuscript through the scanner of a thermal jet color copying machine (BJC); and the host computer C produces a request which outputs to the PDL printer. In such a manner, the SP network server receives various requests from the host computer on the network to execute the following job control to deal with the requests (jobs). In the present embodiment, each of the print request and the scan request is called a job. For example, it is assuemd that a request that outputs a three-page document described with the CaPSL code on the printer of the color laser beam copying machine (CLC) is a single job. Under the SP network server, only two jobs can be run at a time. However, running three or more jobs can be similarly controlled by expanding the control.

Explanation will be made below as for the job control operation in the server device according to the present invention with reference to FIGS. 38A to 38E.

FIGS. 38A to 38E is a timing chart used for explaining the job control state of the server device according to the present invention. The job process can be roughly classified into any one of the job controls 1 to 5 shown in FIGS. 38A to 38E by considering whether the SP network server prepares a hard disc for spool. For convenience in explanation, it is assumed that the jobs 1 and 2 a three-page print request or a three-scan request.

[Job Control 1]

Figure 38A:
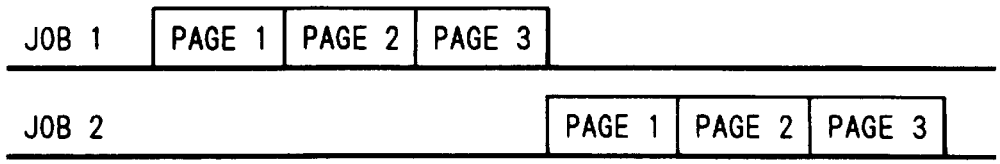
FIGS. 38A to 38E are timing charts illustrating a job control state in a server device according to the present invention.

The job control 1, as shown in FIG. 38A, executes the job previously requested and then spools the next job 2 in a hard disc, and activates the job 2 at the job completion time.

[Job Control 2]

Figure 38B:
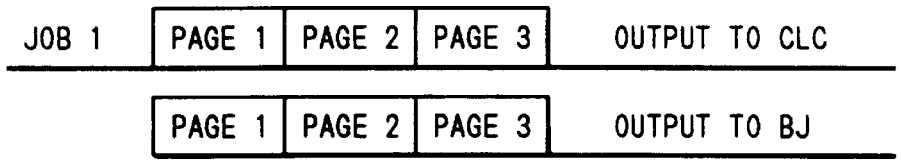

The job control 2, as shown in FIG. 38B, being a special case, corresponds to a control where two or more devices are operated with one job. For example, the situation corresponds to the image expanded in a memory output to the color laser beam copying machine (CLC) and a thermal jet color copying machine (BJC).

[Job Control 3]

Figure 38C:
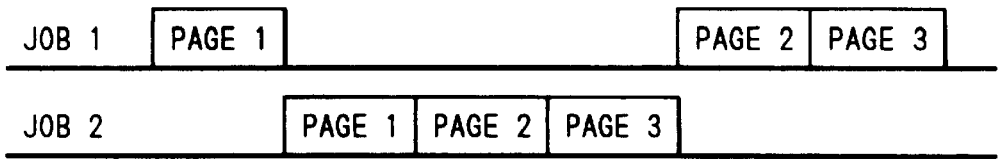

The job control 3, as shown in FIG. 38C, take in a concept which considers page in a job. In this case, the printing is represented in a page unit of document and the scanner is represented in a scan unit of a page of manuscript. For example, when the job 2 is requested during executing the job 1, the job 1 is interrupted at a break of a page, whereby the job 2 is performed. In this case, the job 1 never run together with the job 2 at the same time.

[Job Control 4]

Figure 38D:
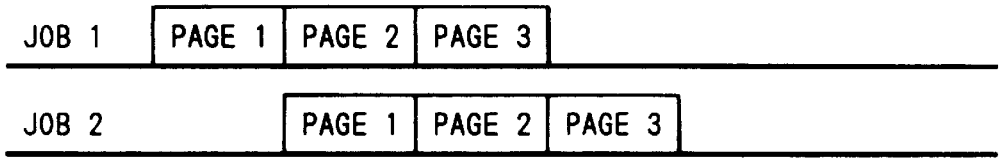

The job control 4, as shown in FIG. 38D, when being requested during executing the job 1, the job 2 is immediately executed with the job 1 operating.

[Job Control 5]

Figure 38E:
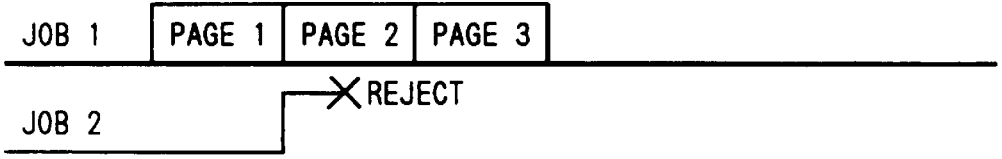

The job control 5, as shown in FIG. 38E, when being requested during executing the job 1, the job 2 is rejected.

In the case of the configuration of the server device shown in FIG. 1, the job is classified in the following items (1) to (7).

(1) Document is output to the printer of the color laser beam copying machine (CLC).

(2) A manuscript is read with a scanner of the color laser beam copying machine (CLC).

(3) Document is output to the printer of the thermal jet color copying machine (BJC).

(4) A manuscript is read with a scanner of the thermal jet color copying machine (BJC).

(5) Document is output to a printer including an interpreter of a commercially available page description language.

(6) Document is output to a commercially available bit map printer.

(7) A manuscript is read with a commercially available scanner.

The priority process of each job will be explained below.

According to the present embodiment, for example, when a scan job must be immediately performed during a printing job, three stages of the priorities 0 to 2 can be specified by interrupting the print job to execute the scanner job. The three stages includes the priority 0 representing no designation (fast-in fast-out), the priority 1 representing a priority interrupt designation in job unit, and the priority 2 representing a priority interrupt designation in page unit. Explanation will be made below as for the control operation of the SP manager in the server device according to the present invention with reference to FIG. 39.

Figure 39:
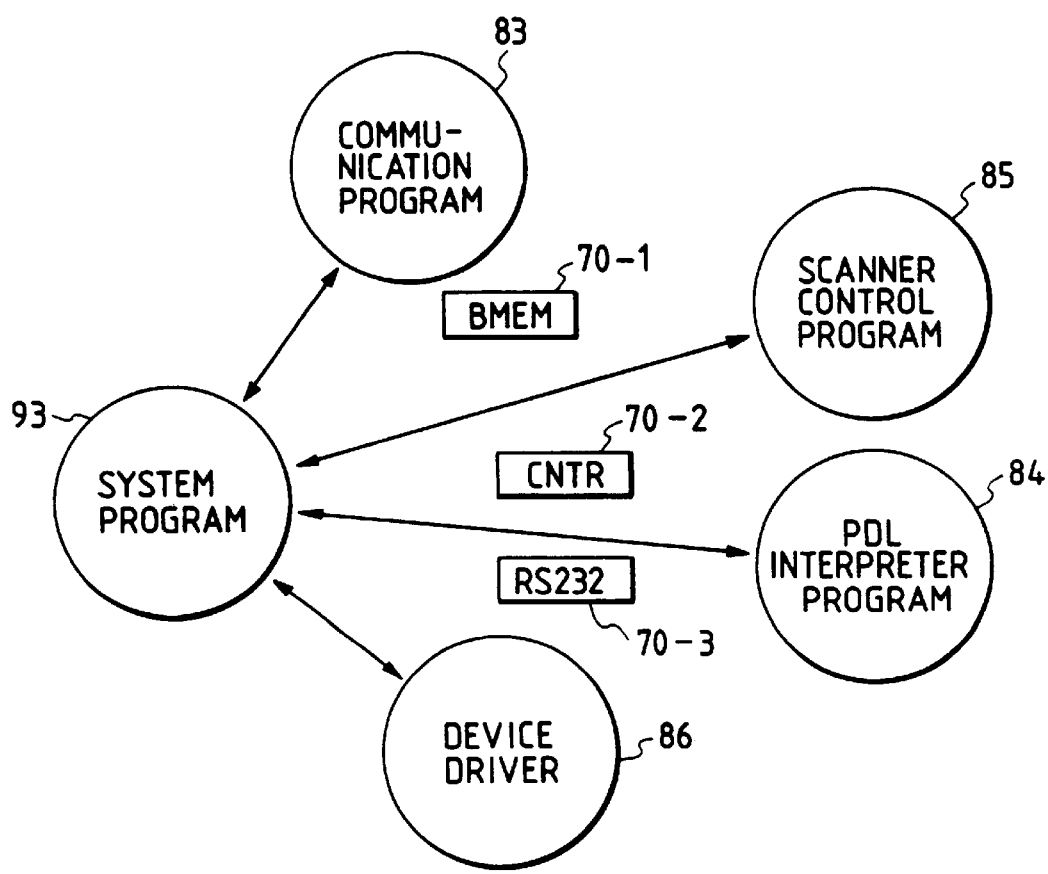
FIG. 39 is a view illustrating a processed state of a total system control program in a server device according to the present invention.

FIG. 39 is a diagram showing the control process status of the entire system control program 93 in the server device according to the present invention. In the present embodiment, the entire system control system 93 suitably controls the printer job with reference to the job priority and the job classification mainly sent from the host computer. The job management where a host computer on the network produces various requests to the SP network server will be explained below with the attached drawings.

First, the conceptual configuration of each program will be explained. As shown in FIG. 39, the program can be roughly classified into five programs including: the communication program 83 regarding communications; the entire system control program 93 controlling the entire SP network server; the scanner control program 85 controlling the scanner; the PDL interpreter program 84 regarding the print process (CaPSL interpreter); and device driver 86 actually controlling input/output devices. Moreover, there are as an actual data flowing interface the band memory (BMEM) 70-1, Centronics interface (CENTR) 70-2, and the RS232C interface (RS232) 70-3. The entire system control program 93 manages the above elements.

The entire system control program 93 basically runs based on events from four other programs. The event driven-type process is executed according to the flow chart shown in FIG. 40.

Figure 40:
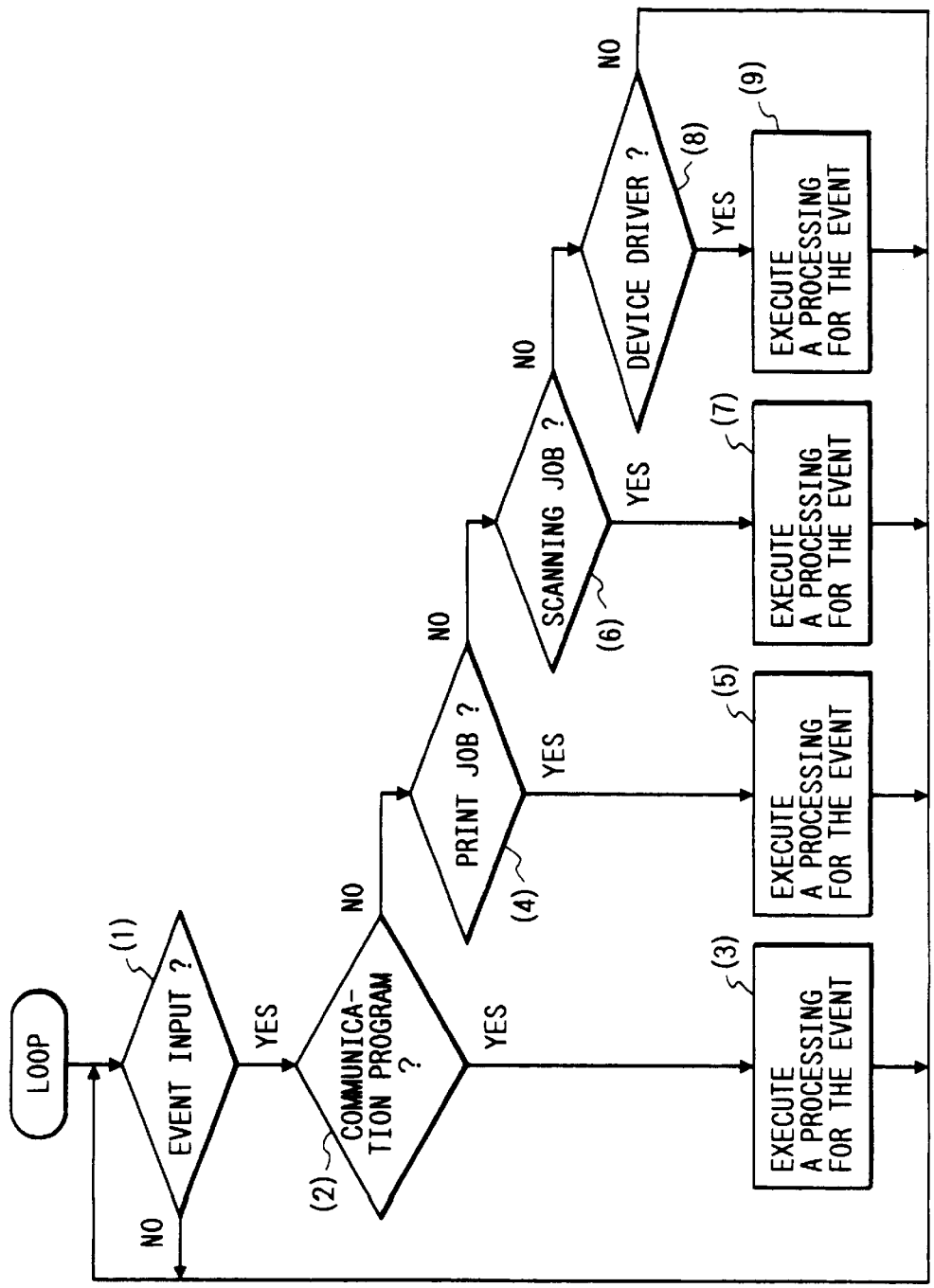
FIG. 40 is a flowchart illustrating an example of an event processing procedure performed by a total system control program shown in FIG. 39.

FIG. 40 is a flow chart showing an example of an event process procedure of the entire system control program 93 shown in FIG. 39. Numerals (1) to (9) represents steps.

First when the SP network server is powered on, the entire system control program is activated to make immediately an infinite loop in a waiting state. When the program starts to run, the situation becomes an event waiting state (1). When an event is input, the situation escapes from the loop. It is judged whether the event has come from the communication program 83 (2). If Yes, a process is performed corresponding to the event (3). Then the flow goes back to the step (1) to settle in an event waiting loop.

On the other hand, the judgment of the step (2) is No, it is judged whether the event issuance destination is the print job of the PDL interpreter program 84 (4). If Yes, a process is performed corresponding to the event (5).

On the other hand, the judgment of the step (4) is No, it is judged whether the event issuance destination is the scanner job of the scanner control program 85 (6). If Yes, a process is performed corresponding to the event (7).

On the other hand, if the judgment of the step (6) is No, it is judged whether the event issuance destination is the device driver 86 (8). If No, the process returns to the step (1). If Yes, a process is performed corresponding to the event (9) to return to the step (1).

The communication program 83 irregularly transmits various jobs including a job regarding the print of the color laser copying machine (CLC), a job regarding the scanner of the thermal jet color copying machine, and the like to the entire system control program 93. These plural jobs must be suitably distributed so far as the resources permit. The algorithm will be explained below with reference to FIG. 41.

Figures 41, 42:
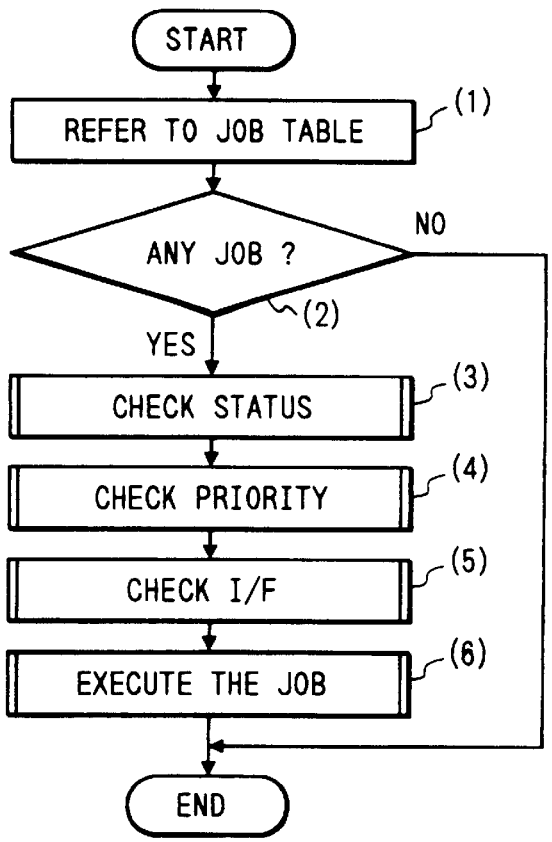
FIG. 41 is a view illustrating a job administration state in a server device according to the present invention.
FIG. 42 is a flowchart illustrating an example of a job execution procedure in a server device according to the present invention.

FIG. 41 is a diagram showing the job management status of the server device according to the present invention.

As shown in FIG. 41, a job table is used for the job management. The job table includes an ID to identify a job, a status showing a job state, a priority order to execute a job, a job kind, an end page, and an interrupt job ID.

ID represents a serial number or a job request accepting order. The status includes RUN indicating an execution, WAIT indicating a process waiting state, STOP indicating a stop state due to interruption, and ESTOP indicating a recovery waiting state after an error occurrence. The priority order includes LEVELS 0 to 2 including 0 usually indicating "no designation", 1 indicating "preferential interrupt in job unit" preferentially processed when some jobs are in a waiting state, and 3 indicating "interruption in page unit" processing the LEVEL 2 by interrupting the current job when there is a break in a page.

The interface, as shown in FIG. 39, indicating a hardware that the job uses, is arranged such that jobs can exclusively utilize the hardware. The job is CLCP for outputting document from the printer of the color laser copying machine (CLC), CLCS for reading a manuscript using a scanner of the color laser copying machine (CLC), BJP for delivering a manuscript using a printer of the thermal jet color printer, BJS for delivering a manuscript using a scanner of the thermal jet color printer, PDLP for delivering document to a printer included in a commercially available page description language interpreter, BITP for delivering document to a commercially available bit map printer, or a job for reading a manuscript using a commercially available scanner. The number of the page on which the job has completed is recorded on the end page. If an error occurs, the record is used to judge that from what page the process is resumed after an error recovery. The final interrupt job ID is used to judge whether the interrupt job has been terminated. If the job has been terminated, the job during STP is resumed.

Referring to the job table storing in the above information, the entire system control program 93 judges suitably whether any one of the following jobs is activated.

The job execution process operation of the server device according to the present invention will be explained below with reference to the flow chart shown in FIG. 42.

FIG. 42 is a flow chart showing an example of the job execution process procedure in the server according to the present invention. Numerals (1) to (6) represent steps.

The timing when the control is shifted to the flow is described next. (1) The control shifts to the flow at fixed interval in an idle state while an event does not enter the entire system control program 93. If the job table does not include any job, the situation returns to an idle state. (2) There is an event from the communication program 83. (3) There is an event of page termination or an event of a document termination from the PDL interpreter program 84 and the scanner control program 85. (4) There is an event of error from the device driver 86.

First the job table shown in FIG. 41 is referred in the step (1). Next, in the step (2) it is judged whether there is a job. When there is no job to be executed, the flow returns to the step (7). Then the entire system control program 93 become an idle state. When there is a job to be executed, some operable job candidates are selected in the step (3). In the step (4), a single job is finally selected in consideration with the priority order of the job candidates. Furthermore, it is judged whether the interface to be used for the job finally selected in the step (5) is empty. In the step (6), the job is actually performed and then the process is terminated.

The operation of the status check process in the server device according to the present invention will be explained below, with reference to the flow chart shown in FIG. 43.

Figure 43:
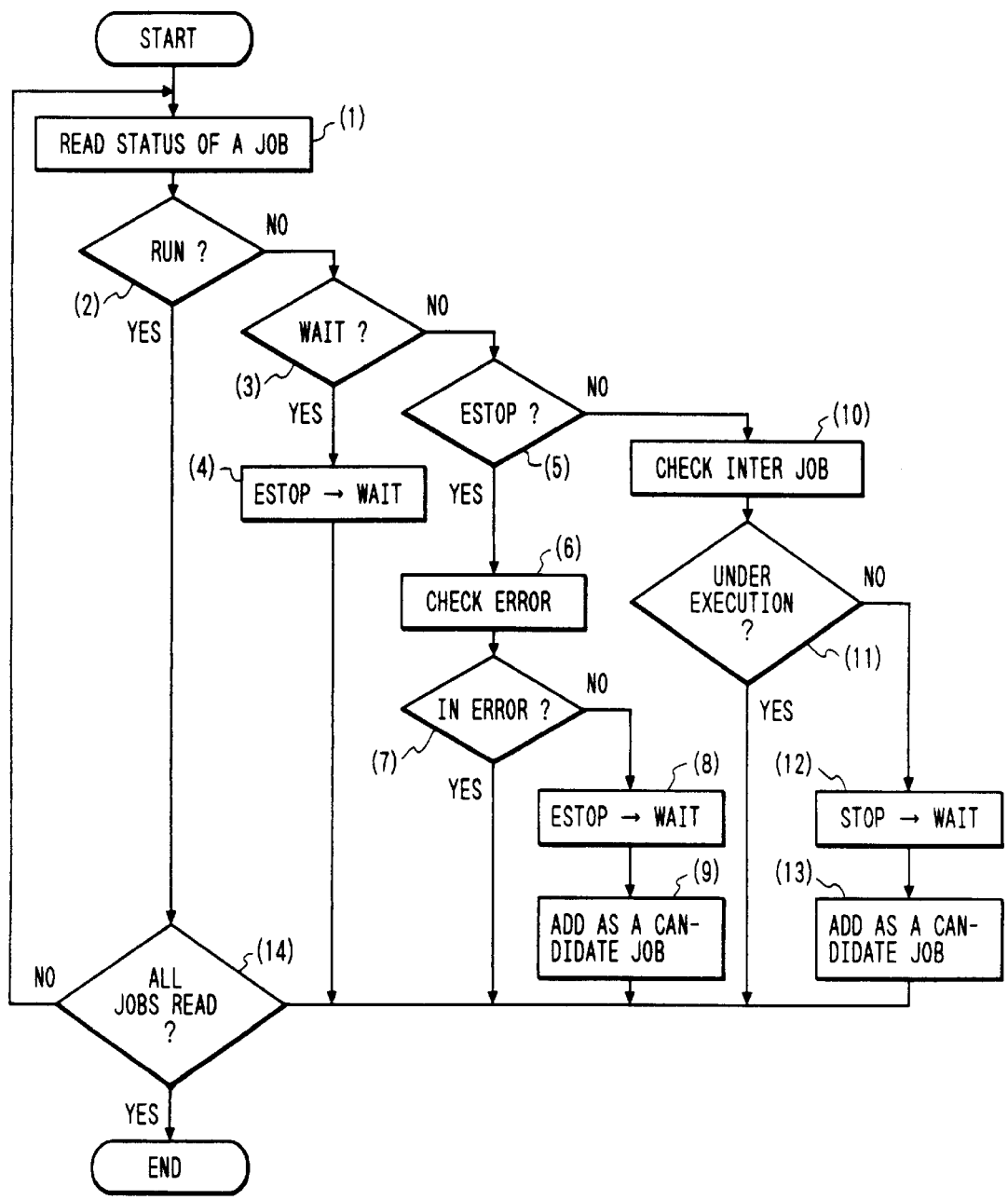
FIG. 43 is a flowchart illustrating an example of a status check procedure in a server device according to the present invention.

FIG. 43 is a flow chart showing an example of the status check process procedure in the server device according to the present invention. Numerals (1) to (14) represent steps.

First, in the step (1), a job status is read out of the job table. In the step (2), it is judged whether the job status is RUN. If RUN, the flow is shifted to the step (14) to judge whether all jobs in the job table have been read up. If some jobs remain unprocessed, the flow goes to the step (1) to read the next job status. If not RUN, the flow goes back to the step (3). In the step (3), it is judged whether the job status is WAIT. If WAIT, it is picked up as an operable job candidate in the step (14) and then the flow goes to the step (14). If not WAIT, it is judged whether the job status is ESOP. If the job status is ESOP, the job is interrupted due to an error occurrence. Hence, it is judged whether the error causing the job interruption is removed in the step (6). The step (7) is a branch for judging whether the job is in an erroneous state. If the job is still in the erroneous state, the flow goes to the step (14) without picking up an operable job candidate. When the error is removed, the status of the job in the job table is rewritten from ESTOP to WAIT. In the step (9), the written job is picked up as an operable job candidate. When the status is not ESTOP in the step (5), the status of the job which interrupts in the step (10) is checked because the flow is in STOP state being interrupted by another job. In the step (11), it is judged whether the interrupting job is in execution. If the job is being executed, the flow goes to the stop (14) without picking up the operable job candidate. If the job is not being executed, the flow goes to the step (12) to rewrite the job in the table from STOP to WAIT. Thus the job is picked up as a job candidate operable in the step (13). Finally when all jobs have been read (14), the status checking is completed. In such a manner, plural operable job candidates are selected.

Explanation will be made below as for the priority checking operation in the server device according to the present invention with reference to the flow chart shown in FIG. 44.

Figure 44:
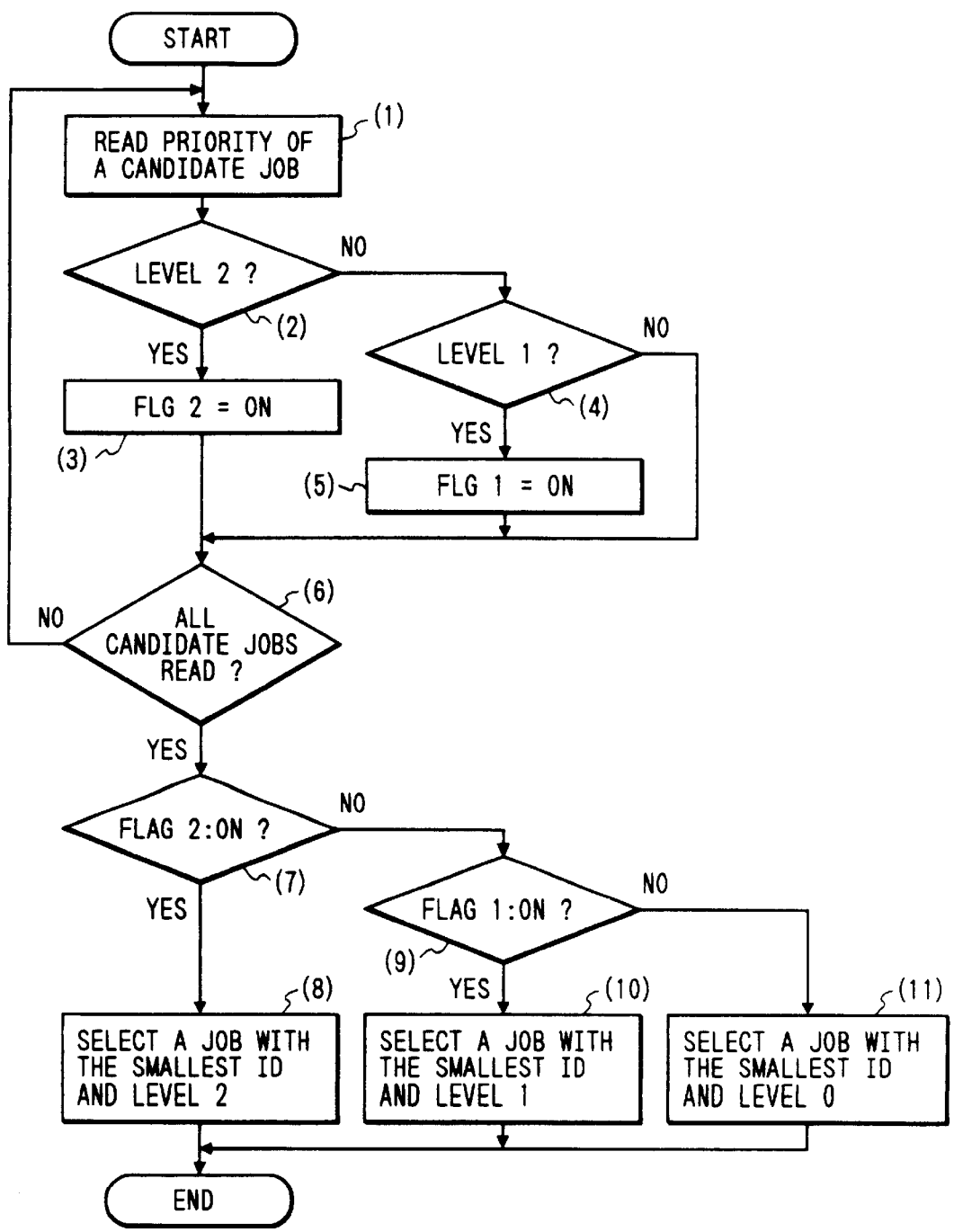
FIG. 44 is a flowchart illustrating an example of a status check procedure with a top priority order in a server device according to the present invention.

FIG. 44 is a flow chart showing an example of the priority checking procedure in the server device according to the present invention. Numerals (1) to (11) represent steps. In the present embodiment, only one job is finally selected in consideration of the priority of the job candidates.

In the step (1), the priority is read to one of the plural operable job candidates. In the step (2), it is judged whether the priority is the LEVEL 2. If LEVEL 2, the flow goes to the step (3) to set a flag FLG2 representing whether the job of the LEVEL2 exists. If not LEVEL2, the flow goes to the step (4) to judge whether the priority is LEVEL1. If LEVEL1, the flow goes to the step (5) to set a flag FLG1 representing whether the job of the LEVEL1 exists. If the priority is not LEVEL1, it becomes LEVEL0. That is, when neither or the FLG2 and FLG1 are set, the priority becomes the LEVEL0.

When the priority of one job has been completely judged, the flow goes to the step (6) to judge whether all job candidates have been checked. If the checking has not been completed, the flow goes to the step (1) to judge the next job. If the checking has been completed, the flow goes to the step (7). When the flag FLG2 is set, the flow goes to the step (8) to select a job with a priority of LEVEL2 and a small ID (accepted at earlier job request).

In the similar manner, a job with a priority LEVEL1 and a small ID is selected in the steps (9) and (10). In the step (11), a job with a priority LEVEL0 and a small ID is selected. Then the priority checking is finished.

As described above, only one next operable job can be selected. Even if an operable job is determined, the relationship between the job and the interface must be examined because the status of the interface determines the actual activation.

The interface checking operation in the server device according to the present invention will be explained below with reference to the flow chart shown in FIG. 45.

Figure 45:
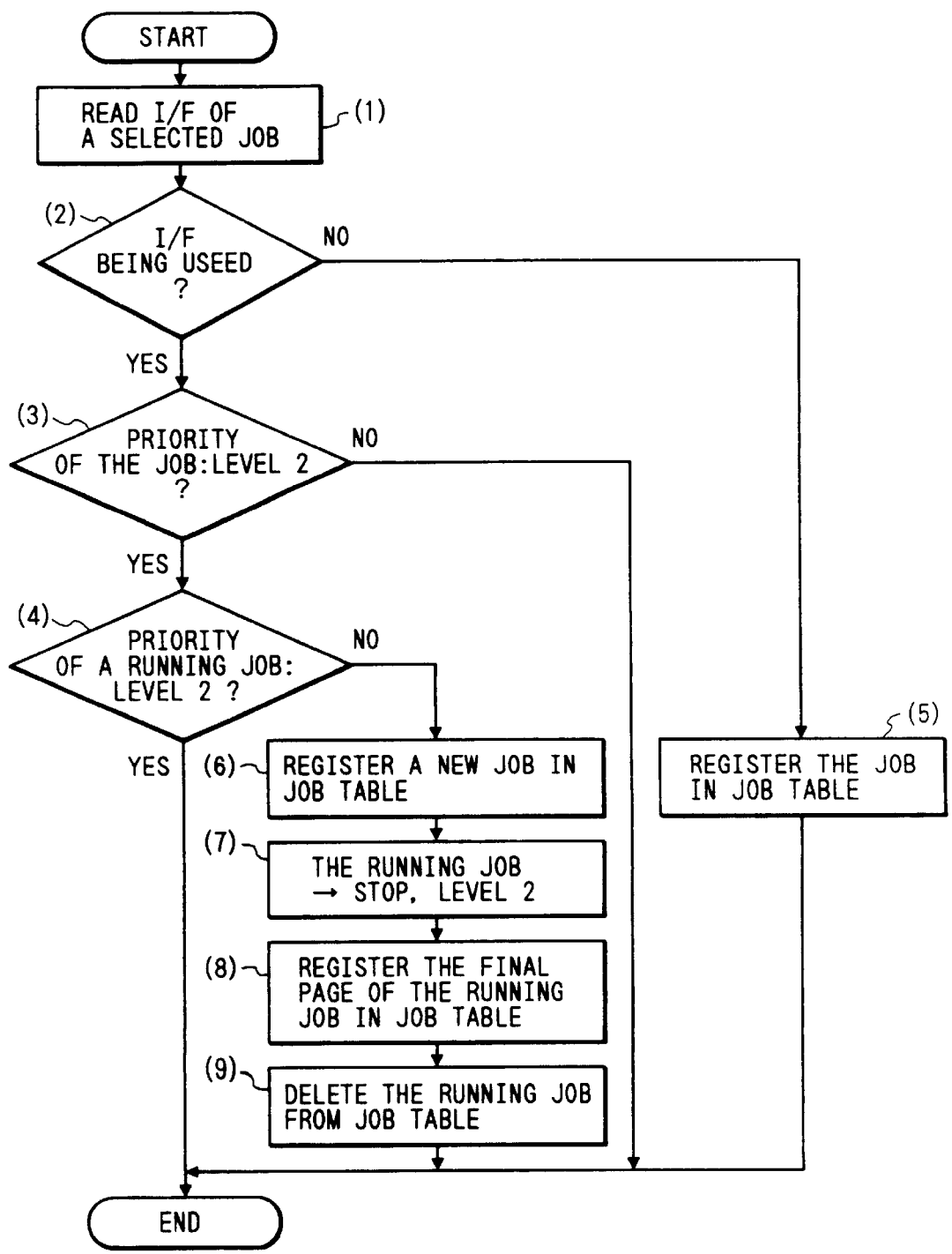
FIG. 45 is a flowchart illustrating an example of a interface check procedure in a server device according to the present invention.

FIG. 45 is a flow chart showing an example of the interface checking procedure in the server device according to the present invention shown in FIG. 45. Numerals (1) to (9) represent steps.

In the step (1), the interface of the job finally selected is read from the job table. The status of the interface is checked in the step (2). If the interface is not in use, the flow goes to the step (5) to register the job in the execution job table. The execution job table being a table representing an actually activated job can be run with a multi-job mode to register plural jobs.

The job process in the step (6) is activated with reference to the execution job table.

When the interface is in use, the flow goes to the step (3) to check the job priority. If the priority is not LEVEL2, the current job cannot be interrupted so that the process is ended without registering the execution job table. When the priority is LEVEL2 in the step (3), the step (4) judges whether the job of the current status RUN is LEVEL2. Since the job of RUN in LEVEL2 cannot interrupt the current job, the process is terminated without registering the selected job on the execution job table.

On the other hand, when the priority of the current job (status RUN) is LEVEL1 or LEVEL2, the current job is interrupted to activate a newly selected job. In this case, the flow goes to the step (6) to register the job selected in the step (4) in the execution job table. In the step (7), the current job is set to the status of STOP and the priority of LEVEL2 to execute preferentially when the job is recovered.

In the step (8), the number of end page is written in the job table to record that how many pages the current job has processed. Moreover, in the step (9), the current job is deleted from the execution job table. The current job is not activated while the status becomes STOP to wait for re-activating the job. Thus the interface checking is terminated.

Explanation will be made below regarding the jab activation process operation in the server device according to the present invention with reference to the flow chart shown in FIG. 46.

Figure 46:
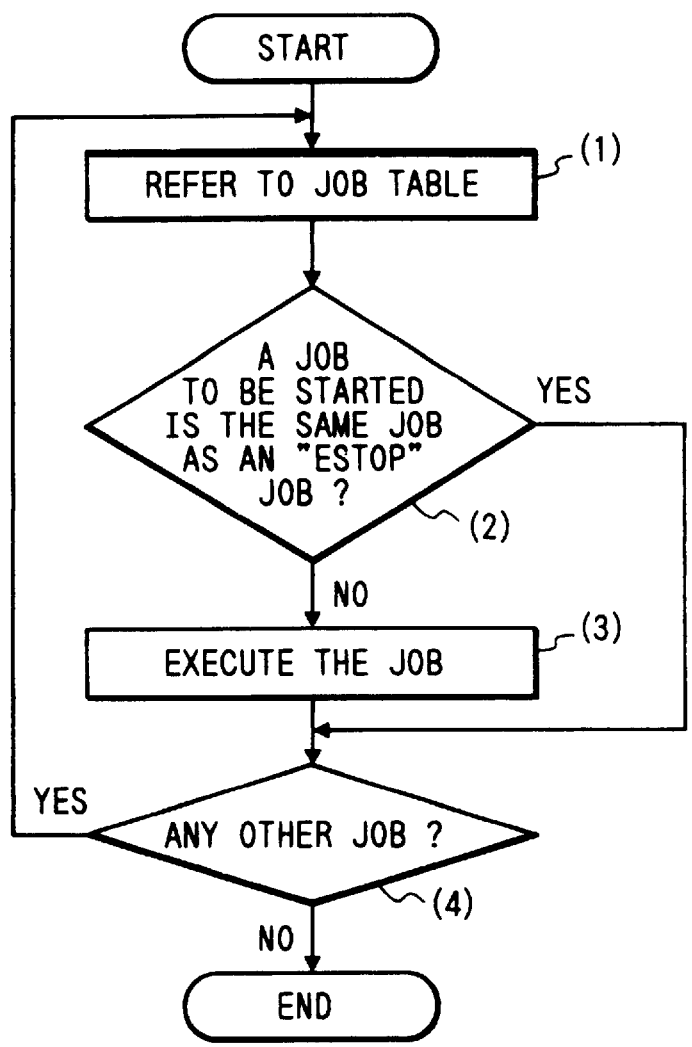
FIG. 46 is a flowchart illustrating an example of a job initiation procedure in a server device according to the present invention.

FIG. 46 is a flow chart showing an example of the job activation process procedure in the server device according to the present invention shown in FIG. 46. Numerals (1) to (4) represents steps.

In the step (1), the job to be activated is first read with reference to the execution job table. In the step (2), it is judged whether the job to be activated later resembles the job being in an error stop in the status ESTOP. Since the job being of the same kind cannot be activated, the flow goes to the step (4) to judge whether the execution job table have been completely read. If not so, the flow goes to the step (1) to activate the next job. If the job in an error stop is of a different kind, the flow goes to the step (3) to activate the job. When an actual job is activated, the status is changed from WAIT to RUN to ensure the interface. On contrary, when an error stop or an interruption stops the process, the interface is released.

It is judged whether a job is left in the execution job table in the step (4). If there is no job to be activate, the job activation process is ended.

A job process operation in the server device according to the present invention will be explained in concrete with reference to FIGS. 47 to 57.

Figure 47:
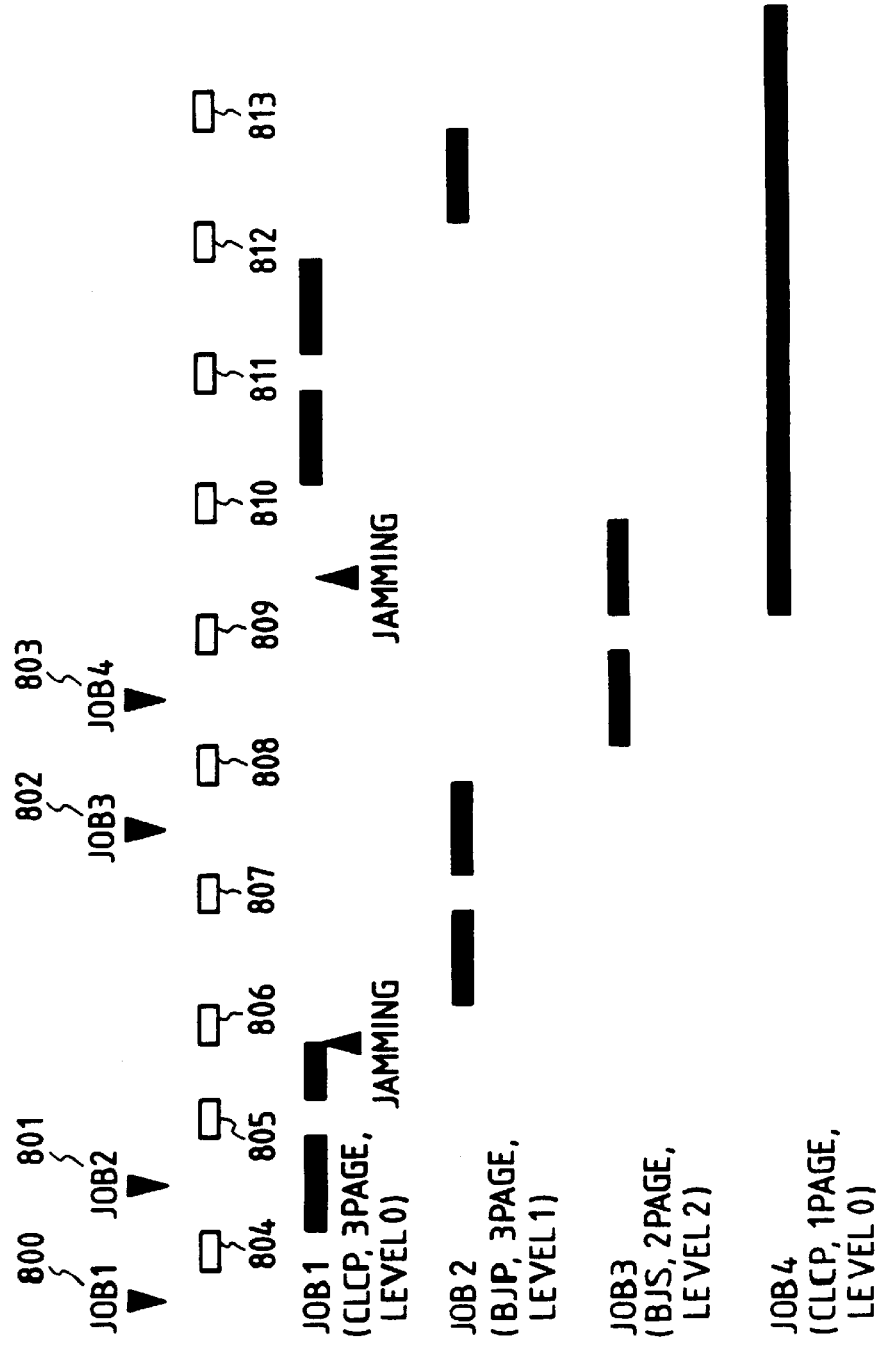
FIG. 47 is a timing chart illustrating a job processing transfer state in a server device according to the present invention.

FIG. 47 is a timing chart showing the changes of the job process status in the server device according to the present invention. In the figure, it is assumed that time passes in the right direction along the axis of abscissa.

In FIG. 47, numerals 801 to 813 represents a job table checking timing. The timings 800 to 803 respectively represent a timing that a job event enters from the communication program 83 to the entire system control program 93. The timings 801 to 813 respectively correspond to a job table checking timing.

FIGS. 48 to 57 respectively are a diagram showing the content of the job table accompanying the job process in the server device according to the present invention. FIGS. 48 to 57 respectively correspond to the job table at the timings 804 to 813. The job table shows the content immediately before checking. The job is CLCP for delivering document from the printer of a color laser copying machine (CLC), CLCS for reading a manuscript through the scanner of a color laser copying machine (CLC), BJP for delivering document to the printer of the thermal jet color copying machine, BJS for reading a manuscript through the scanner of the thermal jet color copying machine, PDLP for delivering document to the printer including a commercially available page description language interpreter, BITP for delivering document to a commercially available bit map printer, or a job reading a manuscript through a commercially available scanner.

A job event enters at the timing 800. The content is a job 1 (the content of CLCP) which outputs document to the printer of the color laser copying machine (CLC) and includes an output page number of 3 pages, a priority of LEVEL0, and an interface BMEM. In the job table JOBT, the ID "25" shown in FIG. 48 is allocated, the status is WAIT, and the end page is 0 page because of no process.

In the job table checking at the timing 804, ID25 job is selected and activated. Then the status of the ID25 job is changed to RUN. A new job enters at the timing 801. When one page processing in the ID25 job has been completed, the entire system control program 93 examines again the job table. FIG. 49 is the corresponding job table JOBT, showing the status where the job of ID25 waits for processing the next page after a complete delivery of one page. The end page changes from 0 page to 1 page. A newly entered job is allocated with the ID26. The status is WAIT with the priority of LEVEL1. The interface is BMEM and the job is BJP. The entire system control program 93 judges with reference to the job table JOBT to activate to process 2 page of the ID25 job.

At this time, it is assumed that the ID25 job cannot be continued because a paper jam occurs in the printer on the way to printing the 2 page. The entire system control program 93 searches the next job to be activated with reference to the job table JOBT shown in FIG. 50. The status of ID25 is ESTOP. The priority is LEVEL2 to execute preferentially at a recovery time. The end page remains to be 1 page. Then the entire system control program 93 activates the job of ID26. When the ID26 job terminates the process of 1 page, the entire system control program 93 goes to the check 807 of the job table JOBT. This situation is shown in FIG. 51. The ID25 job is not activated because the error has not been recovered after the error checking. Then the entire system control program 93 requests the PDL interpreter program 84 to process the 2 pages of the ID26 job.

While the job of ID26 is processing 2 page, a new job event enters the entire system control program. The content means reading the manuscript of 2 page by means of the scanner of the thermal jet color copying machine. When the job of ID26 has completely processed 2 page, the entire system control program 93 checks the job table JOBT, as shown in FIG. 52.

ID25 remains as it is because of no error recovery. When the job of ID26 has completed the 2 page processing, the end page changes to 2. Moreover a new job is allocated to ID27. Since the ID27 job has a priority of LEVEL2, the entire system control program 93 interrupts the ID26 job during currently operating to activate the ID27 job. In the ID26 job, the status becomes STOP and the priority becomes LEVEL2.

While the scanner control program 85 read a manuscript of 1 page, a new job event enters the entire system control program 93 at the timing 803. When the 1 page reading has completed, the entire system control program 93 checks the job table shown in FIG. 53 at the timing 809. The ID25 job remains ESTOP because the error state is not recovered. The ID26 has a status of STOP and an interrupt job ID of 27. Therefore, when the ID27 job is checked, the status cannot be resumed as it is in a RUN state. Thus ID28 is allocated to a newly entered job. The ID28, which a job where data enters a commercially available printer through a centronics interface, can be simultaneously run together with the currently activated job. The entire system control program 93 simultaneously activates the jobs which scan the second pages of the ID27 and ID28.

Next the entire system control program 93 goes to the job table JOBT checking (timing 810). The job table JOBT is shown in FIG. 54. Since the error of the job ID25 is removed prior to the job table JOBT checking (timing 810), the status returns to WAIT after error checking.

Since the interrupted ID27 job has completed, the status of the ID26 job returns to WAIT. However the ID28 job remains to be in RUN state. The entire system control program 93 activates the job of the ID25 or ID26 because the interface BMEM is empty. Since either job has a status of WAIT as well as a priority of LEVEL2, the precedently accepted job of ID25 is activated. In this case, since the end page is 1 page, the ID25 job must deliver a request to the PDL interpreter program 84 to start the process from the second page.

The job table JOBT checking (timing 811) follows the table shown in FIG. 55. In the ID25 job as well as the ID28 job, the status is RUN. In the ID26 job, the status is WAIT. The ID26 job has a priority of LEVEL2 and can interrupt to the currently activating job. However, since the ID25 is activated with LEVEL2, the ID26 cannot perform an interruption.

The process goes to the job table JOBT checking (timing 812) shown in FIG. 56. The ID25 job, already completed, is deleted from the job table JOBT. The entire system control program 93 activates from the third page of the ID26 job.

Figures 57, 58:
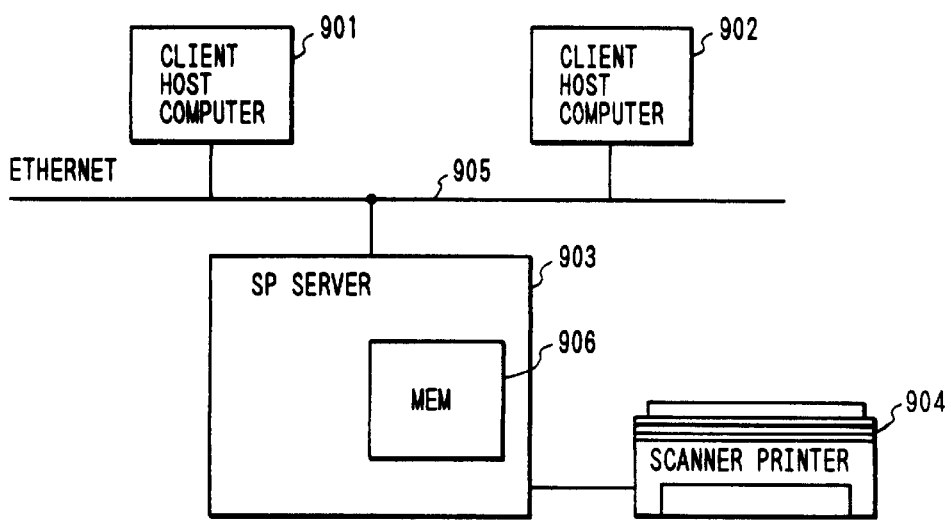
FIG. 57 is a table illustrating a content of a job table in response to a job processing in a server device according to the present invention.
FIG. 58 is a block diagram illustrating a structure of a server device of the second embodiment according to the present invention.

In the job table JOBT checking (timing 813), since the ID 28 job, as shown in FIG. 57, is running, the entire system control program 93 does not activate a new job.

As described above, the entire system control program 93 executes a suitable job management with reference to the job table JOBT.

In the above embodiment, after the host computer edits letters, drawings, and images, a print request communicated via the network is processed on the server device which drives a scanner/printer to deliver the result from the printer. However, as shown in FIG. 58, in the system where the SP server device 903, which drives the client host computers 901 and 902 and the scanner printer 904, is connected via the network 905, the SP server device 903 may synthetically edit various information such as letters and drawings transferred from the client host computers 901 and 902 to deliver the combined output.

FIG. 58 is a block diagram used for explaining the configuration of the server device showing the second embodiment of the present invention.

In FIG. 58, the memory device 906 in arranged within the SP server 903 to store various information such as letters and drawings transferred from the client host computers 901 and 902.

In the server device with such a structure, the processing load to the image information output from each host computer can be released and the stored image information can be effectively re-utilized because the memory means (memory device 906) arranged on the main body or the network stores the first image information delivered from the image processor or the second image information delivered from each host computer connected to a predetermined network.

Since the image synthesis means synthesizes the first and second image information stored in the memory means (memory device 906) to deliver the resultant output (the scanner printer 904 in the present embodiment), the image editing load on each host computer can be released.

In the present embodiment, an operator produces letter information and drawing information on the client host computers 901 and 902, for example, with a word processor or based on the graphic software. The information (first image information) regarding produced letters, drawings, or the like is transmitted to the SP server device 903 via the network 905. The information regarding letters and drawings received in the SP server device 903 is stored in the memory device 903 within the SP server device 906.

Figure 59:
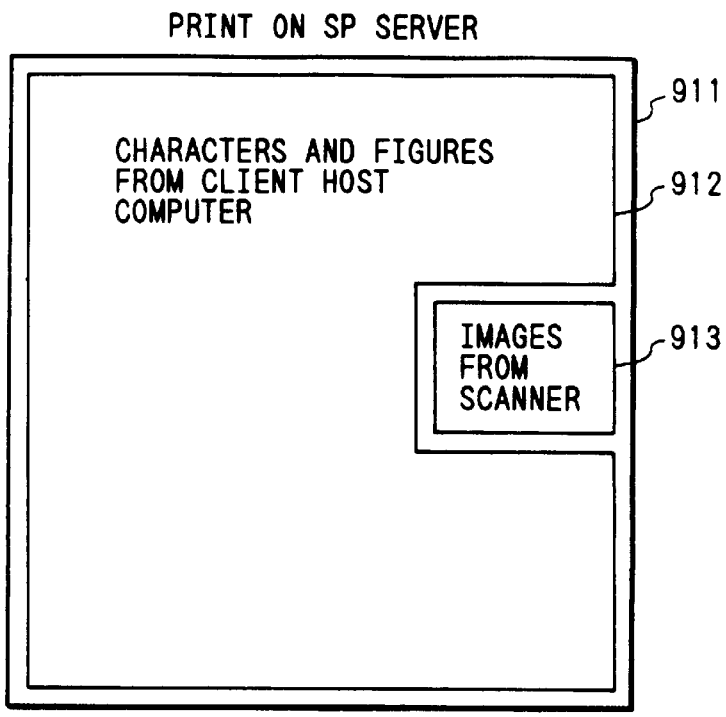
FIG. 59 is an explanatory view illustrating a printed layout synthesized by an SP server device shown in FIG. 58.

The image information (second image information) scanned with the scanner printer 904 is stored in the memory within the SP server device 903. As shown in FIG. 59, using the page description language operating on the SP server device, the information regarding letters, drawings and images (image data) are synthesized in the memory device 906 within the SP server device 903.

FIG. 59 is a model diagram showing a print layout synthesized using the SP server device, as shown in FIG. 58.

In figure, numeral 911 represents a one page region. The transfer information 911 regarding letters, drawings transferred from the client host computers 901 and 902 via the network 905, or the like, as well as image information 913 scanned by the scanner printer 904 controlled by the SP server 903 are allocated in the region 911 according to the layout information. The synthesized information can be output from the printer of the SP server device 903.

The scanner printer 904 controlled by the SP server device 903 may be constructed as a discrete configuration independent of the scanner and the printer. In order to perform a printing, the memory device 906 in the SP server device 903 successively reads in the image information read using the scanner in the scanner printer 904 to synthesize with the information letters and drawing sent from the client host computers 901 and 902. Instead, when another memory device with large memory capacity, or a magnetic optical disc device, is connected to the SP server 903, an image database can be constructed by sequentially memorizing scan images in the large memory device so that the image can be arbitrarily read out of the large memory device printed to print the image by synthesizing the letters and drawing information. Furthermore, when the large memory device is arranged independently of the memory device 906 of the SP server device 903, it is not necessary to directly connect the large memory device to the SP server device 903. The client host computers 901 and 902 may have a different configuration to transfer information to the SP server device 903.

Referring to FIG. 60, there is illustrated in the form of a schematical block diagram the construction of data control for an SP server (picture image I/O controller) and an image I/O apparatus which constitute an embodiment of the present invention.

In the same figure, designated at 2001 is an image I/O controller (color SP server SP1 shown in FIGS. 2A and 2B), in which a communication unit 2002 is interconnected with a communication line 2008 (Ethernet LAN 96 shown in FIGS. 2A and 2B) for interconnection with a plurality of host computers (not shown) started with different OSs. Designated at 2003 is an image generator, which analyzes print data received by the CPU 1000 based upon the communication program 83 stored in the communication unit 2002, and stores image data in an image memory 2005 (e.g., a RAM). Designated at 2004 is a memory (e.g., a RAM) and serves as a reception buffer and a work memory and the like. Designated at 2006 is a controller, in which the CPU 1000 controls communication with a designated image I/O apparatus 2007 based upon the device driver 86 shown in FIGS. 2A and 2B.

In the present embodiment, the image I/O controller 2001 communicates with the other host computers through the communication line 2008, and inputs and prints out an image through the image I/O apparatus 2007 interconnected threreto. The image input/output apparatus 2007 may not always serve to input and output any image, and may be an ordinary printer. The image I/O apparatus may also be a combined I/O apparatus in a network constructed with a copying machine, a FAX, and a printer and the like. In the following, operation will be described.

As print data is set from the host computer (not shown) through the communication line 2008, the communication unit 2002 receives it and stores the same in the reception buffer, and is further transmitted to the image generator 2003 analyzes the print data, and the CPU 1000 develops image data on the image memory 2005 based upon the PDL interpreter program 84 shown in FIGS. 2A and 2B. The print data 80 transmitted is described by a page descriptor language and is converted to printable image data by the image I/O apparatus 2007 based upon the overall system control program 93 stored in the image generator 2003 and the PDL interpreter program 84. Once the print data corresponding to one page is analyzed and the image data is completed to be developed in the image memory 2005, the CPU 1000 transmits a signal to the controller 2006 based upon the overall system control program 93 stored in the image generator 2003, and the CPU 1000 further transmits the image data stored in the image memory 2005 based upon the device driver 86 in the controller 2006 to the designated image I/O apparatus 2007 and prints out the same.

The CPU 1000, once finding any error in the analysis of the printing data based upon the overall system control program 93 in the image generator 2003, informs the host computer which transmitted the printing data, of a fact of the error being produced through a communication unit 2002, for an inquiry of whether the error should be skipped for continuation of the printing work or the printing work should be halted. The host computer 9 which is informed of the fact of the error being produced wait an input such as instructing an error skip or halting the printing operation from a user, and outputs information associated therewith to the server in response to an input of instructed information.

In the case where printed data is transmitted from another host computer in the course of the above-described operation, information of the status of the printer before that time is stored in the memory 2004, and the original host computer is informed of the fact that the printing work is halted through communication and new printing work (printing job) is started. As the new printing work is completed, it is inquired of the original host computer whether or not the printing work should be resumed, and if there is transmitted a signal indicative of resuming the printing work, stored information is read out and the printing work is resumed. The information of the printing status includes information of specifying a host computer which outputted the printing data to the server, and information indicative of which file in the printing data and data at which page are now processed.

In the following, there will be described a method of printing control in the server (image I/O controller) according to the present invention with reference to a flowchart of FIG. 6.

Referring to FIG. 61, there is depicted a flowchart illustrating a method of controlling the printing work by a server of an embodiment of the present invention. In the same figure, designated at (1) to (13) are respective steps, in which the CPU 1000 shown in FIG. 9 for example executes the operation of each step on the basis of the overall system control program 93 and the PDL interpreter program 84 and the like.

The CPU 1000, as first receiving printing data (1), judges whether or not the received data is a signal of completing the print work (2), and if it is so, then the CPU 1000 completes the printing work in step (3), and returns to step (1). Thereupon, if there is printing work having already been halted, the CPU 1000 inquires of a host computer which outputted the halted printing data whether or not the printing work should be resumed.

In contrast, if the received signal is judged not to be the completion signal in step (2), the received signal is judged on whether or not it is a signal of resuming the printing work in step (4). If the received signal is the resuming signal, information concerning the status of the printing which has been halted is read out of the memory 2004, and the printing work is resumed on the basis of that information. If there is no printing work which has been halted or present printing work has normal been advanced, no further work is made.

In contrast, if the received signal is not the resuming signal in step (4), it is judged whether or not there is inputted information of instructing an error skip in step (6), and if that information has been inputted, then printing data where any error has been produced is skipped in step (7), and the CPU 1000 returns to step (1). However, nothing is made if no error has been produced. If there is inputted information of instructing an error skip, the CPU 1000 advances to step (8) in which it is in turn judged whether or not the received signal is a starting signal for printing work. If it is so, then information concerning the status of the printing work is stored in the memory 2004 in step (9). However, if no error is produced or the present work is not in the course of the printing work, then nothing is made. If the received signal is not the starting signal for printing work, then the CPU 1000 advances to step (10), in which the printing data is analyzed, and if it is judged on the basis of a result of the judgement whether or not the printing data includes any error in step (10). If any error is existent in the printing data, then it is inquired of the host computer which transmitted that data whether the error should be skipped or the printing work should be halted, and the CPU 1000 returns to step (1).

In contrast, if any error is not included in step (11), then the CPU 1000 advances to step (13) in which image data based upon the printing data is developed on the image memory 2005, and the CPU 1000 returns to step (1).

In accordance with the image I/O control method of the first server of the present invention, as described above, there is stored information concerning the printing status at the time of error generation in the course of the execution of the printing function processing, and after subsequent other printing function processing have been completed, the processing of the printing function is resumed on the basis of the printing status. It is therefore made possible to shorten the halt time of the processing of the server caused by any error in the course of the execution of the printing function processing as well as precede the operation by a request of executing succeeding other processings of the printing function.

It should herein noticed in the present embodiment that to store the information of the status of the printing work in the memory 2004 is to store variables in the program stored in the image generator 2003, and when the printing work is desired to be resumed, the halted status can be reproduced by reading out the information of the status of the printing work and replacing the same in the variables of the program.

In the present embodiment, it any error is produced in the course of the printing work, another printing work may be carried out, and after the just-mentioned printing work has been completed, the former preceding printing work may be resumed from the halted status thereof with reference to the status information of the printing work stored in the memory 2004. Accordingly, for the image I/O control wherein it waits after any error is produced until an answer from the host computer which transmitted that data is received, the present embodiment ensures the effective use of the image I/O apparatus 2007 particularly compared with the printer control.

Figure 62:
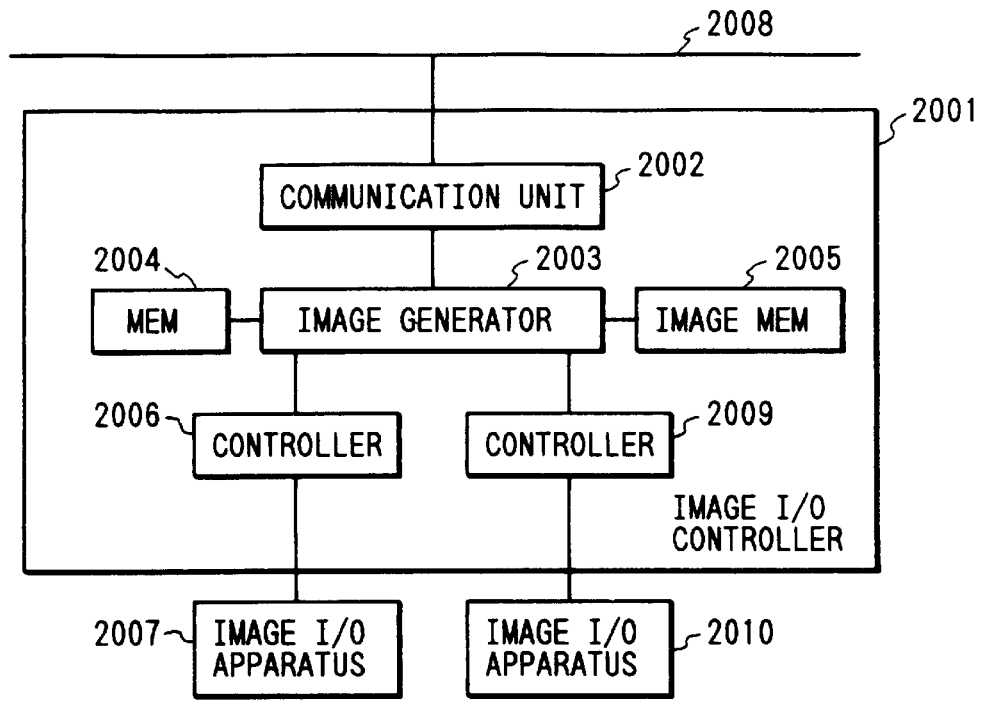
FIG. 62 is a schematic block diagram illustrating a communication control structure between a server device of another embodiment according to the present invention and a video image terminal device.

Although in the above-described embodiment there was described the case of the printer control taking in an exemplified manner the case where the signal image I/O apparatus 2007, say, the color scanner/printer 94 illustrated in FIGS. 2A and 2B is connected with the image I/O controller 2001, the present invention may be applied to the server 2001 where there are connected a plurality of the image I/O apparatus, for example further one apparatus as illustrated in FIG. 62. Further, a plurality of the image I/O apparatuses may be connected with the server 2001 without limitation of the number of the image I/O apparatuses.

Referring to FIG. 62, there is depicted a schematical block diagram illustrating the construction of data control in the server and the image I/O apparatus which demonstrate another embodiment of the present invention, in which identical symbols shall be applied to those of the components illustrated in FIG. 60. To be concrete, the constituent components illustrated in FIGS. 2A and 2B will be employed.

In the same figure, numeral 2009 denotes a controller for controlling the printing/scanning of an image I/O apparatus 2010.

In the case in the server constructed as described above where any error is produced in the course of printing work of any one of the image I/O apparatuses and an instruction of printing is inputted into the other image I/O apparatus through a communication unit 2002, information of the status of printing in the course of the printing is stored in a memory 2004, whereby printing work is performed to the other image I/O apparatus and after completion of the printing the printing work may be resumed at the time the image I/O apparatus which produced the error is resumed.

In the case where an instruction of printing is sent to the other image I/O apparatus 2010 at the time printing paper is expired in the one image I/O apparatus 2007 in the course of the printing and hence the printing is impossible, state information indicative of the way of the printing is stored in the memory 2004, and a CPU 1000 instructs based upon a device driver 86 the printing processing to the other image I/O apparatus 2010 to be performed. And thereafter the CPU 1000 resumes the printing of the image I/O apparatus 2007 which has now been halted with reference to the status information on the way of the printing have been stored in the memory 2004. Since in the prior art there is no means to store the status information on the way of the printing, it is impossible to temporarily halt the printing processing and resume the same, and hence it is impossible to perform printing control on the image I/O apparatus 2007 wherein printing to the other I/O apparatus 2010 is preceded until printing paper is replenished.

In accordance with the image I/O control method of the second server of the present invention, as described above, since there is stored the status information of the printing at the time any error is produced in the course of execution of the processing of the printing function by the one image I/O apparatus, and the processing of the printing function by the one image I/O apparatus based upon the stored information of the printing of the processing of the printing function by the other succeeding image I/O apparatus is completed, it is possible to shorten the time of halting processing of the server caused by any error produced during the execution of the processing of the printing function by the one image I/O apparatus as well as it is possible to precede the operation by a request of execution of the processing of the printing function by the other succeeding image I/O apparatus. It should be noticed that remaining processings may be executed by the other image I/O apparatus in which no error is produced based upon the status information of the printing at the time any error is produced in the course of execution of the processing of the printing function. For instance, it may be executed in response to forced output instruction information from the host computer.

Although in the above-described embodiment the description was done for the two image I/O apparatuses, another situation may be allowed wherein when two or more of the image I/O apparatuses are connected and the priority is designated for these image I/O apparatuses, and further upon reception of a printing instruction possessing an ID inputted from a host computer an image I/O apparatus obeying a lower order printing instructing than the foregoing printing instruction executes the printing processing, the printing work is forcedly halted in the same manner as in the printer error and the status information of the printing work is stored in the memory 2004, and thereafter printing work obeying a printing instruction of the higher priority is controlled to be executed preferentially. A main cause of the foregoing halting may be either the status of the error production in the above-described embodiment or a preferential I/O request.

Figure 63:
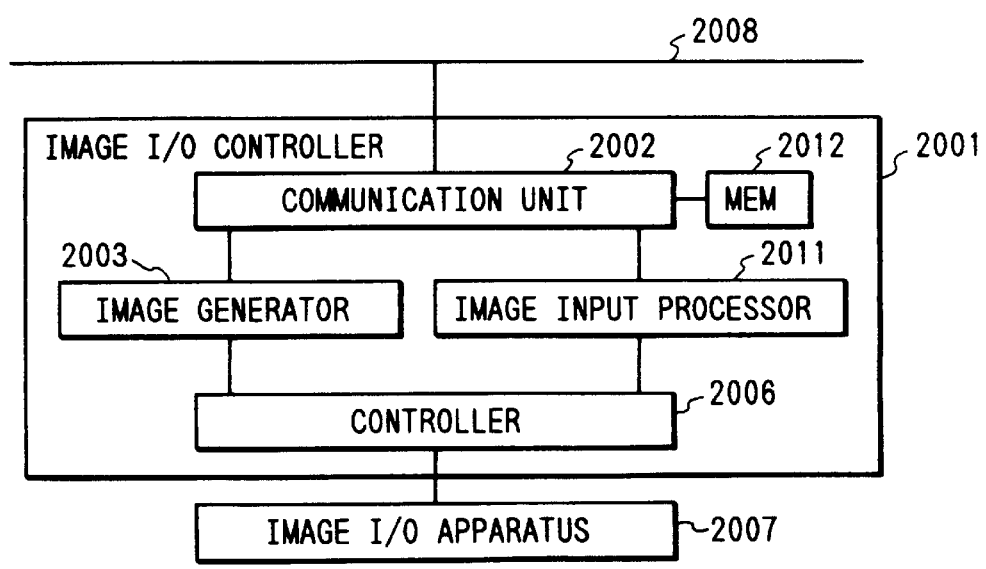
FIG. 63 is a schematic block diagram illustrating a communication control structure between a server device of another embodiment according to the present invention and a video image terminal device.

Referring to FIG. 63, there is depicted a block diagram illustrating the construction of data control between a server and an image I/O apparatus which demonstrate an embodiment of the present invention.

In the same figure, numeral 2001 denotes an image I/O controller wherein a communication unit 2002 is connected with a communication line 2008, which is in turn connected with a plurality of host computers each of which is started by a different OS (not shown). Numeral 2003 denotes an image generator which analyzes printing data received by the communication unit 2002 and stored in a reception buffer and stores image data in an image memory 2012. Numeral 2011 denotes an image input processor for processing the transfer of the image data inputted from an image I/O apparatus 2007 to the communication unit 2002. Numeral 2006 denotes a controller for controlling communication with the image I/O apparatus 2007.

In a server constructed as described above, as there is sent an instruction of inputting and outputting an image through the communication line 2008, the CPU 1000 receives data on the basis of a communication program 83 stored in the communication unit 2002 and stores the same in an image memory 2012, and further controls the priority of the execution of instructions in accordance with a flowchart described later, say, with a succeeding instruction being at the higher priority than a preceding instruction, the CPU 1000 halts the execution of a scanner function processing or a printing function processing of an I/O apparatus now in execution.

In the following, as for the order of execution of instructions, there will first be described a case where the order of execution is determined when an image I/O processing is not executed but an instruction is transmitted.

The CPU 1000 analyzes the instructions based upon the overall system control program 93 stored in the communication unit 2002 and stores the priority of the executions of the instructions, and further the CPU 1000 issues upon an image being outputted a starting signal and a data address to a PDL interpreter program 84 stored in the image generator 2003. Upon an image being inputted, the CPU 1000 sends a starting signal and an address to a scanner control program 85 stored in the image input processor 2011. The image generator 2003, as receiving the starting signal and the data address, analyzes the data and develops the same into image data, and further prints the image data by the image I/O apparatus 2007 through the controller 2006. The image input processor 2011, as receiving the starting signal and the data address, analyzes the data and inputs the image by the image I/O apparatus 2007 through the controller 2006, and further transmits through the communication unit 2002 the output image data to a host computer which sent the foregoing instruction.

In the case where the instruction is transmitted in the course of the image I/O processing, the CPU 1000 analyzes the instruction based upon the overall system control program 93 stored in the communication unit 2002, for comparison of the priority of the image I/O processing during execution with that of the received instruction. In the case where the priority of the received instruction is higher than that of the image I/O processing during execution, the CPU 1000 issues a halt instruction to the image generator 2003 or the image input processor 2011 which is executing the processing, and thereafter transmits the starting instruction and an address of data received anew to the image generator 2003 or the image input processor 2011. In the case where the priority of the received instruction is identical to or lower than that of the image I/O processing under execution, the received instruction is executed after the image I/O processing now under execution.

The CPU 1000, as receiving the starting instruction and the data address based upon the PDL interpreter program 84 in the image generator 2003 and the scanner control program 85 in the image input processor 2011, analyzes the data to start the processing, while it, as receiving a halt instruction, halts the data processing.

The communication unit 2002 is capable of reception of two, for example, instructions to the utmost, and during the image I/O processing for example it becomes capable of reception of further one instruction. Instructions more than those instructions are denied, even transmitted, by the communication unit 2002.

In the following, there will be described an image I/O control method of the server which demonstrates an embodiment of the present invention with reference to a flowchart in FIG. 64.

Figure 64:
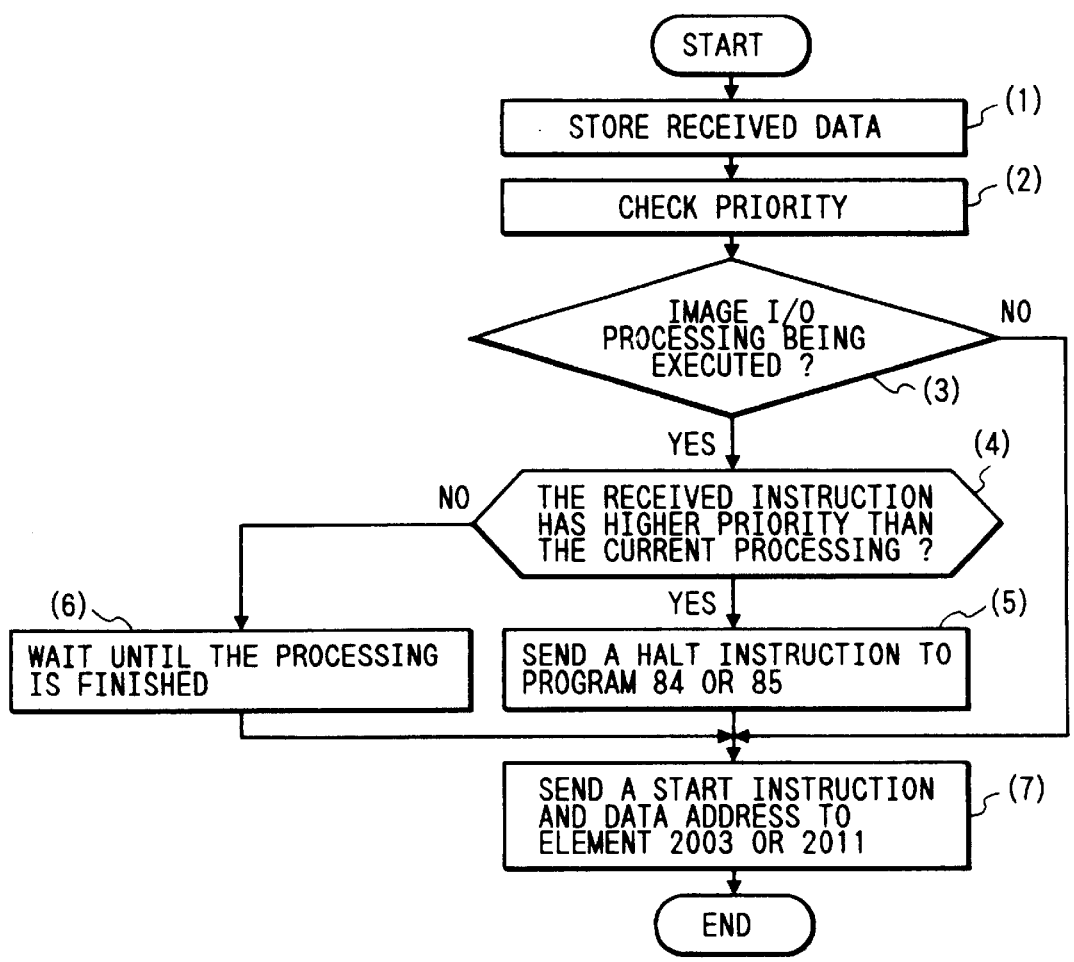
FIG. 64 is a flowchart illustrating an input/output control method of a server device according to the embodiment of the present invention.

Referring to FIG. 64, there is depicted a flowchart illustrating the image I/O control method of the server which demonstrates an embodiment of the present invention. Designated at (1) to (7) are respective steps of the processing which correspond to operations until an instruction is executed after the communication unit 2002 receives the instruction. The CPU 1000 illustrated for example in FIG. 9 executes operations of those steps based upon the overall system control program 84, and the scanner control program 85.

The CPU 1000 first stores received data in the reception buffer in the memory 2012 based upon the overall system control program 93 in step (1), and investigates the priority of the received instruction with reference to a priority table which has previously been stored in the memory 2012 in step (2). It is then judged whether or not the image I/O processing is now under execution in step (3), and in the case of the execution, it is judged whether or not the priority of the received instruction is higher than that of the image I/O processing now under execution in step (4). If it is higher, than a half instruction is transmitted to the PDL interpreter program 84 in the image generator 2003 or the scanner control program 85 in the image input processor 2011 both now under execution in step (5), and a starting instruction and a data address are transmitted to the PDL interpreter program 84 in the image generator 2003 or the scanner control program 85 in the image input processor 2011 in step (7).

In contrast, in the case where the priority of the received instruction is judged not to be higher than that of the image I/O processing under execution in the judgement in step (4), the CPU 1000 waits until the image I/O processing now under execution is completed in step (6), and transmits the starting instruction and the data address to the image generator 2003 or the image input processor 2011 in step (7).

In the case where the image I/O processing is judged not to be executed now in the judgement of step (3), the CPU 1000 transmits the starting instruction and the data address to the image generator 2003 or the image I/O processor 2011.

In accordance with the image I/O control method of the third server of the present invention, as described above, I/O instructions inputted successively from the host computers to the image I/O apparatus are analyzed, and in the case where a higher priority instruction is received on the basis of a result of the analysis, the preceding scanner function processing or printing function processing by the image I/O apparatus is halted and the operation is preceded by a scanner function processing or a printing function processing obeying the higher priority I/O instruction. Accordingly, whatever the function processing execution status of each image I/O apparatus connected with the server is, if it possible to alter the order of scanner function processings or printing function processings following the priority of I/O instructions.

Since in the case where in the present embodiment the priority of instruction executions is determined and a higher priority image I/O processing than the image I/O processing under execution is inputted, the image I/O processing under execution is halted and the higher priority image I/O processing is executed, the latter image I/O processing can be halted without waiting the completion of a printing processing which takes much time even under execution.

Although in the above-described embodiment the description was done for the case where the priority of the processing executions of the image I/O apparatus 2007 is determined on the basis of the kinds of instructions in themselves, another modification may be contemplated wherein the priority of the processing executions of the image I/O apparatus 2007 is determined or processing control is altered in conformity with the kind of a host computer which transmits an instruction.

Further, although in the above-described embodiment the description was done for the case wherein the priority of the processing executions of the image I/O apparatus 2007 is determined on the basis of the kind of an instruction, another modification may be contemplated wherein the priority of the processing executions of the image I/O apparatus 2007 is determined or processing control is altered in conformity with the kinds of users of a host computer (e.g., kind information based upon passwords) which transmits an instruction.

In accordance with the image I/O control method of the fourth server of the present invention, as described above, the kinds of I/O instructions inputted from host computers are analyzed, and the priorities of the respective instructions are automatically determined on the basis of a result of the analysis, and whatever the order of the instructions is, the execution status of the scanner function processing or the printing function processing of the image I/O apparatus is controlled. Accordingly, the execution of the scanner function processing or the printing function processing of the image I/O apparatus is possible in the optimum order for the kinds of the function processing executions.

Although in the above-described embodiment the description was done for the case where the priority of the processing executions of the image I/O apparatus 2007 is determined on the basis of the kinds of instructions in themselves, another modification may be contemplated wherein processing time is derived from received data, and the priority of the processing executions of the image I/O apparatus 2007 is determined based upon the length of the derived processing time to alter the order and control of the processing executions.

In the case where an image is inputted for example, processing time is estimated from an area of the input image, while in the case where an image is outputted, processing time is estimated from the number of pages or the amount of data.

Although in the above-described embodiment the description was done for the case where one image I/O apparatus was connected with the server 2001, a plurality of the image I/O apparatuses may be connected with the server 2001. The present invention is applicable to a case where there are combined concretely one image input apparatus (scanner) and the other one image output apparatus (printer) which are in turn connected with the server 2001.

The above-described image I/O apparatus may be an integrated I/O apparatus in a network environment composed of a copying machine, a FAX, and a printer, etc.

The image input processor 2011 may be controlled such that in the case where a halt instruction is issued, intermediate processing status information of an operating instrument is stored so as to resume the image I/O processing halted afterwards, and thereafter the processing under execution at present is halted, and after a higher priority processing is completed, the halted I/O processing is resumed with reference to the stored processing status information.

The image input processor 2011 and the image generator 2003 may be controlled such that when a halt instruction is issued, they continuously performs a processing which is liable to be halted until the processing is completed, and thereafter halt the I/O processing, say, they execute a processing liable to be halted up to the end of a page, and thereafter halt the processings of I/O instruments.

Further, they may be controlled such that the number of occurrence times of a halt processing in the course of the I/O processing is reduced by constructing, for a halted image I/O processing, the priority of that processing such that the priority is properly changeable to be higher.

Referring to FIG. 65, there is depicted a schematical block diagram illustrating the construction of the data control of an image I/O apparatus to a server which demonstrates an embodiment of the present invention. For concrete description the respective components shown in FIGS. 2A and 2B are employed.

In the same figure, numeral 2001 designates an image I/O controller which comprises a first controller 2006 for controlling a communication unit 2002, a controller 2013, and a first image I/O apparatus (scanner printer) 2007, a second controller 2009 for controlling a second image I/O apparatus (scanner printer) 2010, and a memory 2014. Numeral 2008 designates a communication line of the Ethernet designated at 96 in FIGS. 2A and 2B for example which is connected with a plurality of host computers (including the case where OSs and printing interfaces of the host computers are different, and the case where they are identical).

In the server constructed as described above, a CPU 1000, as receiving an instruction from a host computer through the aforementioned network, analyzes the instruction based upon the overall system control program 93 to specify an image I/O apparatus which is an object to be image-processed, and previously judges whether or not the specified image I/O apparatus has any operation trouble. In the case where any operation trouble is occurring, the CPYU 1000 transmits information of the existence of the operation trouble in the specified image I/O apparatus back to the host computer through the network based upon the aforementioned judgment and upon the communication program 83 to hereby securely inform, upon reception of the instruction, the host computer on the network of a fact that the specified image I/O apparatus has a trouble.

The first image I/O apparatus (scanner printer) 2007 comprises a color laser copying apparatus cable of execution of a known electrophotography process for example, which comprises a scanner for reading an original and a color printer for printing image information outputted form the scanner or each host computer. The second image I/O apparatus (scanner printer) 2010 comprises an ink-jet color copying apparatus of a known ink-jet type for example, which comprises a scanner for reading an original and a color printer for printing image information outputted from the scanner or each host computer. Although in the present embodiment a copying apparatus integrally including a scanner function and a printer function is employed as the image I/O apparatus, the present invention may readily be applied to a construction composed of a scanner apparatus and a printer apparatus, where a scanner function and a printer function are independently separated. Further, the aforementioned image I/O apparatus may be an integrated I/O apparatus in a network environment which comprises a copying apparatus, a FAX, and a printer, etc.

In the following, the operation will be described.

The CPU 1000, as an instruction is transmitted from another host computer (not shown) through the communication line 2008, issues the received instruction to the overall system control program 93 in the controller 2013 based upon the communication program 83 in the communication unit 2002. The CPU 1000 analyzes the instruction based upon the program 93 in the controller 2013 to judge whether either image I/O apparatus 2007 or 2010 should be used, and transmit an inquiry signal of inquiring the status to the device driver 86 in the controller of the image I/O apparatus used or in the present embodiment to either the controller 2006 or 2009. The CPU 1000 investigates the statuses of the corresponding image I/O apparatuses 2007, 2010 based upon the device driver 86 in the controller which has received the inquiry signal, and investigates the existence of occurrence of each trouble described above, and further transmit a result of the investigation to the program 93 in the controller 2013. The CPU 1000 judges a signal of the device driver 86 in the controller based upon the program 93 in the controller 2013 which has received the just-mentioned result. The CPU 1000, as judging the trouble to have occurred, transmits a signal indicative of trouble occurrence (error) based upon the program 83 in the communication unit 2002. The CPU 1000 hereby informs the host computer or operator which has transmitted the aforementioned instruction of the trouble occurrence based upon the program 83 in the communication unit 2002.

The PU 1000 temporarily stores at that time the received data in the reception buffer in the memory 2014 based upon the program 93 in the controller 2013 and upon the program 83 in the communication unit 2002. In the case where any trouble occurs in the image I/O apparatuses 2007, 2010, the CPU 1000 reads out the data stored in the memory 2014 after the image I/O apparatuses 2007, 2010 are restored from the trouble, to transfer the same to the program 86 in the controllers 2006, 2009 for image processings (printing processing, scanner processing, etc.) by the designated image I/O apparatuses 2007, 2010. The controller 2013 includes a ZCDPU, a ROM, and a RAM as illustrated in FIG. 9, and the ROM stores a control procedure illustrated by a flowchart described later.

Referring to FIG. 66, there is depicted a view exemplarily illustrating data transmitted to an SP server designated from a host computer through the communication line 2008 shown in FIG. 65.

In the same figure, numeral 2211 denotes a printing instruction which comprises a command (lpr) 2211a, an output device designation command 2211b, a data total byte number 2211c, and data 2211d. Numeral 2212 denotes a scanner instruction which comprises a command (scan 2212a, an output device designation command 2212b, a data total byte number 2212c, and data 2212d.

As illustrated in the same figure, a command (instruction) inputted from a host computer through the communication line 2008 comprises four elements which are separated with blank character codes. The output device designation command 2211b instructs the output device to be an ink-jet printer (ij). The output device designation command 2212b instructs the output device to be a scanner (sl).

Figure 67:
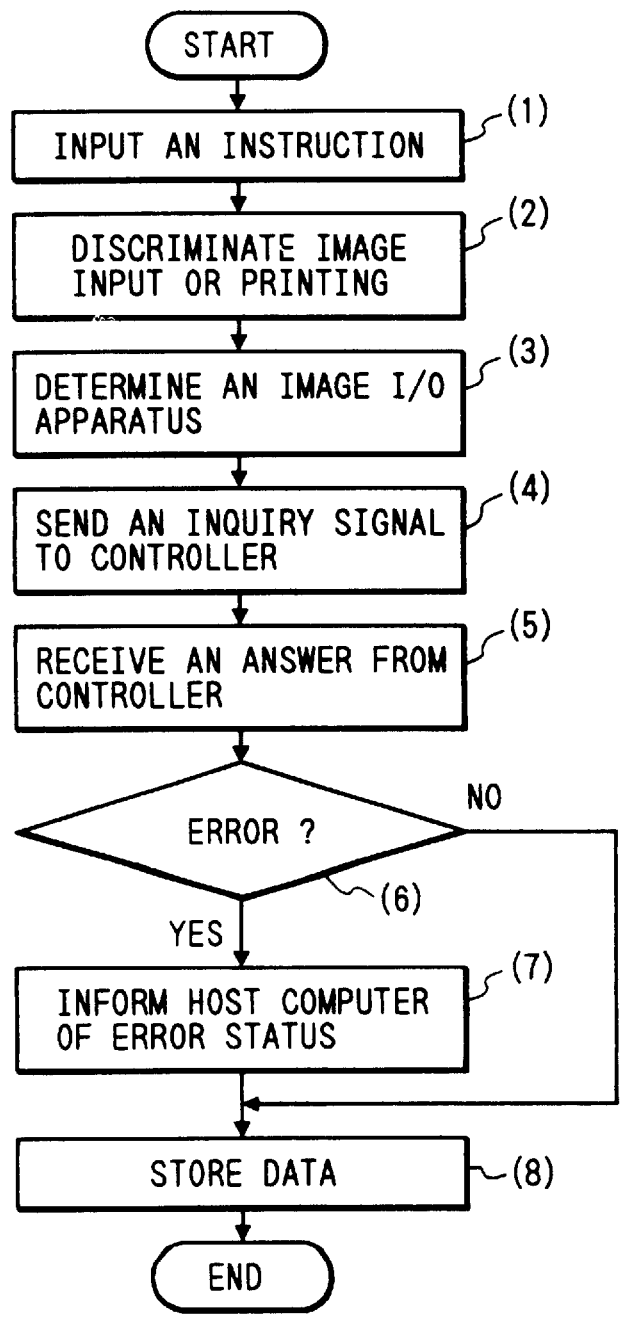
FIG. 67 is a flowchart illustrating an example of the first input/output device state diagnostic procedure in a server device according to the present invention.

Referring to FIG. 67, there is depicted a flowchart exemplarily illustrating a first image I/O apparatus status diagnosis processing procedure in the SP server of the present invention. Designated at (1) to (8) are respective steps of the procedure, each operation of which the CPIU 1000 illustrated in FIG. 9 for example executes on the basis of the overall system control program 93, the communication program 83, and the device driver 86.

Based upon the overall system control program 93, the CPU 1000 inputs an instruction from the communication unit 2002 in step (1), judges whether the received signal is of a signal of inputting an image or printing in step (2), judges a specified image I/O apparatus in step (3), and transmits an inquiry signal of inquiring the status of the image I/O apparatus, to the device driver 86 in the controller in step (4). Successively, an answer signal is received on the basis of the program 86 in the controller in step (5), and it is judged whether or not any trouble occurs, in step (6). If it is no, then the operation advances to step (8) and subsequent steps while if it is yet, then a data destination host computer is informed of the trouble occurrence based upon the communication program in the communication unit 2002 in step (7).

As described above, an image I/O apparatus is designated when an instruction is received, and in the case where any trouble occurs in the designated image I/O apparatus it is possible to immediately inform a host computer or an operator which transmitted the instruction of a fact that the trouble has occurred in the operation status of the designated image I/O apparatus.

Figure 68:
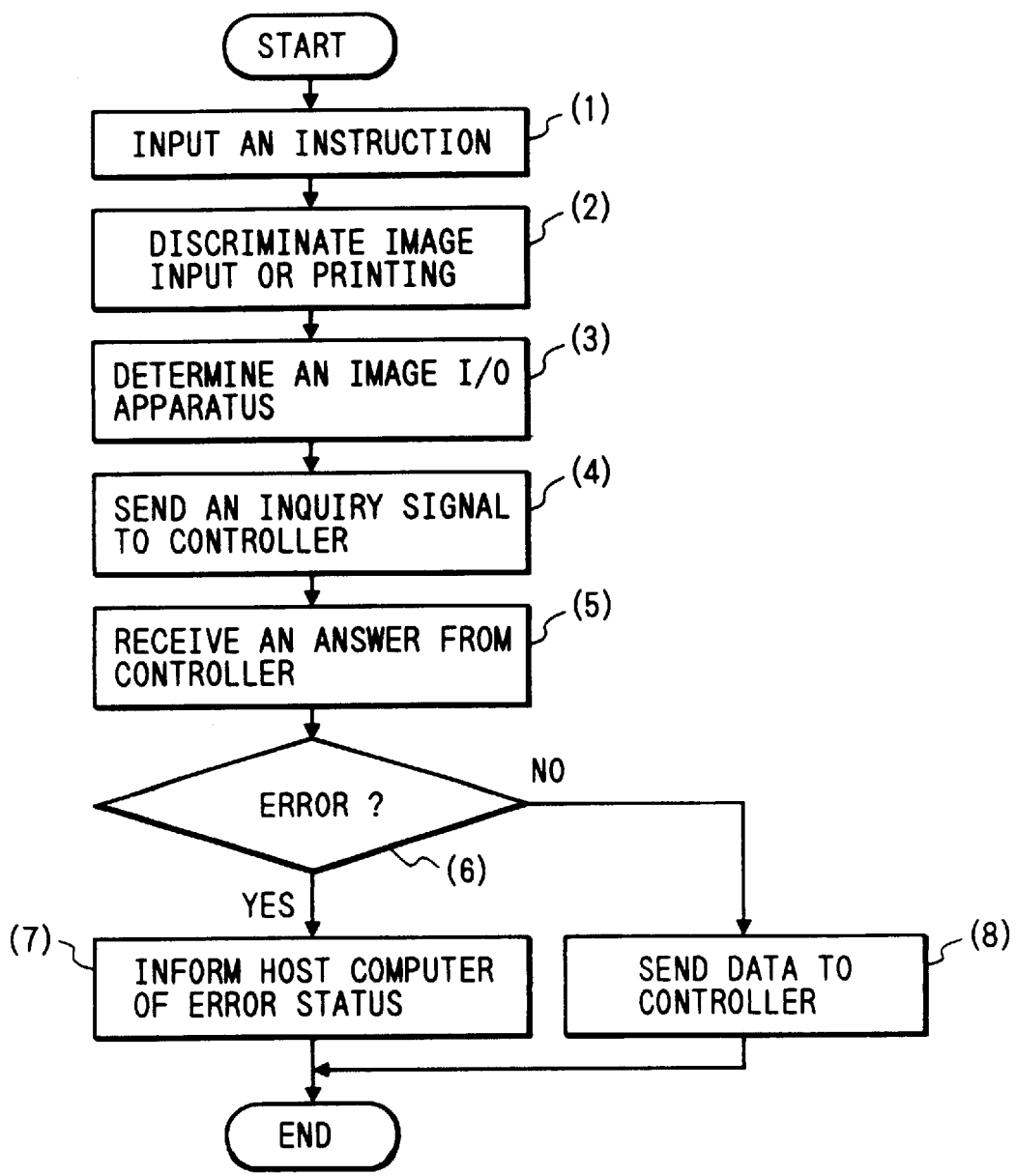
FIG. 68 is a flowchart illustrating an example of the second input/output device state diagnostic procedure in a server device according to the present invention.

Although in the above embodiment the memory 2014 is provided, and in the case where any trouble has occurred in the image I/O apparatuses 2007, 2010, data from a host computer is stored in the memory 2014, and after restoration of the image I/O apparatus from the trouble a image processing of the image I/O apparatus is immediately executed, more specifically the received data is used to immediately execute an image processing of the image I/O apparatus after restoration of the image I/O apparatus from the trouble without resending the data, another modification may be contemplated wherein after the judgement of the occurrence of any trouble in the image I/O apparatus as illustrated in FIG. 68 the data reception is canceled without provision of the memory 2014.

Referring to FIG. 68, there is depicted a flowchart exemplarily illustrating a second image I/O apparatus status diagnosis processing procedure in the server according to the present invention. Designated at (1) to (8) are respective the steps of the procedure each operation of which the CPU 1000 for example illustrated in FIG. 9 executes on the basis of the overall system control program 93, the communication program 83, and the device driver 86.

On the basis of the overall system control program 93, the CPU 1000 inputs an instruction from the communication unit 2002 in step (1), and judges whether the input is of inputting or printing an image in step (2), and further judges a designated image I/O apparatus in step (3) and transmits an inquiry signal of inquiring the status of the image I/O apparatus to the device driver 86 in the controller in step (4). Successively, in step (5) an answer signal is received on the basis of the program 86 in the controller, and in step (6) it is judged whether or not any trouble occurs. If it is no, then the CPU 1000 advances to step (8) and successive steps wherein data is transmitted to a designated controller between the controllers 2006 and 2009 and completes the operation.

In contrast, if it is yes in the judgement of step (6), the CPU 1000 informs the data destination host computer of the trouble occurrence based upon the communication program 83 in the communication unit 2002 in step (7).

In accordance with the image I/O control method of the server of the present invention, as described above, an instruction received from a host computer through a predetermined network is analyzed to designate a driven image I/O apparatus, and existence of any operation trouble in the specified image I/O apparatus is previously judged, and in the case where the operation trouble has occurred the host computer is informed on the basis of a result of the judgement of a fact that the operation trouble has occurred in the designated image I/O apparatus through the network. Accordingly, each host computer on the network is successful in being informed upon reception of the instruction of the fact that any trouble has occurred in the designated image I/O apparatus at a proper timing (without time lag).

Although in the above-described embodiment the description was done for the case of the construction of the two image I/O apparatuses connected with the server 2001, the number of the image I/O apparatuses may exceed two or may be single, and in the case of a single image I/O apparatus the apparatus may uniquely be determined whatever an image I/O apparatus designated by a host computer.

Figures 69, 70, 73:
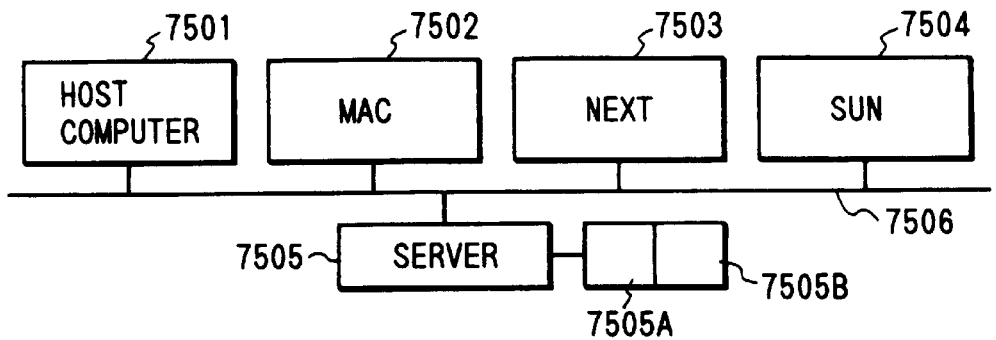
FIG. 69 is a block diagram illustrating a network structure of a server device according to another embodiment of the present invention.
FIG. 70 is a view illustrating an example of an acting host administration table on a network of a server device according to the present invention.
FIG. 73 is a view illustrating an example of a priority order table which determines a selection order of an alternative printer in a server device according to the present invention.

Referring to FIG. 69, there is depicted a block diagram illustrating the construction of a network of a server which demonstrates another embodiment of the present invention.

In the same figure, numeral 7501 designates a host computer which transmits an image processing request for a scanner 7505A and a printing 7505B to a server 7505 through a network 7506. Numeral 7502 designates a host station which comprises a Macintosh computer for example which uses a postscript (PS) as a page descriptor language. Numeral 7504 designates a host station which comprises a SUN computer for example which uses a PS (postscript) as a page descriptor language. Numeral 7505A designates a scanner which is connected with the server 7505. Numeral 7505B designates a printer which is connected with the server 7505. In the present embodiment a PDL code in the server 7505 employs a CaPSL code as a private code.

In the server constructed as described above, on the basis of the overall system control program 93, the CPU 1000 compares, upon an image output request from each host computer, a page descriptor language designated by a host computer with a page descriptor language included in the server to determine the possibility of an image output processing from the host computer. If the image output processing is impossible, the CPU 1000 makes reference to the types of page descriptor languages of host computers previously registered and requests a host computer, whose page descriptor language is coincident with the aforementioned page descriptor language, to rasterize image information with the page descriptor language designated from the host computer instead of the original host computer. The CPU 1000 thereafter receives image data rasterized by the substitute host computer for printing with a printing processing function of an image processor connected with the server, whereby rasterization of image information with a page descriptor language designated by a host computer is realized utilizing a host resource on the network even if the types of the page descriptor languages designated by the host computer and included in the server are not coincident, and hence desired printing is ensured by a connected processor.

The CPU 1000 further compares, upon an image output request from each computer, a page descriptor language designated by a host computer with a page descriptor language included in the server to determine the possibility of an image output processing from the host computer. In the case where the image output processing is impossible, the CPU 1000 makes reference to the types of page descriptor languages of host computers previously registered and transmits image information received by the server to a document server (another host computer) while requesting an image output request destination host computer to effect rastalization. A network file system is utilized between the document server (another host computer) and the image output request destination host computer following the just-mentioned request, and the server receives rasterized image data from the document server for printing with a printing processing function of an image processor connected with the server. Hereby, rasterization of image information with a page descriptor language designated by a host computer is realized even with the incoincident types of page descriptor languages designated from the host computer and included in the server, utilizing a network file system on the network for effectual execution of desired printing by a connected image processor.

Further, rasterized image data is transferred from the document server to the image output request destination host computer, from which host computer the CPU 1000 receives the rasterized image data for printing with a printing processing function of an image processor connected with the server, whereby desired printing is effectually executed by a connected image processor while restricting a data transfer processing on the network.

Further, with reference to the alternate printing priority of image processors previously registered on the basis of the presence of any printing error in an image processor designated by a host computer, the CPU 1000 requests another image processor to effect printing of image information designated by the host computer for automatic alternate printing by the image processor different from the designated image processor, whereby even in the case where any trouble is produced in a designated printer, the printing automatically runs on with another printer without selective specification of the next printer candidate by a user for a greater improvement of printing efficiency.

Referring to FIG. 70, there is depicted a view exemplarily illustrating a substitute host computer control table on a network of an image processing system according to the present invention. The table is stored in a memory in the server 7505.

In the same figure, there is illustrated setting of priority host numbers when a postscript (PS) or a GDI code are received in the case where host stations 7502, 7504 are provided. In the case where a PDL code with which the host computer 7501 requests printing is a PS code for example, the number N of available host stations is "2", and there are previously set "0" with which the host station 7502 (Mac) has the highest priority, and "1" with which the host station 7503 (Next) has the next priority.

In contrast, in the case where the PDL code with which the host computer 7501 requests printing is a GDI code, the number "N" of available host stations is "1", and only the host station 7504 (SUN computer) is registered with the priority thereof being "0". It is noted that the table is freely rewritable following the state of system structure and the modification of system construction.

In the following, there will be described the operation of the first substitute host processing in the server according to the present invention with reference to a flowchart in FIG. 71. In the present operation, the CPU 1000 illustrated in FIG. 9 for example executes operations of respective steps on the basis of the overall system control program 93 and the communication program 83.

Figure 71:
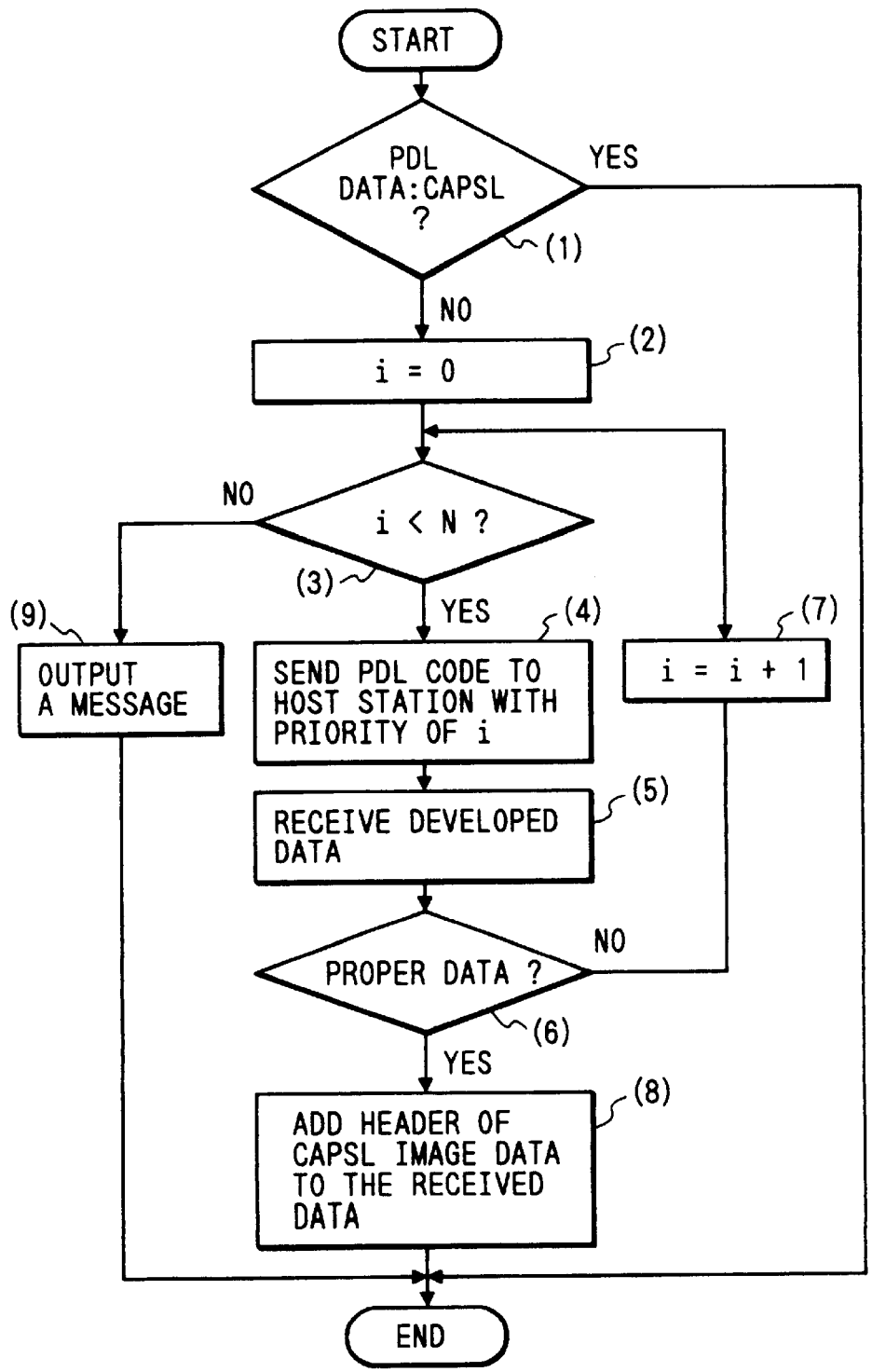
FIG. 71 is a flowchart illustrating an example of the first alternative host procedure in a server device according to the present invention.

Referring to FIG. 71, there is depicted a flowchart exemplarily illustrating a first substitute host processing procedure in a server according to the present invention. Designated at (1) to (9) are the respective steps of the first substitute host processing procedure.

There will be described the processing which supposes a case wherein there is not provided a conversion program to a CaPSL code from a code (PDL code) corresponding to a page descriptor language prepared by a DPT (Desk Top Publishing) application (not shown) by the host computer 7501 illustrated in FIG. 69.

On the basis of the overall system control program 93 in the server 7505, the CPU 1000 judges whether or not the PDL code received from the host computer 7501 through a network 7506 is the CaPSL code in step (1). If it is yet, then the processing is completed, while if it is no, then a priority substitute host number i indicative of the priority substitute host number is reset to "0" in step (2). The CPU 1000 compares the priority substitute host number i with the available host number N, and judges whether or not i<N holds in step (3). If it is yet, then the CPU 1000 transmits the PDL code to the host station 7502 which has the priority substitute host number i of "0" following the priority table based upon the communication program in step (3). The CPU 1000 receives data, which is rasterized and bit-map expanded on the basis of the PDL code received by the host station 7502, from the host station 7502 through the network 7506 in step (5), and judges whether or not normal data is received in step (6). If it is no, then the CPU 1000 increments the host number i by "1" in step (7), and returns to step (3) for a request of a substitute host processing by the next host station.

In contrast, a header of the CaPSL data is attached to the data received in conformity with the judgement in step (6), and the processing is completed.

In contrast, in the case where if it is no in the judgement in step (3), more specifically, in the case where a counted-up value by the increment of the host number i in step (7) exceeds the available host number N, since N as the substitute host number for the PS code is "2" in the present embodiment, provided rasterization in a host station 7503 of the host number i=1 fails, a message indicative of a fact the rasterization by the substitute host fails is displayed on displays (not shown) of the host computer 7501 and the server 7505 in step (9), and the processing is completed.

With such control, even in the case where the CPU 1000 receives a PDL code other than CaPSL on the basis of the communication printer 83 in the server 7505, bit map data rasterized by the host stations 7502, 7503 as the substitute hosts is outputted from a printer 7505B irrespective of the designation of an operator of the host computer 7501. Accordingly, the operator of the host computer 7501 prints documents (characters, figures, graphics) prepared in the DPT application irrespective of the PDL code which a printer 7505B connected with the server 7505 can interpret.

In accordance with the image I/O apparatus control method of the sixth server of the present invention, as described above, the CPU 1000 compares a page descriptor language designated from each host computer with a page descriptor language on the server upon a request of printing function processing execution, judges the possibility of existence of a printing function processing from each host computer, and with reference to the types of page descriptor languages of respective host computers previously registered on the basis of a result of the judgement, the CPU 1000 substitutes another host computer which fits to the type of a page descriptor language for rasterization complying with the just-mentioned page descriptor language designated by each host computer, and simultaneously outputs rasterized data processed by the substitute host computer from the image I/O apparatus. Accordingly, even in the case where a page descriptor language processable on the server does not fit to a page descriptor language on a host computer, the CPU 1000 securely outputs through the image I/O apparatus printing information from a connected host computer page descriptor language does not fit to the page descriptor language processable on the server, utilizing a host source on the network.

In the following, there will be described the operation of the second substitute host processing in the server according to the present invention with reference to a flowchart illustrated in FIG. 72.

Figure 72:
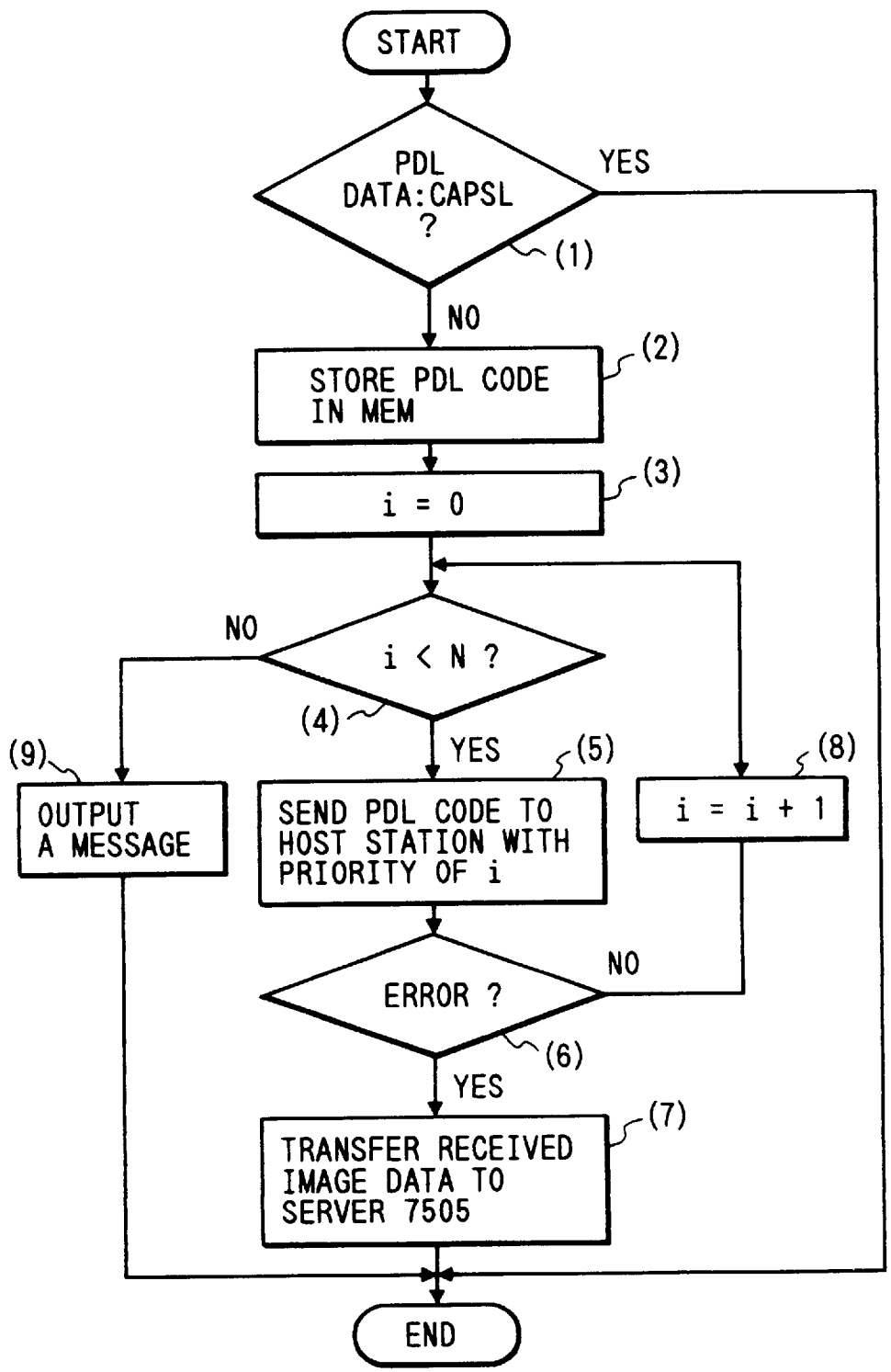
FIG. 72 is a flowchart illustrating an example of the second alternative host procedure in a server device according to the present invention.

Referring to FIG. 72, there is depicted a flowchart exemplarily illustrating a second substitute host processing procedure in the server of the present invention. Designated at (1) to (9) are respective steps of the procedure, each operation of which the CPU 1000 illustrated in FIG. 9 for example executes on the basis of the overall system control program 93 and the communication program 83.

The present embodiment corresponds to a case which employs a file system (Network File System NFS developed by US Sun Micro Systems Company, for example) of the host station 7504 (UNIX machine as the SUN computer) illustrated in FIG. 71.

On the basis of the overall system control, program 93 in the server 7505, the CPU 1000 judges whether or not a PDL code received from the host computer 7501 through a network 7506 is a CaPSL code in step (lz), and if it is yet, then the CPU 1000 completes the processing while it is no, then the CPU 1000 requests the host computer 7501 such that the server 7505 transmits the PDL code to the host station 7504 as a document server. In response thereto, the CPU 1000 requests the host computer 7501 to store the PDL code transmitted through the network 7506 in a memory (not shown) in step (2).

Then, the CPU 1000 resets a priority substitute host number i indicative of the priority substitute host number to "0" in step (3). The CPU 1000 compares the priority substitute host number i with the available host number N, and judges whether or not i<N holds in step (4). If it is yet, then the CPU 1000 transmits the PDL code stored in the host station 7504 to the host station 7502 whose priority substitute host number i is "0" through the network 7506 following the priority table for a request of rasterization thereof. More specifically, the CPU 1000 forces the host station 7502 to process the PDL code received from the host station 7504 (document server) in step (5).

Successively, the host station 7504 receives through the network 7506 data rasterized and bit-map expanded by the host station 7502 on the basis of the received PDL 7502 on the basis of the received PDL code. The CPU 1000 forces the host station 7504 to judge whether or not it received proper data in step (6), and if it is no, then the CPU 1000 increments the heat number i by "1" in step (8) and returns to step (3) for a request of a substitute host processing by the next host station.

In contrast, if it is yet in the judgement in step (6), then the CPU 1000 forces the server 7505 to transfer the received data in step (7) and completes the processing.

In contrast, if it is no the processing in step (4), more specifically if a counted-up value by the increment of the host number i in step (7) exceeds the available host number N, since N as the substitute host number for the Ps code is "2" in the present embodiment, if rasterization in the host station 7503 of the host number i=1 fails, then the CPU 1000 forces displays (not shown) of the host computer 7501 and the server 7505 to display a message indicative of a fact the rasterization by the substitute host fails, and completes the processing.

With such control, data transfer through the communication line is reduced to improve the communication efficiency of the network. It is noted that the aforementioned image I/O apparatus may be an integrated I/O apparatus in a network environment composed of a copying machine, a FAX, and a printer, etc.

In the following, there will be described the operation of a substitute printer printing function in the case where any error is produced in the course of printing by an image I/O apparatus designated by the host computer 7501 in the system construction of the server illustrated in FIG. 69 to which a plurality of image I/O apparatuses are connected. The present embodiment is adapted such that a plurality of printers such for example as a color laser copying apparatus (CLC) 7601, an ink-jet color copying apparatus 7603, and a bit map printer 7603 corresponding to Centronics illustrated in FIG. 73 are controllable by the server 7505 illustrated in FIG. 69, and each host computer selects one printer theramong based upon printer designation. It is noted that the image I/O apparatus may be an integrated I/O apparatus in a network environment constructed with a copying machine, a FAX, and a printer, etc.

Referring to FIG. 73, there is depicted a view exemplarily illustrating a priority table, which determines the selection order of substitute printers, in the server according to the present invention. The table is stored in a memory in the server 7505.

Figure 74:
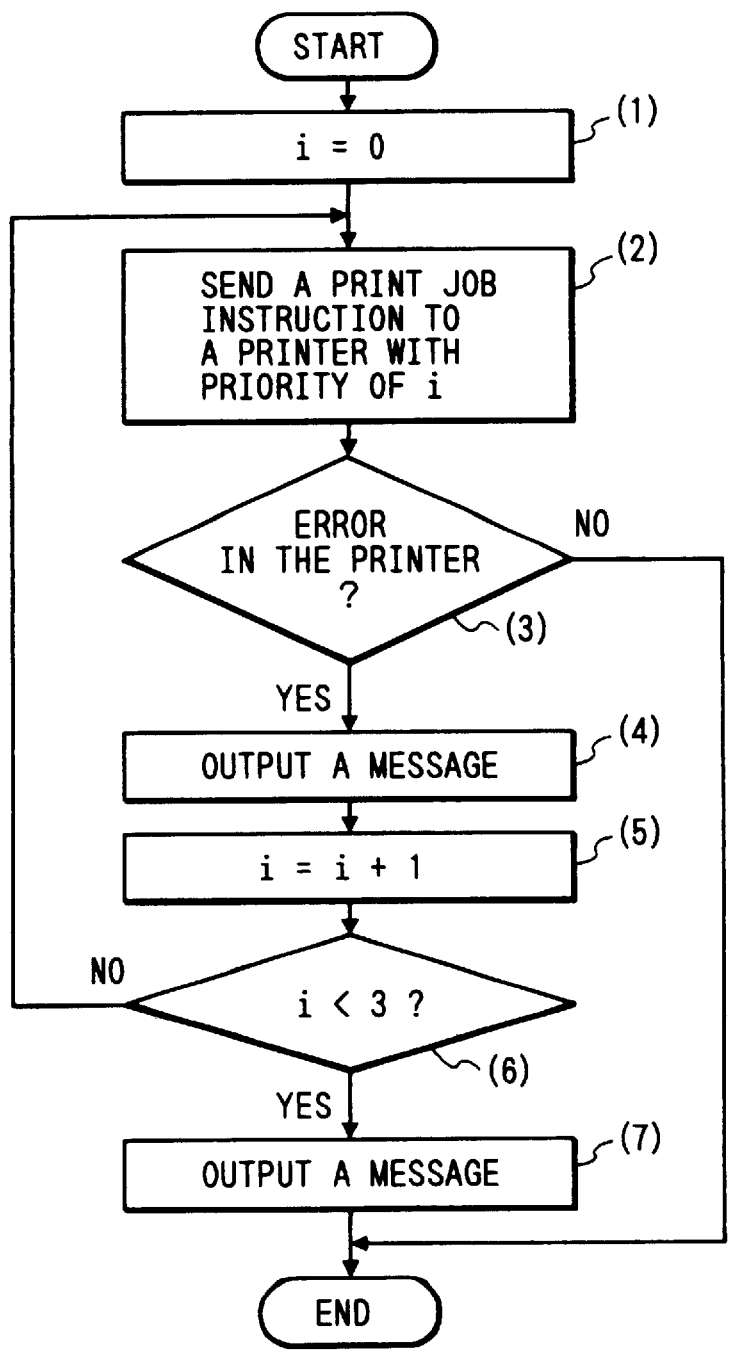
FIG. 74 is a flowchart illustrating an example of an alternative printing procedure in a server device according to the present invention.

Referring to FIG. 74, there is depicted a flowchart exemplarily illustrating a substitute printing processing procedure in the server according to the present invention. Designated at (1) to (7) are respective steps of the procedure, each operation of which the CPU 1000 illustrated in FIG. 9 for example executes on the basis of the overall system control program 93 and the communication program 83.

On the basis of the overall system control program in the server 7505, the CPU 1000, after receiving a printing request from each host computer to the color laser copying apparatus (CLC) 7601, first resets a priority substitute printer number pi indicative of the priority substitute printer number to "0" with reference to the preset priority table illustrated in FIG. 73 (for the priority upon designation of the color laser copying apparatus (CLC) 7601, the color laser copying apparatus (CLC) 7601 is "0", the ink-jet color copying apparatus 7602 is "1", and the bit-map printer 7603 is "2") in step (1). Then, the CPU 1000 transmits a printing instruction to the color laser copying apparatus (CLC) 7601 of the priority printer number pi of "0" in step (2). The CPU 1000 judges whether or not any error is produced in the color laser copying apparatus (CLC) 7601 in step (3), and if it is no, then the CPU 1000 completes the processing.

In contrast, it if is yes in the judgement in step (3), then the CPU 1000 transmits a message indicative of "An error is produced. A substitute printer will print." for example to a designated host computer, and displays the contents of the message on a display of the host computer in step (4). It is noted that the contents of the message may request a user's confirmation that the contents are outputted on another printer, depending upon the associated mode.

The CPU 1000 increments the priority substitute printer number pi in step (5), and judges whether the priority substitute printer number pi exceeds the total number of connected printers ("3" in the present embodiment) in step (6), and if it is no, then the CPU 1000 returns to step (2) while if it is yet, then the CPU 1000 outputs a message indicative of failure of printing in step (2), and completes the processing. Hereby, the CPU 1000 returns to step (2) when the number of printers is "3", and the priority substitute printer number pi is "1", and since the priority substitute printer number pi "1" designates the ink-jet color copying apparatus 7602 when the designated printer is the color laser copying apparatus (CLC) 7601, the server 7505 transmits a printing instruction to the ink-jet color copying apparatus 7607. Although the above-described processing is completed if the ink-jet color copying apparatus completes the printing in safety, if any error is produced, then the server 7505 transmits a printing instruction to the bit map printer 7603 of the priority substitute printer number pi of "2". As a result, users, who are not sticky about the types of printers, securely smoothly enjoy printing without the cumbersome processes even with any error on a designated printer.

Figure 75:
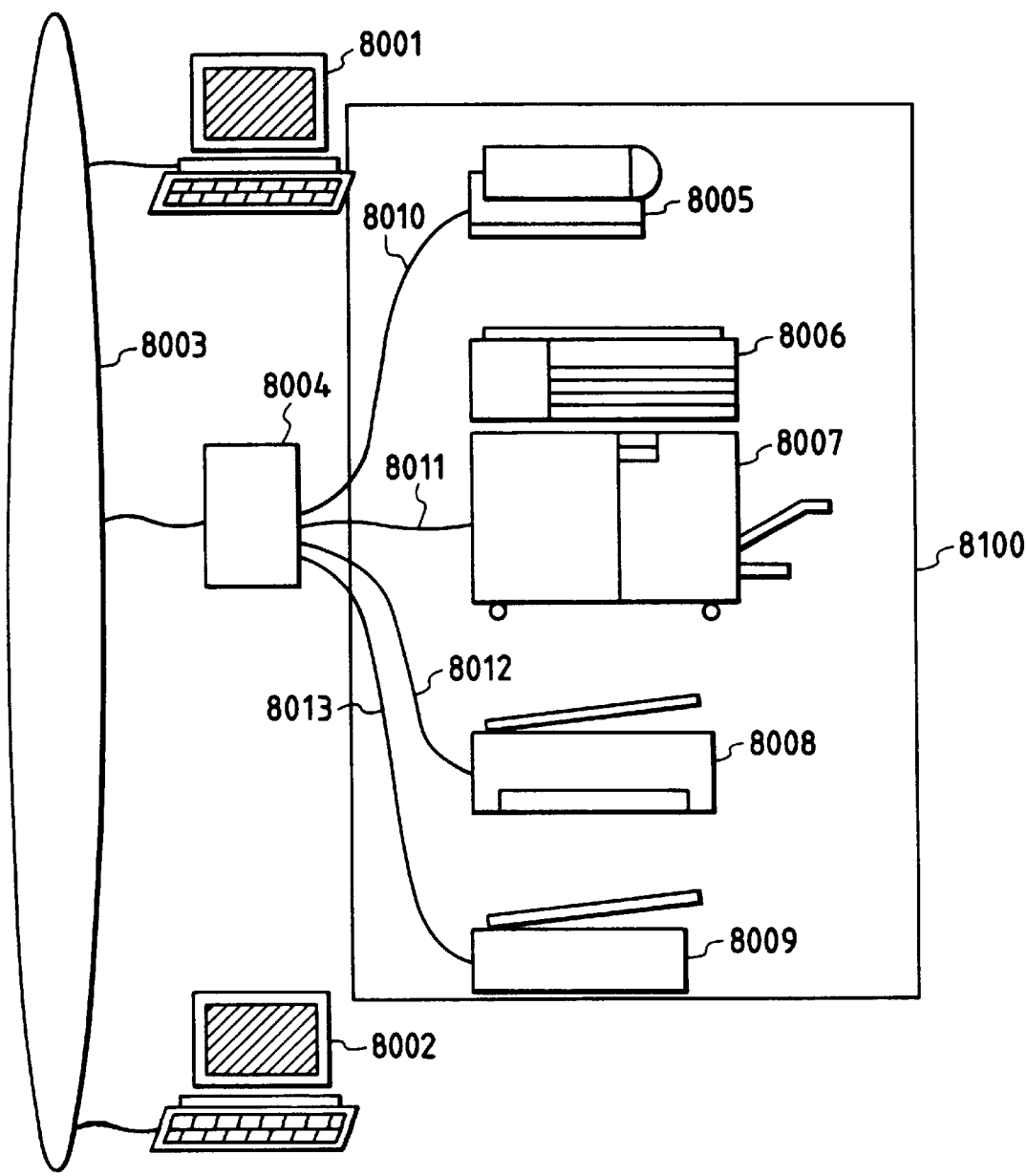
FIG. 75 is a block diagram illustrating a communication control structure between a server device according to the embodiment of the present invention and a video image terminal device.

Referring to FIG. 75, there is depicted a block diagram illustrating the construction of communication control between a server and an image I/O apparatus which demonstrate an embodiment of the present invention.

In the same figure, numerals 8001, 8002 designate host computers on which a DTP software and a scanner application program is operable. Numeral 8004 designates an image I/O controller (the color SP server SP1 illustrated in FIGS. 2A and 2B for example) which is capable of communication with the host computer 8001, 8002 through a network 8003 and which collectively controls a copying apparatus 8008, a scanner 8009 and a printer 8009 all connected thereto through interface cables 8010 to 8013. The server 8004 includes a memory for storing an error processing table ETANB and the like described later. It is noted that an integrated I/O apparatus 8100 in which the printer 8005 to the scanner 8009 are combined may be connected with the server 8004.

Referring to FIG. 76, there is depicted a view illustrating an error processing table included in the server 8004 illustrated in FIG. 75. The table stores therein a corresponding processing procedures after error production for each image I/O apparatus illustrated in FIG. 75 and for each job processing information. It is noted that the error processing table ETAB may be constructed by up-loading it from the host computers 8001, 8002 to the server 8004 or by previously registering it in the server 8004 for each image I/O apparatus and for each job processing information.

In the following, the flow of data will be described.

Image data prepared in the host computer 8001 is transmitted together with designated information of an image I/O apparatus to the image I/O controller 8004 through the network 8003 (LAN96 of the Ethernet illustrated in FIGS. 2A and 2B, for example). The designated information of an image I/O apparatus means in the present embodiment that including designation of a printer and designation of a resolution and the like, based upon which the image I/O apparatus 8004 determines an image I/O apparatus and sets various parameters.

In the case where a document of a plurality of pages prepared in the host computer 8001 is outputted from the printer 8007 for example, a page descriptor command representative of the document and the designation information on an input I/O apparatus are outputted from the host computer 8001 to the image I/O controller (server) 8004. In the server 8004, based upon the overall system control program 93, the CPU 1000 interprets the page descriptor command and instructs the PDL interpreter 84 to rastarize it and convert it to the image data, and further transfers it to the printer 8007 through the interface 8011. The printer 8007 outputs the received image data. In the course of the processing, there is an occasion where any error is produced in the printer 8007. A processing upon any error being produced has previously been registered in the server 8004.

In the following, there will be described the operation of an error dealing processing on the basis of the error processing table ETAB for the printer 8007 for example.

As illustrated in FIG. 76, the kinds of errors include "no power supply", "out of error", "paper jamming", "no ink", and "no toner", and so on. The error dealing processing is different in two cases; one before a printing job (means a printing processing in the present embodiment, and in the case when a document of a plurality of pages is printed, one job is to output all of the document) and the other on the job. A processing upon a "paper jamming" error produced will exemplarily be described.

Before the starting of the printing job, namely before a document of a plurality of pages is printed, the server 8004, as detecting that the printer 8007 has been halted owing to the "paper jamming" error, executes a corresponding error processing with reference to the error processing table ETAB illustrated in FIG. 76. The server 8004 retrieves a candidate which is capable of being outputted by another printer, and in the case where there is existent a printer as the substitute output candidate (on a standby status for outputting) the server 8004 starts an output processing of the document and outputs the document to the printer 8005, and further informs the host computer 8001 of that fact. In contrast, in the case where there is existent no such printer, the server 8004 halts the output processing and informs the host computer 8001 of that fact.

In the case where the "paper jamming" error is produced in the course of the document being outputted, concretely when the paper jamming is produced at the third page after the second page is outputted, there might occur unfavorable occasion provided the document is outputted to another printer, owing to different qualities of papers and inks used in printers, so that the server 8004 halts the printing job and informs the host computer 8001 of the error production.

Such previous registration and designation of varieties of error dealing processings for each status of error production ensures flexibility in error processings and free customizing. Accordingly, provided printers are available which are capable of outputting documents even if an error is produced in the course of documentation for example, it is possible to register varieties of error processings where documents are outputted even with different types of printers or only with same types of printers (laser printers together or jet printers together, and so on).

Methods to register error dealing processings include setting them by a user through the host computers 8001, 8002 upon installing the server 8004 and setting them using a panel and a button (not shown) attached to the server 8004.

In accordance with the seventh server image I/O control method of the present invention, as described above, once any error is produced with the execution of the printing function processing or the scanner function processing, error restoration is effected with reference to each error restoration processing information stored separately for each printing function processing status or for each scanner function processing status, and hence a flexible error restoration processing is ensured for the execution status of the printing function processing or the scanner function processing.

Although in the above-described embodiment the description was done for the case where after error dealing processing were registered in the error processing table ETAB illustrated in FIG. 76, the contents thereof were controlled not be to changed, another modification may be contemplated where for dealing with various users desired error dealing processing are registered using IDs identifiable for each user or for each group, and upon the starting of the printing job table data registered in an error dealing processing procedure table i.e., the error processing table ETAB is transferred from the host computer to the server 8004 and is set.

The aforementioned image I/O apparatus may be an integrated I/O apparatus in a network environment constructed with functions of a copying machine, a FAX, and a printer, etc.

The image I/O controller (server) in the aforementioned embodiment may be adapted such that a host computer or an image I/O apparatus (integrated I/O apparatus) includes the function of the image I/O controller. Various programs in the SP1 of FIGS. 2A and 2B may be stored in a floppy disk or a hard disk which is in turn mounted on a host computer or an image I/O apparatus, or those programs may previously be stored in a memory of a host computer or an image I/O apparatus, for use thereof. This ensures, as a matter of course, identical operations to those described above.

What is claimed is:

1. A data processing apparatus for rasterizing data in PDL (page description language), said apparatus comprising:

rasterizing means having a function of rasterizing data described in at least one kind of PDL;

input means for inputting data from an external source;

determining means for determining whether a kind of PDL describing the input data is included in the at least one kind of PDL; and controlling means for causing the input data to be sent to another data processing apparatus and for causing the other data processing apparatus to rasterize the input data when said determining means determines that the kind of PDL describing the input data is not included in the at least one kind of PDL.

2. An apparatus according to claim 1, further comprising means for specifying a data processing apparatus which has a function of rasterizing data described in the kind of PDL describing the input data.

3. An apparatus according to claim 1, wherein said data processing apparatus, the external source and the other data processing apparatus are connected to a common network.

4. A data processing system comprising:

a first data processing apparatus for rasterizing data in PDL (page description language), said first data processing apparatus comprising:
- first input means for inputting data from an external source;
- first rasterizing means having a function of rasterizing data described in at least one kind of PDL;
- determining means for determining whether a kind of PDL describing the data input by said first input means in included in the at least one kind of PDL; and
- controlling means for causing the data input to the first input means to be sent to a second data processing apparatus and for causing the second data processing apparatus to rasterize the input data when said determining means determines that the kind of PDL describing the input data is not included in the at least one kind of PDL;

said second data processing apparatus, connected to said first data processing apparatus, for rasterizing data in PDL, said second data processing apparatus comprising:
- second input means for inputting data from said first data processing apparatus; and
- second rasterizing means having a function of rasterizing data described in the kind of PDL describing the data input by said first input means.

5. A system according to claim 4, wherein said first data processing apparatus, the external source and said second data processing apparatus are connected to a common network.

* * * * *

UNITED STATES PATENT AND TRADEMARK OFFICE
CERTIFICATE OF CORRECTION

PATENT NO. : 5,859,956

DATED : January 12, 1999

INVENTORS : MITSUMASA SUGIYAMA, ET AL.

It is certified that error appears in the above-identified patent and that said Letters Patent is hereby corrected as shown below:

COLUMN 3

Line 3, "Hulet-" should read --Hewlett--.

COLUMN 17

Line 30, "10003" should read --1003--.

COLUMN 21

Line 54, "interface 311" should read --interface 301--.

COLUMN 22

Line 34, "CC" should read --CG--.

COLUMN 24

Line 8, "XEM" should read --VME--.
   Line 9, "interface 311" should read --interface 301--.
   Line 21, "VEM" should --VME--.

UNITED STATES PATENT AND TRADEMARK OFFICE
CERTIFICATE OF CORRECTION

PATENT NO. : 5,859,956

DATED : January 12, 1999

INVENTORS : MITSUMASA SUGIYAMA, ET AL.

It is certified that error appears in the above-identified patent and that said Letters Patent is hereby corrected as shown below:

COLUMN 25

Line 5, "VEM" should read --VME--.
    Line 20, "CPUS." should read --CPUs.--.
    Line 63, "VEM" should read --VME--.

COLUMN 50

Line 36, "801" should read --804--.

COLUMN 68

Line 17, "step (2)," should read --step (7),--.

UNITED STATES PATENT AND TRADEMARK OFFICE
CERTIFICATE OF CORRECTION

PATENT NO.  : 5,859,956

DATED       : January 12, 1999

INVENTORS   : MITSUMASA SUGIYAMA, ET AL.

It is certified that error appears in the above-identified patent and that said Letters Patent is hereby corrected as shown below:

<u>COLUMN 71</u>

Line 11, "in" should read --is--.  (first occurrence)

<u>COLUMN 72</u>

Line 2, "PDL;" should read --PDL; and--.

Signed and Sealed this

Thirty-first Day of August, 1999

Attest:

Q. TODD DICKINSON

*Attesting Officer*        *Acting Commissioner of Patents and Trademarks*